CONDITIONAL VARIABLE INCREMENTAL COMPUTER

Filed Dec. 13, 1961 20 Sheets-Sheet 1

Inventors:
Donald M. Merz,
Edward A. Shemeta,
by Roe [signature]
Their Attorney.

CONDITIONAL VARIABLE INCREMENTAL COMPUTER

Filed Dec. 13, 1961 20 Sheets-Sheet 2

| | |
|---|---|
| A - SERIAL ADDER | |
| C - TWO'S COMPLEMENTER | |
| D - CONTROLLED DELAY (DC-CONTROL) | |
| S - SERIAL SUBTRACTOR | |

Inventors:
Donald M. Merz,
Edward A. Shemeta,
by Roe DM'Burnett
Their Attorney.

CONDITIONAL VARIABLE INCREMENTAL COMPUTER

Filed Dec. 13, 1961 20 Sheets-Sheet 3

Inventors:
Donald M. Merz,
Edward A. Shemeta,
by [signature]
Their Attorney.

Inventors:
Donald M. Merz,
Edward A. Shemeta,
by
Their Attorney.

CONDITIONAL VARIABLE INCREMENTAL COMPUTER

Filed Dec. 13, 1961 20 Sheets-Sheet 5

Inventors:
Donald M. Merz,
Edward A. Shemeta,
by Roe McBurnett
Their Attorney.

Inventors:
Donald M. Merz,
Edward A. Shemeta,
by Roe DM Burnett
Their Attorney.

May 3, 1966 D. M. MERZ ET AL 3,249,743

CONDITIONAL VARIABLE INCREMENTAL COMPUTER

Filed Dec. 13, 1961 20 Sheets-Sheet 7

ALGORITHM A (a) $U_{i-1}U_i'+R_i=R_{i-1}-U_{i-2}U_{i-1}'-U_{i-1}U_{i-1}'+SZ_{i-1}'$ (b) $X_{i-2}+X_{i-1}'=X_{i-1}$; $SIGN(\bar{X}-X_{i-1})=X_i'$

INPUT

ALGORITHM B (a) $SZ_i'+R_i=R_{i-1}+U_{i-1}U_i'+U_iU_i'-SZ_{i-1}'$ (b) $X_{i-1}+X_i'=X_i$

OUTPUT OF A(a)

ALGORITHM C $X_{i-1}+X_i'=X_i$

OUTPUT OF B(b)

Inventors:
Donald M. Merz,
Edward A. Shemeta,
by Roe D. McBurnett
Their Attorney.

Inventors:
Donald M. Merz,
Edward A. Shemeta,
by Roe DM'Burnett
Their Attorney.

CORE-DIODE LOGIC CIRCUITS

Inventors:
Donald M. Merz,
Edward A. Shemeta,
by Roe D. McBurnett
Their Attorney.

CONDITIONAL VARIABLE INCREMENTAL COMPUTER

Filed Dec. 13, 1961 20 Sheets-Sheet 10

From Fig. 9a.

CORE-DIODE LOGIC CIRCUITS

Inventors:
Donald M. Merz,
Edward A. Shemeta,
by Roe A. McBurnett
Their Attorney.

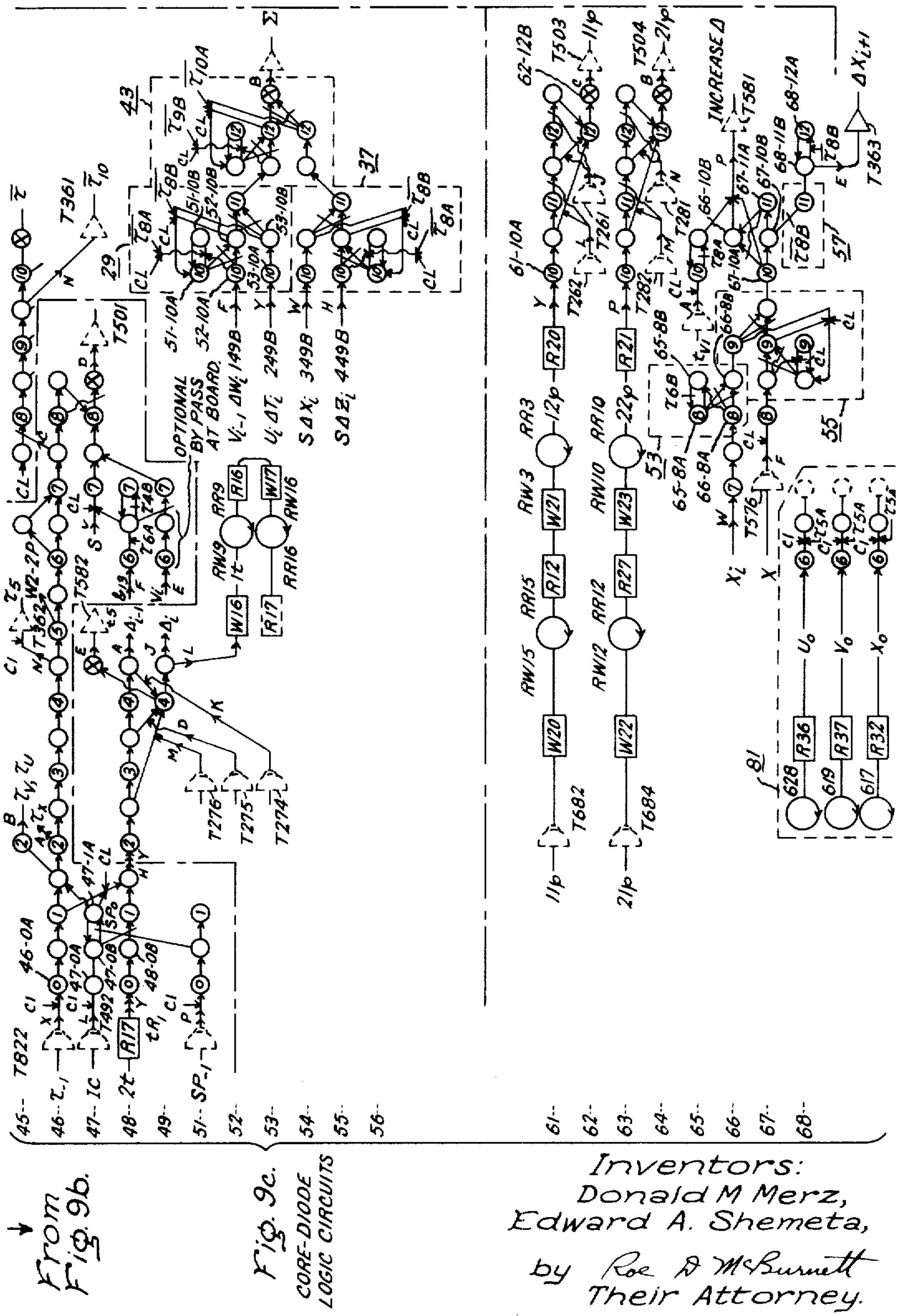
From Fig. 9b.
Fig. 9c. CORE-DIODE LOGIC CIRCUITS
Inventors:
Donald M Merz,
Edward A. Shemeta,
by Roe D McBurnett
Their Attorney.

CONDITIONAL VARIABLE INCREMENTAL COMPUTER

Inventors:
Donald M. Merz,
Edward A. Shemeta,
by Roe D McBurnett
Their Attorney.

CONDITIONAL VARIABLE INCREMENTAL COMPUTER

Inventors:
Donald M. Merz,
Edward A. Shemeta,
by Roe D. McBurnett
Their Attorney.

CONDITIONAL VARIABLE INCREMENTAL COMPUTER

Inventors:
Donald M. Merz,
Edward A. Shemeta,
by Roe D McBurnett
Their Attorney.

CONDITIONAL VARIABLE INCREMENTAL COMPUTER

INCREMENT DISTRIBUTION
RANDOM ACCESS MEMORY
SWITCHING MULTIPLIER CONTROL.

Inventors:
Donald M. Merz,
Edward A. Shemeta,
by Roe D. McBurnett
Their Attorney.

Inventors:
Donald M. Merz,
Edward A. Shemeta,
by Roe D. McBurnett
Their Attorney.

CONDITIONAL VARIABLE INCREMENTAL COMPUTER

INCREMENT DISTRIBUTION
RANDOM ACCESS MEMORY
SWITCHING MULTIPLIER CONTROL.

Inventors:
Donald M. Merz,
Edward A. Shemeta,
by Roe D. McBurnett
Their Attorney.

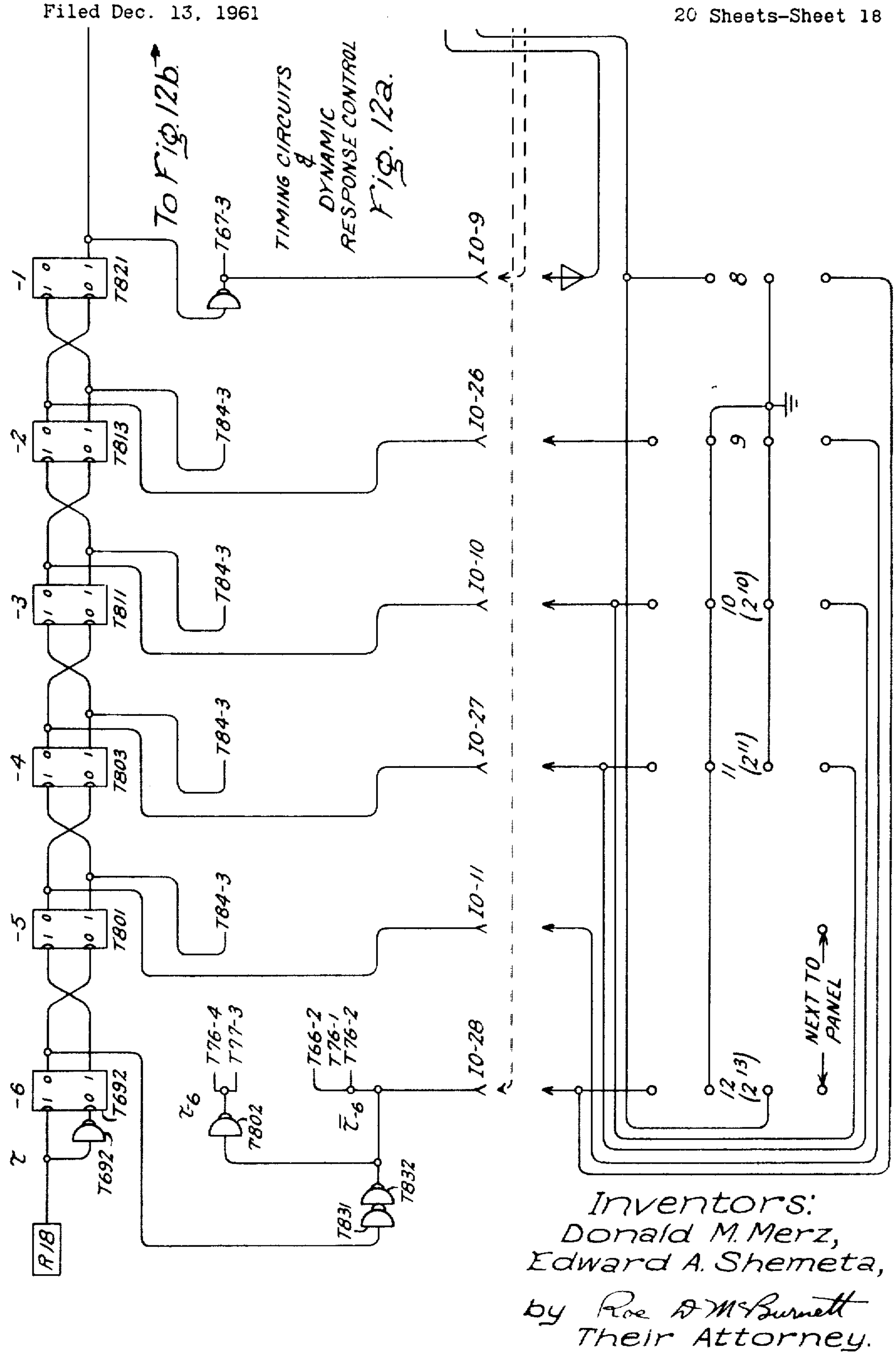
Inventors:
Donald M. Merz,
Edward A. Shemeta,
by Roe A McBurnett
Their Attorney.

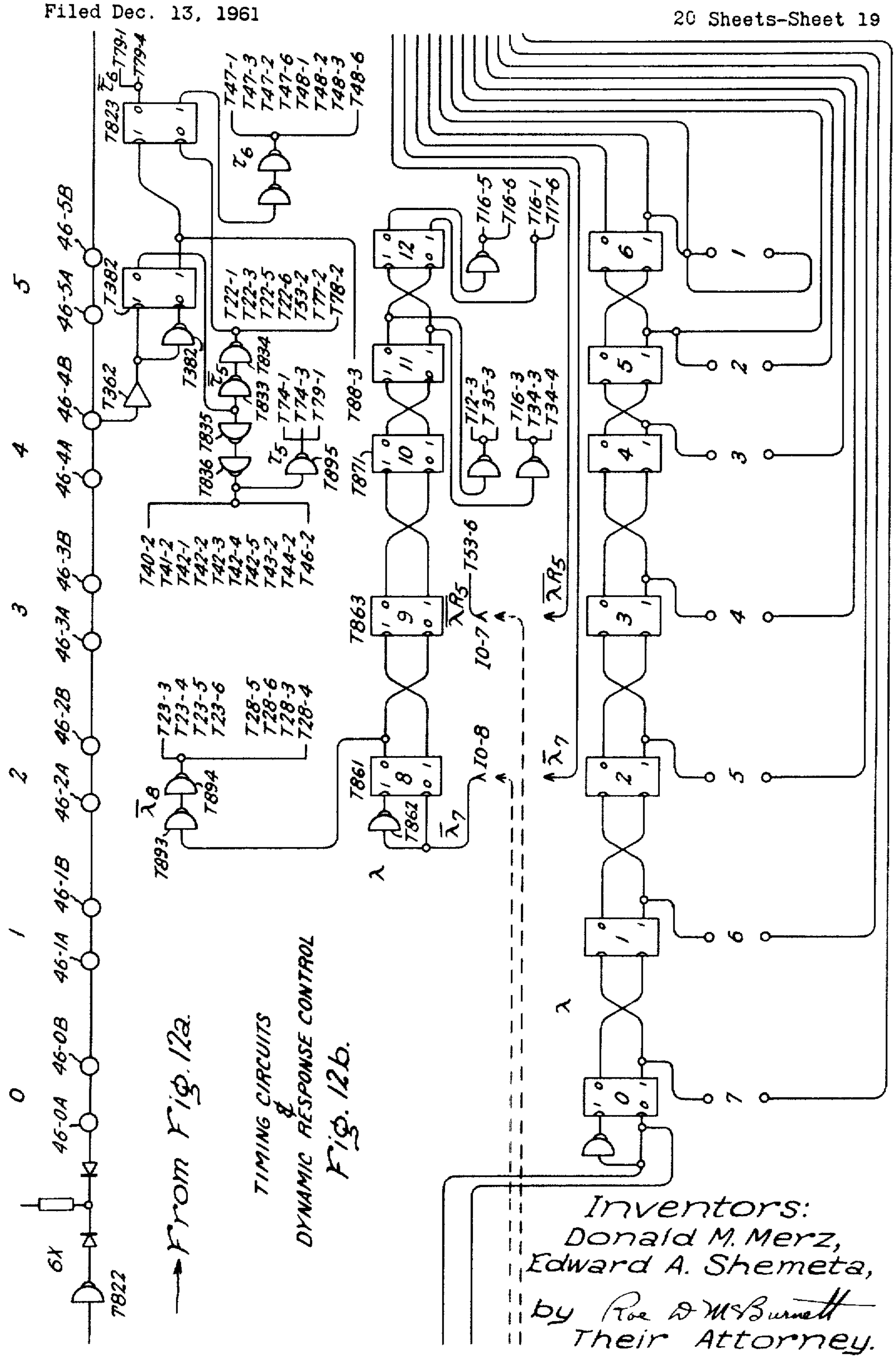
From Fig. 12a
TIMING CIRCUITS & DYNAMIC RESPONSE CONTROL Fig. 12b.
Inventors:
Donald M. Merz,
Edward A. Shemeta,
by Roe D. McBurnett
Their Attorney.

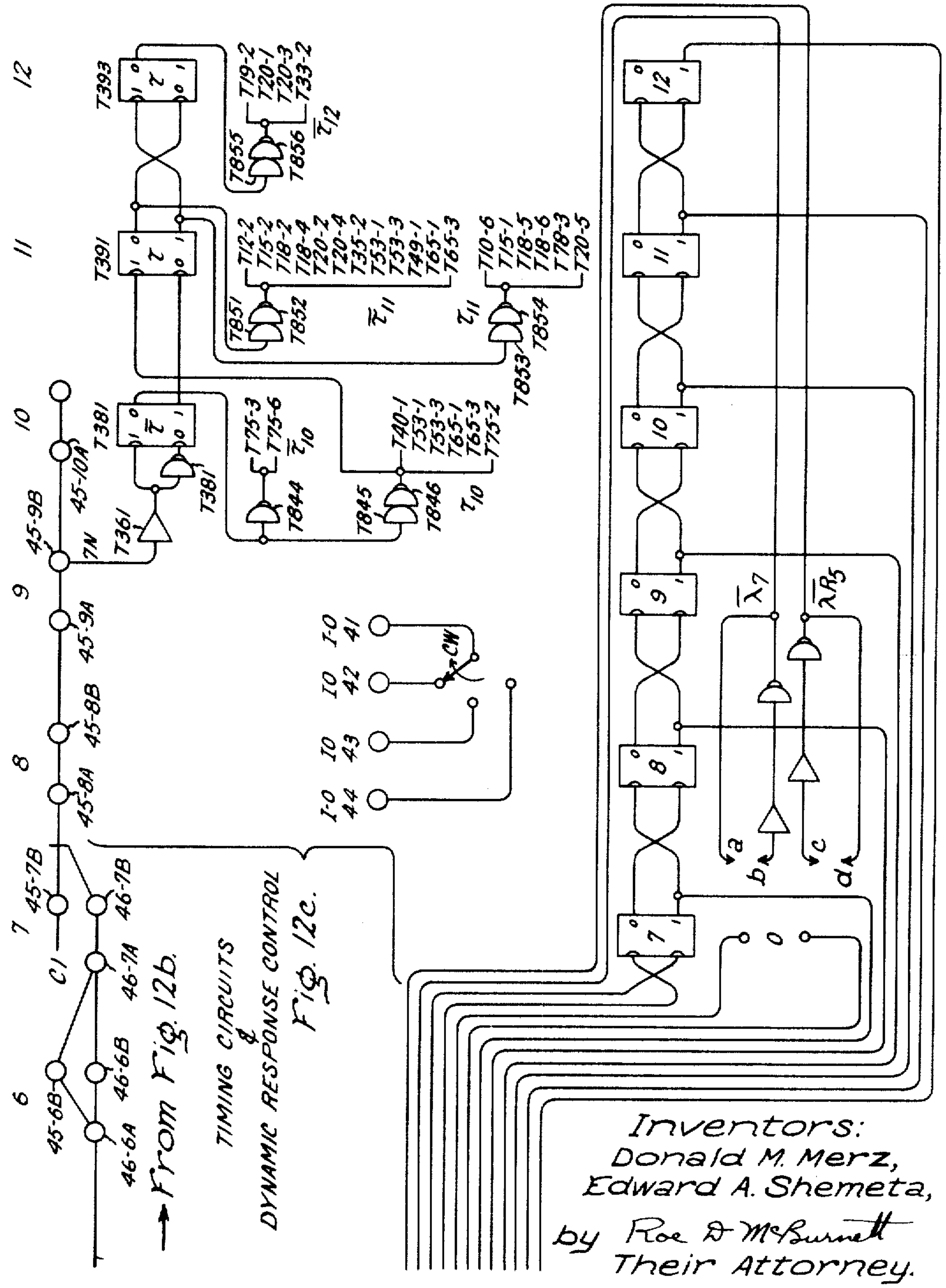
Inventors:
Donald M. Merz,
Edward A. Shemeta,
by Roe D McBurnett
Their Attorney.

United States Patent Office 3,249,743

Patented May 3, 1966

3,249,743

CONDITIONAL VARIABLE INCREMENTAL COMPUTER

Donald M. Merz and Edward A. Shemeta, Schenectady, N.Y., assignors to General Electric Company, a corporation of New York Filed Dec. 13, 1961, Ser. No. 159,027
6 Claims. (Cl. 235—152)

This invention relates generally to digital computers and more particularly, to digital computers of the incremental type capable of initially computing, incrementally, the change in solution since the last previous computation, performing this computation by operation on incremental changes in the input quantities, and after settling, operating in a fixed increment mode.

In patent application, Serial No. 809,643, filed April 29, 1959, entitled "Variable Increment Computer," by E. H. Cabaniss and J. S. Prince, now Patent No. 3,109,090, issued October 29, 1963, assigned to the same assignee, there is described a computer of the type having high dynamic capabilities which utilizes the incremental changes in input quantities for computing incrementally the changes in solution since the last pervious computation, wherein the increments used are variable and optimized to obtain the desired speed of operation. More specifically, the variable increment computer (GEVIC) employs incremental mathematics, using increments or changes in the input and output parameters on successive computations. The computer operates by applying corrections to the input and output data, the values of which have been changed between any two sampling times. Previous data and solutions are preserved, and the corrections or increments are applied to these data to compensate for these changes.

The incremental process as used in the aforesaid mentioned patent application is somewhat analogous to that employed by a digital differential analyzer (DDA) in that both computers transfer into each operation only the changes (or increments) of numbers involved. Unlike the usual DDA, however, the variable increment computer does not operate upon increments of fixed size. Rather, this computer selects any of several increments in relation to the speed at which the problem is changing. High problem rates are obtained with a minimum of components, and the dynamic characteristics of the variable increment computer approach those of an analogue device while retaining digital accuracy and flexibility.

In further contrast to the DDA machine, the variable increment computer uses a single basic algorithm for all mathematical functions, accomplishing a considerable increase in program efficiency. Arithmetic operations which may be performed in a "single step," selectable under control of the stored program, include addition, subtraction, multiplication, division, trapezoidal integration, differentiation, digital filtering, extracting square roots, and several types of combining operations.

As is well known in the computer art, no one digital computer is the optimum for all applications. For data reduction and "one-shot" calculation, the general purpose or "total transfer" machine is superior. But for operation at high iteration rate on smoothly varying functions such as are normally encountered in real-time control, the general-purpose machine can be wasteful of time and equipment. In such applications requiring high iteration rates as mentioned hereinabove, the incremental or "partial transfer" computer is generally preferred.

Until the development of the variable increment computer, there was no method of combining the more desirable features of the general purpose machine and the incremental type computer. Where rapid slew was required, a general purpose machine was necessary; where high solution rate and dynamic accuracy were required, a fixed increment computer was needed. However, when both requirements existed together, both types of computers had to be used.

The computer of the present invention developed from the concepts disclosed in the variable increment computer and is best applied to the type of problem for which a hybrid general purpose-incremental computer is usually designed. In a preferred application of the computer of the present invention, the general programming function of rapid slew by using variable increments is accomplished which gives accurate solutions at high iteration rate by operating in a fixed increment mode after settling. The conditional variable increment computer (CVIC) uses a single arithmetic section which is only slightly more sophisticated (complicated) than that of the simple fixed type increment computer and can be applied to a system type problem wherein the various elements of that problem, such as, bombing, navigation, etc. can be mathematically isolated so that no incremental data exchange takes place between the various elements. Thus, the incremental computations made by the computer of the present invention can be applied to that class of problem where fixed increment methods are normally sufficient for following the problem but where other methods must be employed periodically to slew the computer.

The conventional method of solving the two-fold problem is to use a dual arithmetic computer—a general purpose section with a low iteration rate to generate an initial solution and a fixed increment digital differential analyzer to follow at a higher iteration rate. CVIC combines the two functions in a single arithmetic section. It is an incremental computer with a high iteration rate and very strong slewing capability.

CVIC may be likened to a fixed increment computer in which, for any given cycle (one complete iteration of all problem steps), all computed increments have the same magnitude. But this magnitude is permitted to change between cycles and can take-on any preselected maximum value. For simplicity, increments are limited to integral powers of the binary radix and are permitted to change by a factor of only ½, 1, or 2 between successive cycles. Choice of a maximum increment size does not affect the complexity of the computer. In one CVIC embodiment, the operator is able to select any maximum increment ($\Delta$ max.) from $2^0=1$ through $2^{13}=8192$.

When slewing, CVIC will increase the increment size on successive cycles until it reaches the maximum. It will continue to operate with this $\Delta$ max. until all control variables approach their solution. As each increment magnitude reaches its solution it goes into a "limit cycle," using the current increment magnitude but alternating in sign on successive cycles. As the slower variables settle, smaller increments are used and the amplitude of the "limit cycle" decreases. All variables settle to fixed increment operation at the same time.

The present invention has as a primary object the provision of digital computers of conditional increment type utilizing a single arithmetic section having a high iteration rate and strong slewing capabilities.

Another object of the present invention is to provide a digital computer of the incremental type capable of initially computing, incrementally, the change in solution since the last previous computation, performing this computation by operation on incremental changes in the input quantities, and after settling, operating in a fixed increment mode.

A further object of this invention is to provide in an incremental digital computer means for selecting a variable increment having both sign and magnitude, and means for maintaining constant the magnitude of said selected variable increment during any one computer cycle.

These and other objects of the present invention will be more fully understood and its various objects, features and advantages further appreciated by reference to the appended claims and the following detailed specification when read in conjunction with the accompanying drawings wherein:

Figure 5A:
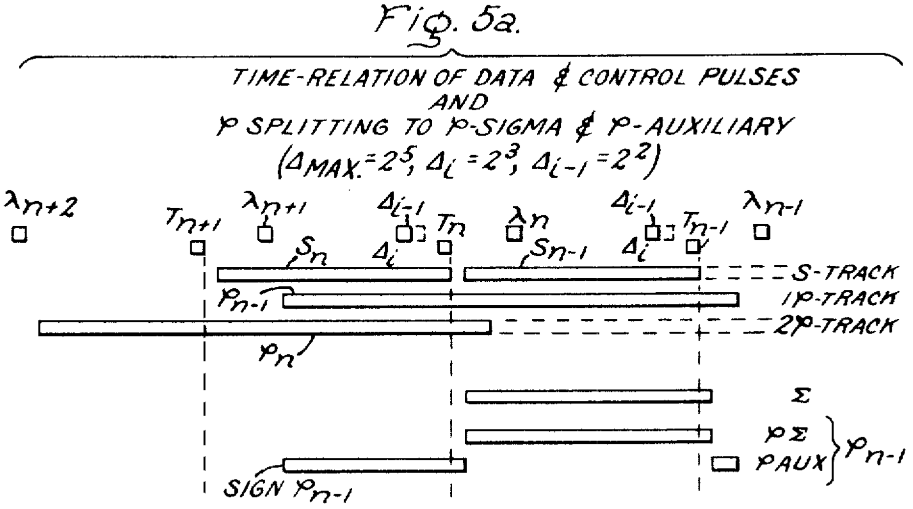
Figure 5B:
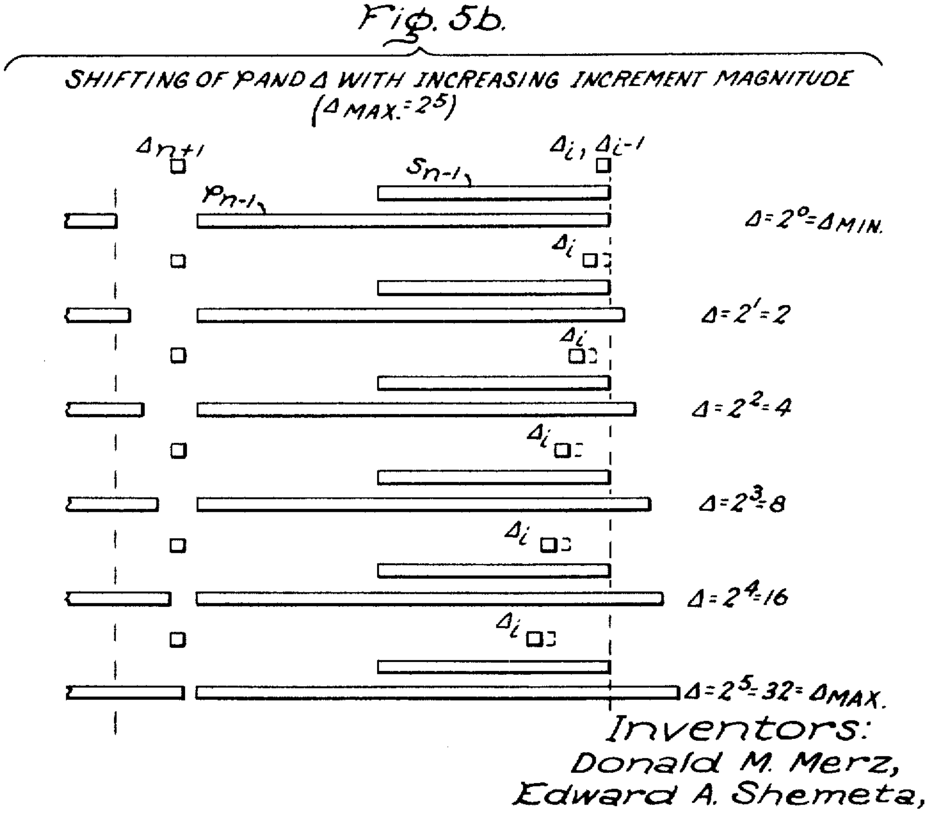
Figure 6:
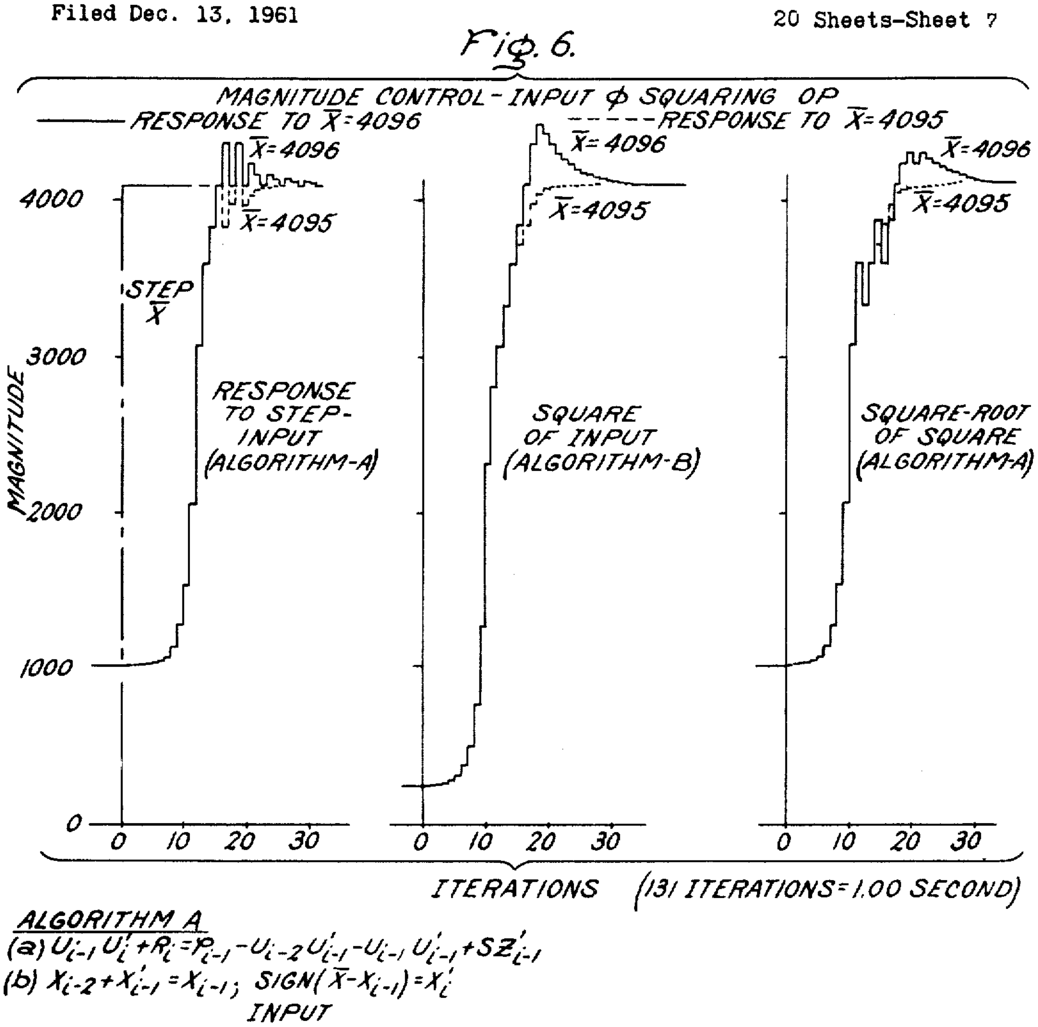
Figures 7, 8A:
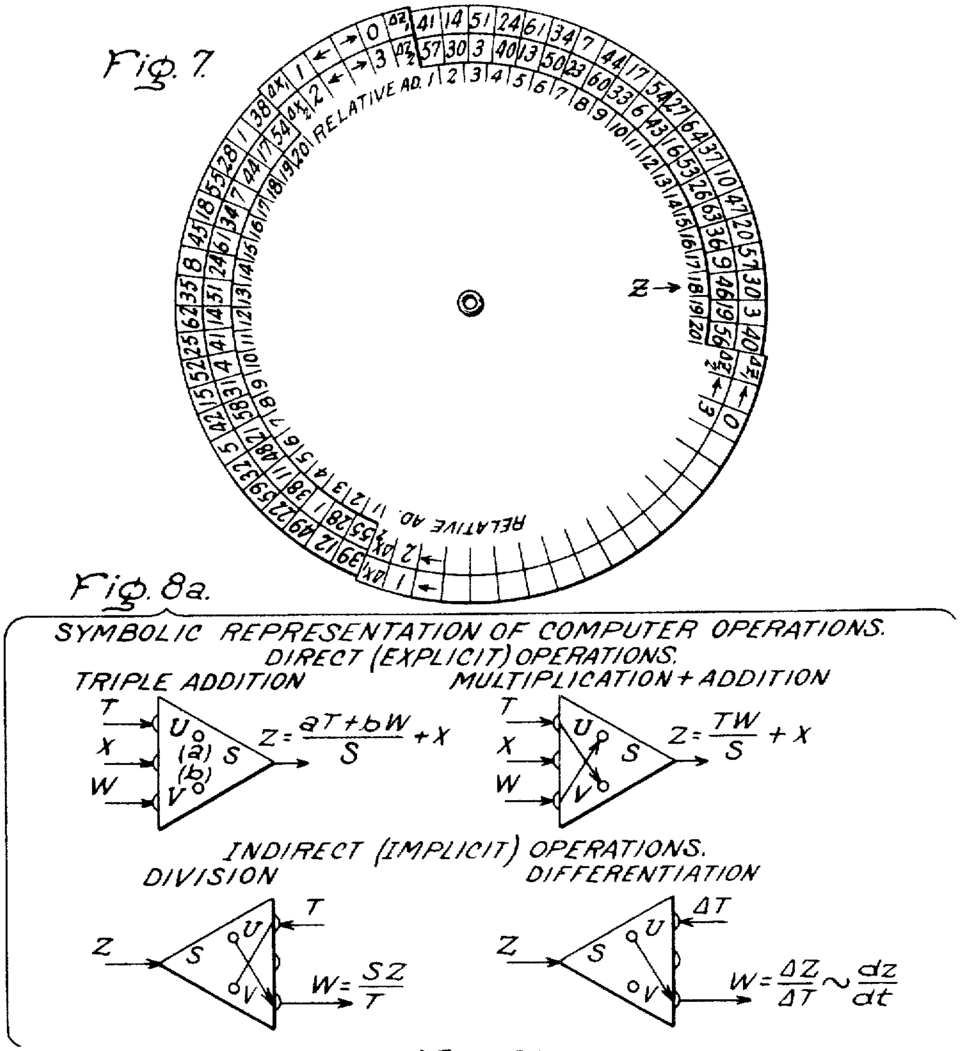
Figure 8B:
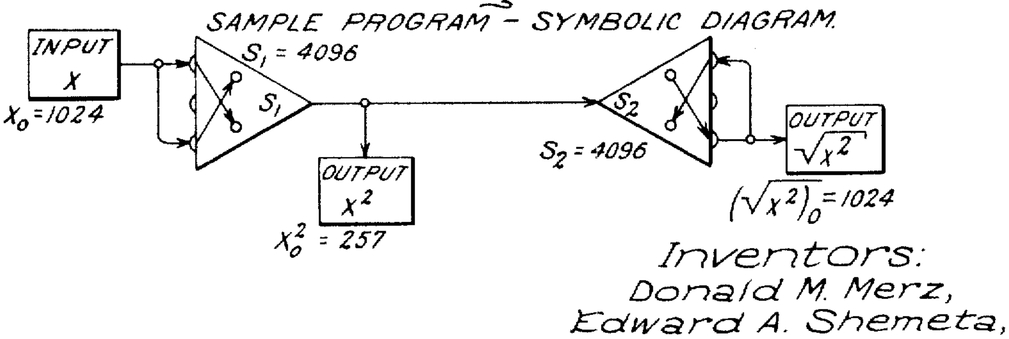
Figure 9A:
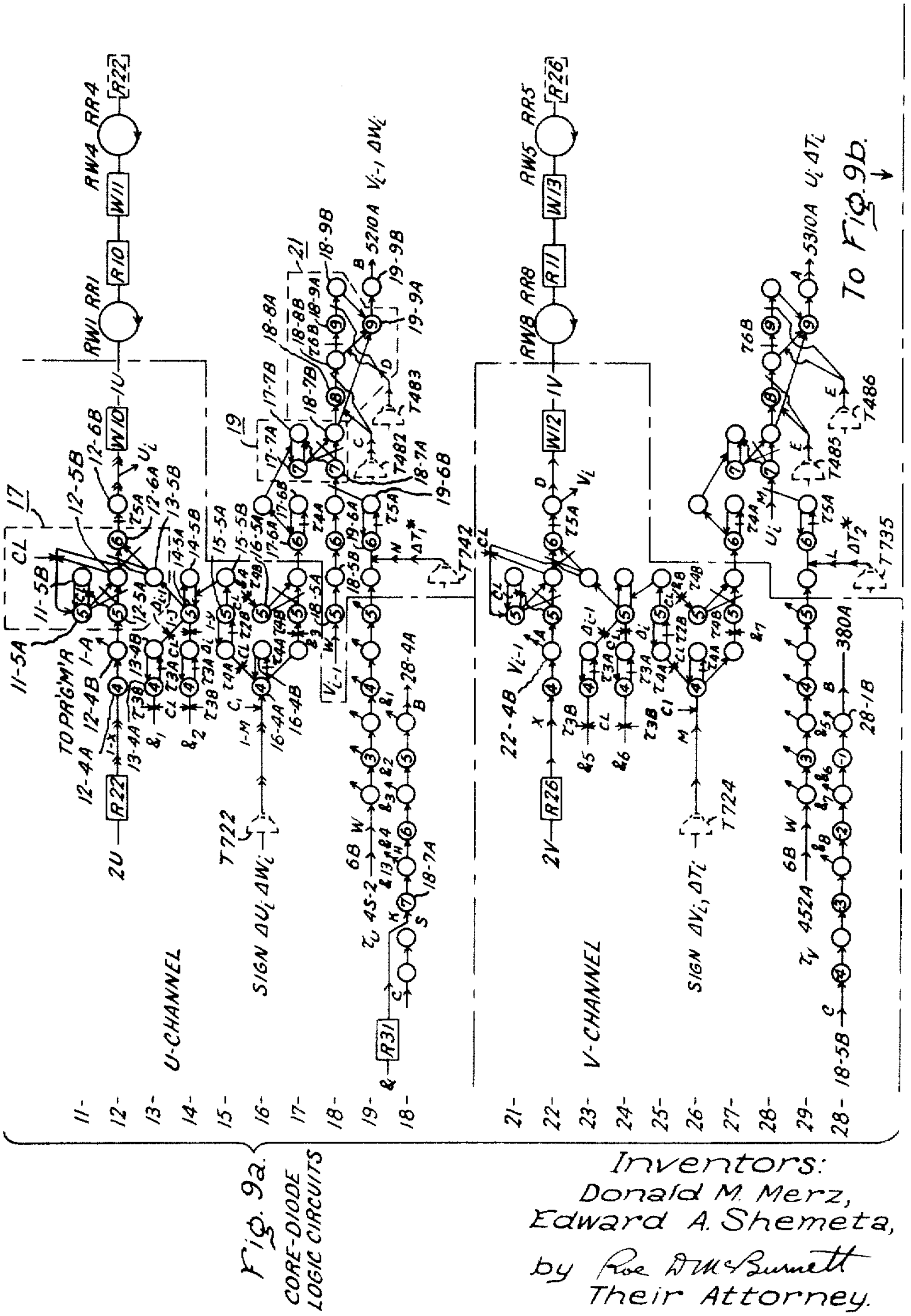
Figure 9B:
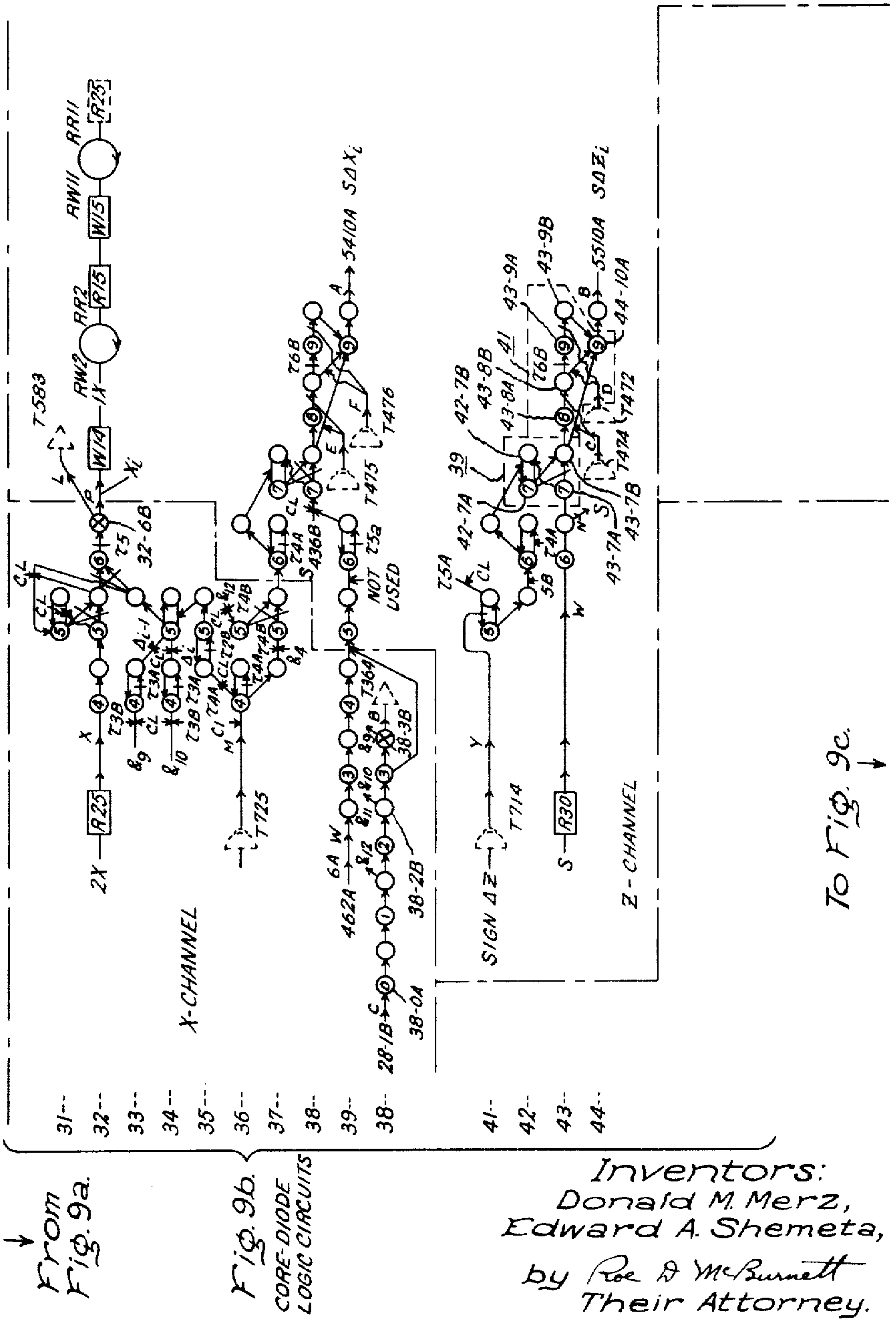
Figure 10A:
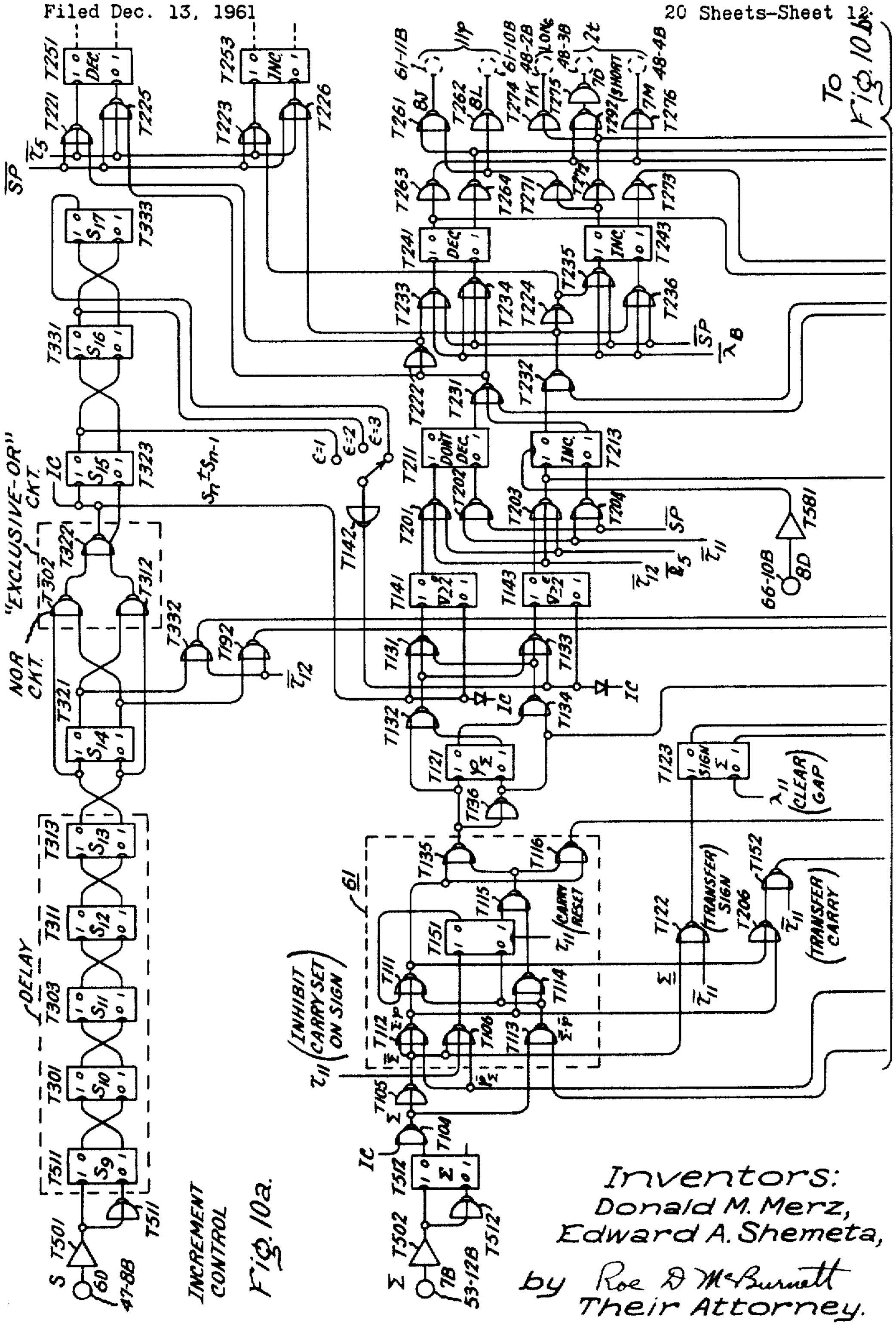
Figure 10B:
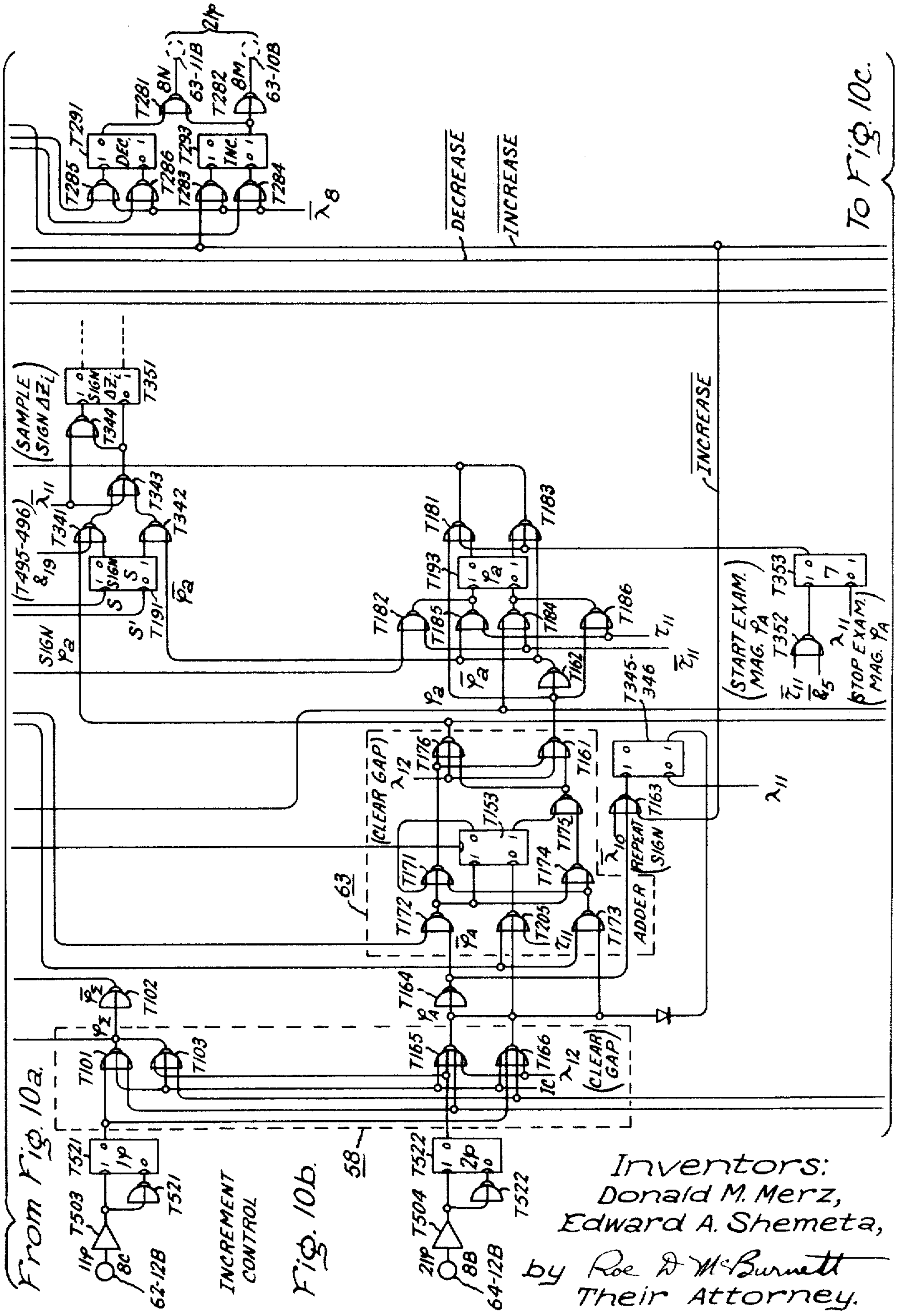
Figure 10C:
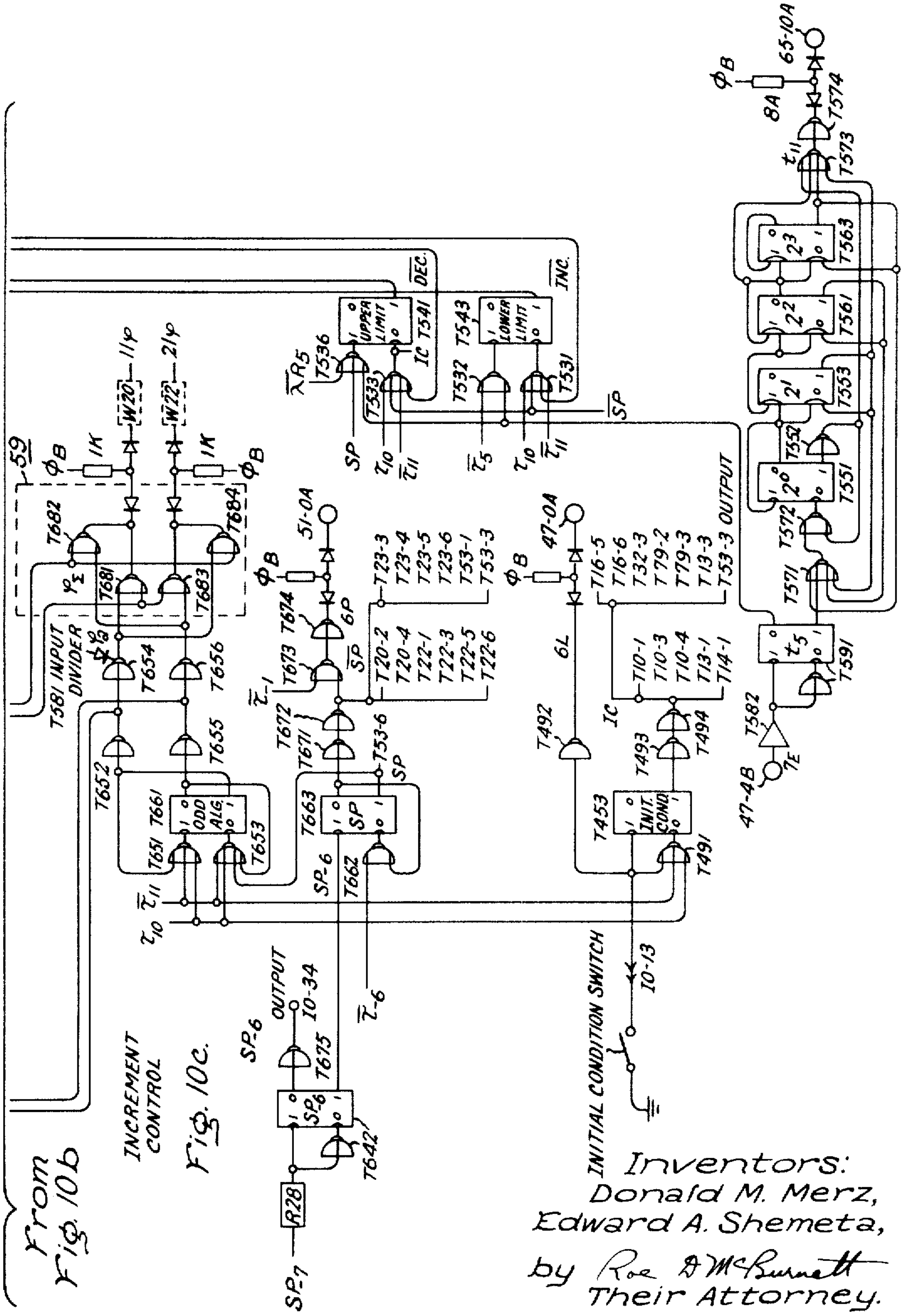
Figure 11A:
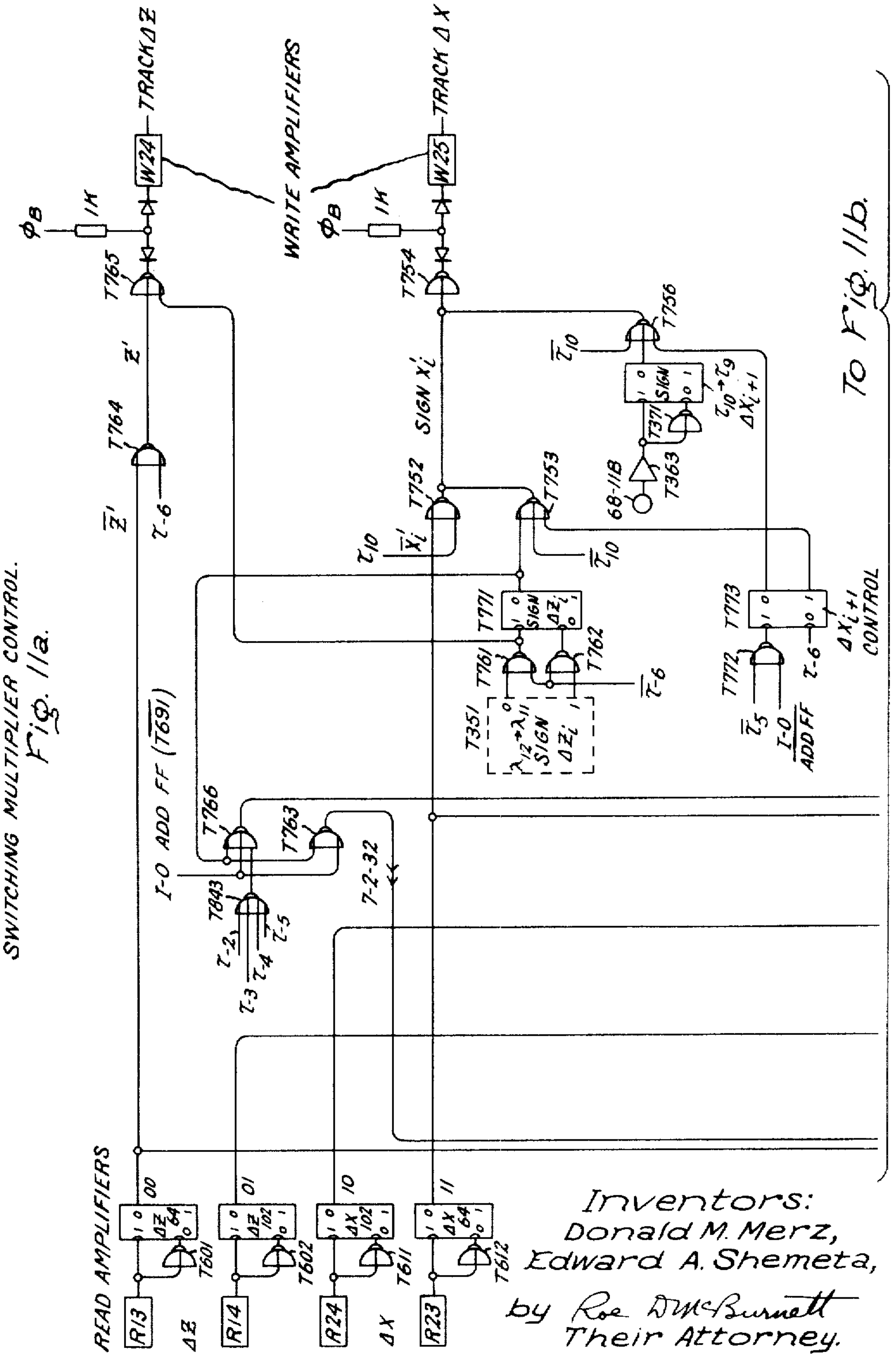
Figure 11B:
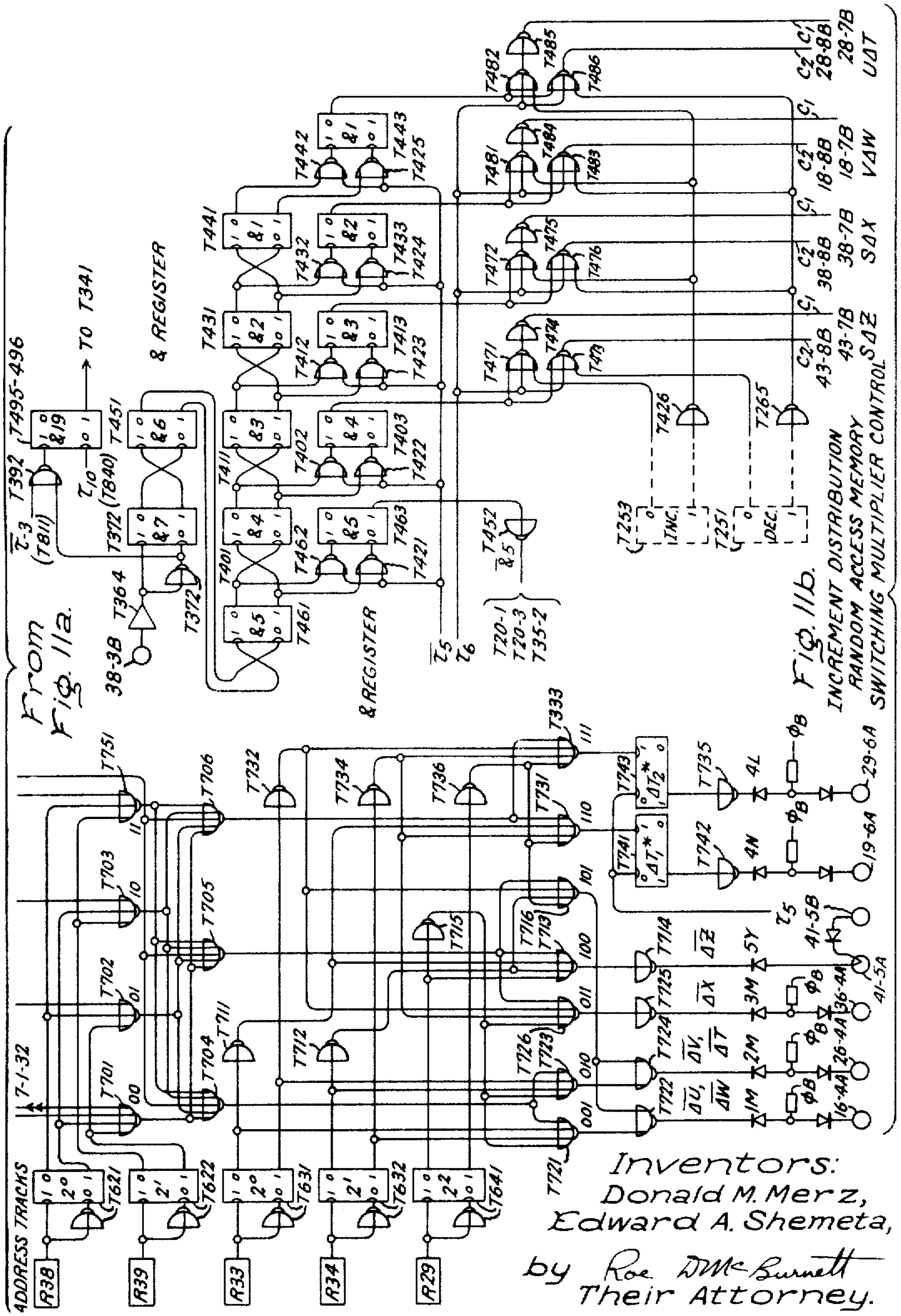

FIGURES 4*a*, 4*b*, 4*c*, 4*d* comprise a detailed logical diagram of one form of a conditional variable computer operating in accordance with the principles of the invention;

FIGURE 5*a* is a graphical representation of the time-relationship of data and control pulses, and $\rho$ splitting to $\rho$ sigma and $\rho$ auxiliary for the case where $\Delta$ max.$=2^5$, $\Delta_i=2^3$ and $\Delta_{i-1}=2^2$;

FIGURE 5*b* is a graphical representation illustrating the shifting of $\rho$ and $\Delta$ with increasing increment magnitude for the case where $\Delta$ max.$=2^5$;

FIGURE 6 is a graphical representation of the CVIC computer response characteristics when operating in fixed and variable modes;

FIGURE 7 is an illustration of a circular slide rule for use in connection with programming the CVIC computer;

FIGURES 8*a* and 8*b* represent a symbol representation for illustrating the operation of the computer of the subject invention;

FIGURE 9 (*a*, *b* and *c*) is an illustration of core-diode logic circuits for the U, V, X and Z-channels of the subject invention shown in symbolic notation;

FIGURE 10 (*a*, *b* and *c*) is an illustration of transistorized logic circuits for the increment control of the subject invention shown in symbolic notation;

FIGURE 11 (*a*, *b* and *c*) is an illustration of transistorized logic circuits for the increment distribution, random access memory, switching multiplier control of the subject invention shown in symbolic notation; and FIGURE 12 (*a*, *b* and *c*) is an illustration of transistorized logic for timing and dynamic response control circuits of the subject invention shown in symbolic notation.

BACKGROUND

General purpose (GP) computers are those computers which have a total transfer of information. More specifically, a "whole word" is transferred from the storage memory at a time. In the GP computer an operation consists of a complete slew starting from zero and going to solution. Thus, in the GP machine, the operation consists of starting from zero to a fiinal solution in one step just as one would multiply one hundred by one hundred and obtain ten thousand in one step. The incremental machine, on the other hand, builds up to the desired solution in steps. A fixed increment machine will build up to solution one step at a time, taking for example ten thousand operations to yield the solution to the problem of multiplying one hundred by one hundred. The variable increment computer (GEVIC) with its capability for operating with larger increments, will go to solution much faster than the fixed increment computer or will arrive at its solution intermediate between the fixed increment and the GP machine.

The present invention operates in a similar fashion to GEVIC except that during a computer cycle, where the computer is operating on perhaps fifty different variables, every variable is forced to take the same size step during any one cycle. It will be recognized that GEVIC does not have this restriction since GEVIC increments can take any of several sizes during the cycle. For example, let us take the case where there is a step input to a complex problem the solution of which is desired. Initially, where there is no step input, the computer would essentially be operating at zero until a step input occurs. Further, let us assume that one of the variables in the complex problem represents a step input of one thousand units and for some other variable this step input represents only ten units. GEVIC would approach the ten units step as rapidly as possible. In fact, its first step would be eight units. Thus, GEVIC would be up to within two units of the current value in one cycle. The next step would be two units and GEVIC would be on solution for that variable. For the case of the thousand units step, GEVIC's first increment would be one hundred and twenty-eight where the largest value mechanized in the specific computer is $2^7$. Thus, for this specific mechanization, it would take some ten steps to arrive at the solution, the machine proceeding as follows: $(128\times7)+64+32+8=1000$.

In comparison, CVIC would use the same size increment for both variables. The incremental size utilized in CVIC is controlled by the largest variable change. In the specific problem disclosed above, this would represent the one thousand unit step. CVIC would operate by choosing increments on that basis, starting with an increment of $2^0$, or 1. It would compare this 1 to the thousand unit step. The machine would recognize this is too small and would start doubling increment magnitude going to two, then successively to four, eight, sixteen, thirty-two, sixty-four, one hundred twenty-eight, two hundred fifty-six, etc. CVIC is designed so that it will operate at a rate such as to approach the largest variable and settle to a solution of all variables in the smallest amount of time. Further, since CVIC is mechanized so that all of the increments are of the same size during a cycle, it will overshoot the smaller variable.

Referring back to the specific example, CVIC would build up to the input value of a thousand;

$$1+2+4+8+16+32+64+128+256+256+128+64+32+16-8+4-2-1=1000$$

It will be noted that in arriving at the solution some oscillation about the final solution occurs because of the inability of the increment magnitude to change by more than a factor of two between successive cycles. Thus, for a step of ten units CVIC would overshoot the ten unit input step with increments of 256 units. However, the solution to the total problem will only be obtained when the computer has settled to all of the variables; by the time it settles to the value of one thousand, it will also have settled to the value of 10.

GEVIC, on the other hand, would settle to the step input of ten in two steps, and would approach the thousand unit step input and settle in ten cycles. Until the full ten cycles are completed, part of the solution in GEVIC is good and part of it is bad. In the case of the present invention, it is to be observed that while slewing acceleration is somewhat slower, all variables settle at the same time in contrast with GEVIC where the variables settle at different times in the computer operation.

VARIABLE INCREMENT MATHEMATICS

In order to more fully appreciate the type of mathematical computations that may be performed by variable increment and conditionally variable increment computers and to more fully understand the detailed description of the operation of such computers, the following mathematical discussion is presented. It is to be understood that although the discussion relates to comparatively simple mathematical operations, the computers of the subject invention are capable of performing addition and subtraction, multiplication, division, square root, integration, division, etc. operations. For purposes of definition let:

$\Delta$=an increment
$X_i$=the current (latest) value of input parameter X (a system variable)
$\Delta X_i$=most recent (latest) increment of X
$Y_i$=the current (latest) value of input parameter Y (a system variable)
$\Delta Y_i$=most recent (latest) increment of Y
$Z_i$=most recent (current) computed solution
$\Delta Z_i$=the incremental change in solution The subscript ($i$) associated with each of the variables listed hereinbefore denotes current data; the subscript ($i-1$) will be used to denote previous (old) data or data just prior to the current data. Thus, the term ($Z_{i-1}$) represents the computed solution of the previous (old) data.

From the above definitions we obtain:

$$Z_i=Z_{i-1}+\Delta Z_i \quad (1)$$

The sum of X and Y (parameters) may be expressed as:

$$aX+bY=sZ \quad (2)$$

where: $a$, $b$ and $s$ are scale factors. From the definitions hereinbefore, the previous (old) sum would be:

$$aX_{i-1}+bY_{i-1}=sZ_{i-1} \quad (3)$$

and the most recent (current) sum would be:

$$aX_i+bY_i=sZ_i \quad (4)$$

Equation 4 may be rewritten as:

$$a(X_{i-1}+\Delta X_i)=b(Y_{i-1}+\Delta Y_i)=s(Z_{i-1}+\Delta Z_i) \quad (5)$$

Substituting Equation 3 in Equation 5 and solving for the change in solution or $s\Delta Z_i$ we obtain:

$$s\Delta Z_i=a\Delta X_i+b\Delta Y_i \quad (6)$$

It is to be recognized that the previous computed solution ($sZ_{i-1}$) is stored internally in the variable increment computer and can, by appropriate means, be retrieved at any time for future computations. Thus, the most recent, or new, solution would become:

$$sZ_i=sZ_{i-1}+s\Delta Z_i \quad (7)$$

It can be shown that the sequence of operation (or algorithm) by which an addition operation is performed, as illustrated in Equation 6, is similar to that used for multiplication as well as to those used for other operations. All these sequences or algorithms can be derived from one general algorithm. Thus, several different mathematical operations can be performed with one mechanization by suitable programmed controls.

It will be obvious that subtraction is essentially the same as the addition operation with the exception that the sign of the scale factor $b$ is changed. However, as in the conventional general purpose computer, the method of complements is employed to perform the subtraction operation as an addition operation. Thus for subtraction, Equation 6 may be written as:

$$s\Delta Z_i=a\Delta X_i+(-b\Delta Y_i) \quad (8)$$

Incremental multiplication is demonstrated in the following manner. To obtain $s$Z which is the produce of X and Y:

$$X_iY_i=(Y_{i-1}+\Delta Y_i)(X_{i-1}+\Delta X_i)=s(Z_{i-1}+\Delta Z_i) \quad (9)$$

Expanding and rewriting Equation 9 we obtain:

$$Y_{i-1}X_{i-1}+\Delta X_iY_{i-1}+X_{i-1}\Delta Y_i+\Delta X_i\Delta Y_i=sZ_{i-1}+s\Delta Z_i \quad (10)$$

From a previous solution, the computer has obtained the product:

$$sZ_{i-1}=(X_{i-1})(Y_{i-1}) \quad (11)$$

The value ($X_{i-1}$) ($Y_{i-1}$) is eliminated from Equation 10 by substituting Equation 11 thereinto with the result:

$$s\Delta Z_i=\Delta X_iY_{i-1}+X_{i-1}\Delta Y_i+\Delta X_i\Delta Y_i \quad (12)$$

However, by definition:

$$X_{i-1}=X_i-\Delta X_i \quad (13)$$

Therefore, Equation 12 may be reduced to:

$$s\Delta Z_i=\Delta X_iY_{i-1}+X_i\Delta Y_i \quad (14)$$

Equation 14 discloses that to obtain the change in the computed solution ($\Delta Z_i$), the new (current) value of X, ($X_i$), is multiplied by the change in Y, ($\Delta Y_i$), and is added to the old value of Y, ($Y_{i-1}$), which in turn is multiplied by the change in X, ($\Delta X_i$). It is to be observed that the form of Equation 14 is similar to that of Equation 6, the only difference being that the scale factors (constants) "$a$" and "$b$" are substituted for the variables $Y_{i-1}$ and $X_i$. By proper gating within the variable increment computer, it is possible to substitute either the scale factors (constants) or the variables into the sequence of operation expressed by Equation 6 or 14. Thus, the computer may utilize the same sequence or algorithm for the various mathematical operations described hereinabove.

However, in performing a division operation, the algorithm must be modified and special mechanization is provided to perform this "indirect" type of operation. Consider the division of Z by X: Referring back to the derivation of incremental multiplication, there was obtained the equation:

$$s\Delta Z_i=\Delta X_iY_{i-1}+X_i\Delta Y_i \quad (14)$$

In division, instead of solving for Z, we solve for Y, namely:

$$Y=\frac{sZ}{X} \quad (15)$$

This is necessary to minimize the amount of complexity required for the development of the computer. Thus, by rearranging Equation 14 to solve for $\Delta Y_i$, there is obtained:

$$\Delta Y_i=\frac{s\Delta Z_i-Y_{i-1}\Delta X_i}{X_i} \quad (16)$$

As noted in Equation 16, in the division process the term Z represents an input variable and Y represents the quotient.

From the four operations described, it is now possible to write a sequence of operations or arithmetical algorithm which can be modified by internal computer controls to perform any of the above operations. To keep the development general, the expressions will be written in terms of the new variables, T, W, U and V. Therefore, the algorithm that utilizes exact increments can be written as:

$$U_i\Delta T_i+V_{i-1}\Delta W_i=s\Delta Z_i \quad (17)$$

The various algorithms for the four mathematical operations can be written:

Addition

Let $U_i=a$
$V_{i-1}=b$
$\Delta T_i=\Delta X_i$
$\Delta W_i=\Delta Y_i$

Then from Equation 17, the addition algorithm of Equation 6 is:

$$a\Delta X_i+b\Delta Y_i=s\Delta Z_i \quad (6)$$

Similarly, by substitutions into the remainder of the arithmetic operations:

Subtraction

Let $U_1=a$
$V_{1-1}=-b$
$\Delta T_1=\Delta X_1$
$\Delta W_1=\Delta Y_1$
$$a\Delta X_1+(-b\Delta Y_1)=s\ Z_1 \quad (8)$$

Multiplication

Let $U_1=X_1$
$V_{1-1}=Y_{1-1}$
$\Delta T_1=\Delta Y_1$
$\Delta W_1=\Delta X_1$
$$\Delta X_1 Y_{1-1}+X_1\Delta Y_1=s\Delta Z_1 \quad (14)$$

Division

Let $U_1=X_1$
$V_{1-1}=Y_{1-1}$
$\Delta T_1=\Delta Y_1$
$\Delta W_1=\Delta X_1$
$\Delta Z_1=\Delta Z_1$ Substitution of the above identities into Equation 17 results in:

$$s\Delta Z_1=X_1\Delta Y_1+Y_{1-1}\Delta X_1$$

or solving for $\Delta Y_1$, there is obtained:

$$\Delta Y_1=\frac{s\Delta Z_1-Y_{1-1}\Delta X_1}{X_1} \quad (16)$$

In the copending patent application, Serial No. 809,643 entitled "Variable Increment Computer" by E. H. Cabaniss and J. S. Prince, now Patent No. 3,109,090, issued October 29, 1963, mentioned hereinbefore, there is described the mechanization of the simple algorithm for the variable increment computer (GEVIC). It was shown that the arithmetical algorithm developed hereinbefore must be modified to include the remainder or residue terms introduced by the use of the integral power of two increments. To see how the general algorithm must be modified to accommodate the remainder terms, modification of the multiplication algorithm will first be considered. This will serve as an example since the other algorithms are modified in similar fashion.

Multiplication: from Equation 14

$$\Delta X_1 Y_{1-1}+X_1\Delta Y_1=s\Delta Z_1 \quad (14)$$

Rewriting the above in terms of powers of 2 (optimum increments) and including the remainder term (R), Equation 14 becomes:

$$X_1'Y_{1-1}+X_1Y_1'+R_{1-1}=sZ_1'+R_1 \quad (18)$$

where $R_{1-1}$=old remainder term
$R_1$=new remainder term
$X_1'$=increment of variable X optimized to the nearest power of radix 2
$Y_1'$=increment of variable Y optimized to the nearest power of radix 2
$Z_1'$=increment of Z optimized to the nearest power of radix 2

Addition:

$$aX_1'+bY_1'+R_{1-1}=sZ_1'+R_1 \quad (19)$$

Subtraction:

$$aX_1'+(-bY_1')+R_{1-1}=sZ_1'+R_1 \quad (20)$$

Division: This operation has to receive special treatment. Equation 16 can be rewritten as follows:

$$X_1\Delta Y_1=s\Delta Z_1-Y_{1-1}\Delta X_1 \quad (16)$$

Including the error term and adjusting for optimum increments, the expression becomes:

$$X_1Y_1'+R_1=sZ_1'-Y_{1-1}X_1'+R_{1-1} \quad (21)$$

The algorithm for the foregoing computations can be generalized to the following expression:

$$U_1T_1'+V_{1-1}W_1'+X_1'+R_{1-1}=sZ_1'+R_1 \quad (22)$$

Where:

$U_1$=latest value of variable U
$T_1'$=optimum increment of variable T
$V_{1-1}$=previous value of variable V
$W_1'$=optimum increment of variable W
$X_1'$=optimum increment of variable X Obviously the above variables will be those system parameters on which the computer operates.

Equation 22 can be rearranged by properly programming the computer to perform the various mathematical operations. For general addition, Equation 22 may be represented by:

$$sZ_1'+R_1=(sZ'_{1-1}+R_{1-1})-sZ'_{1-1}+aT_1'+bW_1'+X_1' \quad (23)$$

where:

$a=U_0$=a constant
$b=V_0$=a constant and both $V_0$ and $U_0$ represent initial conditions. In Equations 22 and 23, $X_1'$ is zero except for three-variable combining operations.

For general multiplication, Equation 22 can be represented by:

$$sZ_1'+R_1=(sZ'_{1-1}+R_{1-1})-sZ'_{1-1}+U_1V_1'+V_{1-1}U_1'+X_1' \quad (24)$$

where:

$$T_1'=V_1'$$

and $$W_1'=U_1$$

For general division, Equation 22 may be represented by:

$$U_1'V_1+R_1=(V_{1-1}U'_{1-1}+R_{1-1})-V_{1-1}U'_{1-1}+sZ_1'-U_{1-1}V_1'+X_1' \quad (25)$$

where:

$T_1'=-V_1'$
$W_1'=-U'_{1-1}$
$s=s$ and $X_1'$ is normally zero

Figure 1:
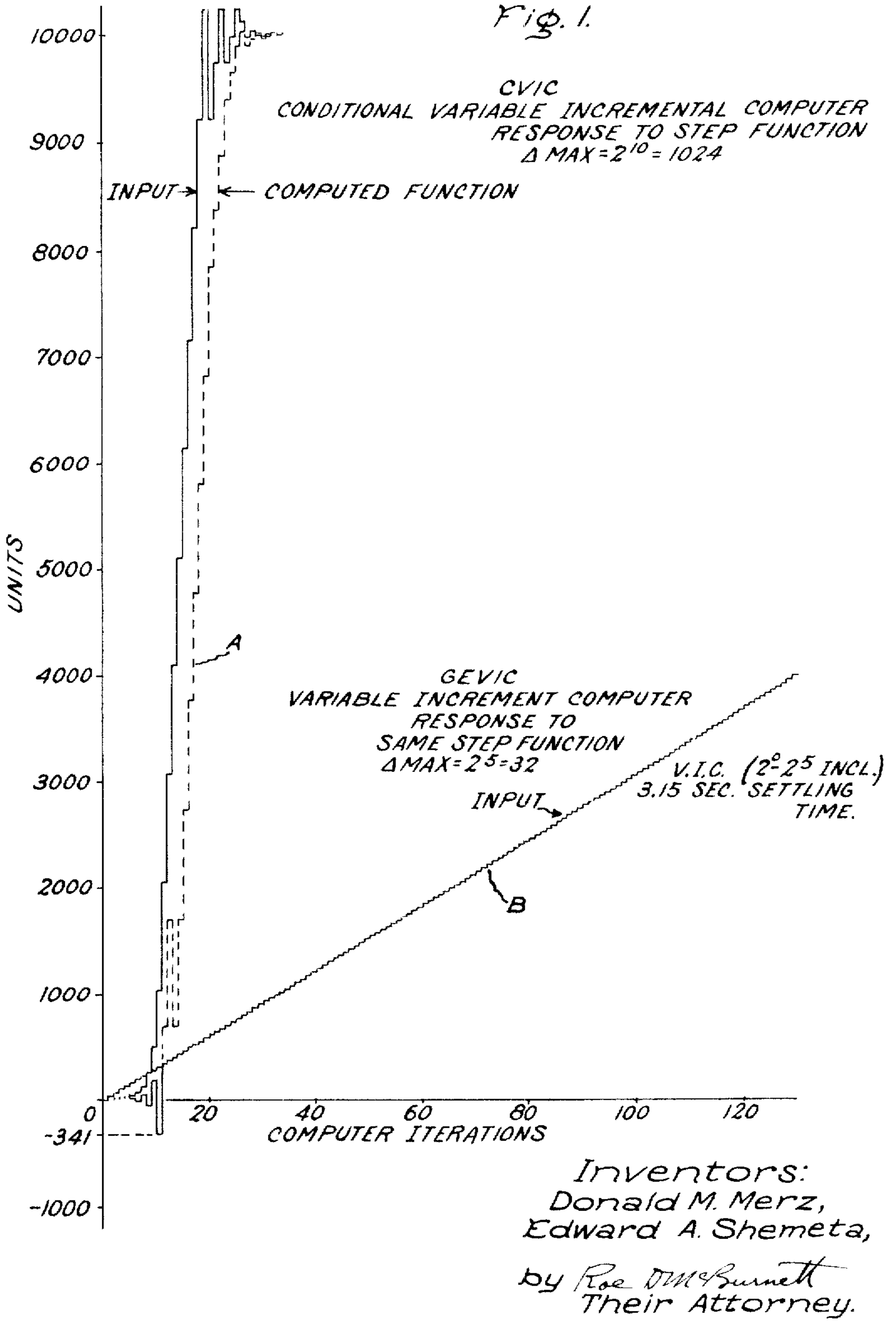
FIGURE 1 is a graphical representation showing the relative response times required for GEVIC and CVIC to slew to a single step input of 10,000 units.

Before proceeding with a description and discussion of the mathematics involved with a conditional variable increment computer, attention is drawn to FIGURE 1 which illustrates the response time required for both GEVIC and CVIC to slew to a single step input of 10,000 units. As will be observed, the "A" curve represents the CVIC operation on a machine mechanized for maximum increments of 1024 whereas the "B" curve represents the GEVIC operation on a machine mechanized for increments of $2^5$.

In the case for CVIC, the increments start off at a very small rate represented by the several dots at the bottom left-hand portion of the "A" curve. However, as the increment magnitude continues to double up to the maximum of $2^{10}$ or 1024, CVIC proceeds in steps of 1024 until it approaches the solution at which time the increments are "knocked down" by a factor of two, i.e. from 1024 to 512, to 256, 128 . . . etc. until the machine settles.

In the case for GEVIC, the "B" curve represents the for maximum increments of 1024 whereas the "B" curve is based on a GEVIC having a maximum increment of $2^5$ (32). As can be seen, GEVIC does not approach the solution as rapidly as does CVIC. Note that the step increases for GEVIC are much less than CVIC.

CVIC starts off at a slower rate and settles "critically damped" or very close to critical damping. GEVIC on the other hand, if it came to within two units of the correct solution, would change from an increment of $2^5$ to an increment of $2^1$. CVIC approaches the solution by going through a magnitude decay process since it can only change by a factor of two between any two cycles.

CVIC VS. GEVIC COMPARISON

To more fully understand the operation of CVIC, a comparison will be made between it and GEVIC. The general algorithm for GEVIC has been derived hereinbefore and is represented by Equation 22:

$$sZ'_i+R_i=R_{i-1}+U_iT'_i+V_{i-1}W_i'+X_i' \quad (22)$$

This algorithm may be further modified by substitution of $\rho_{i-1}-Z'_{i-1}$ for the $R_{i-1}$ term since $R_{i-1}$ is a combined term, its identity $\rho_{i-1}-sZ'_{i-1}$ being mechanized in GEVIC. Therefore, the general algorithm of GEVIC may be written as $$sZ_i'+R_i=\rho_{i-1}-sZ_{i'-1}+U_iT_i'+V_{i-1}W_i'+X_i' \quad (26)$$

To achieve the program efficiency and versatility of GEVIC, a similar algorithm will be chosen for CVIC, namely:

$$sZ_{i'}+R_i=\rho_{i-1}-sZ_{i'-1}+U_iT_{i'}+V_{i-1}W_{i'}+sX_{i'} \quad (27)$$

It should be noted that many alternatives could have been selected, including a conditional variable DDA. Attention is drawn to the fact that both Equations 26 and 27 are identical except that the $X_i'$ term in the CVIC general alogrithm has an "s" factor term before it. This "s" term is the same scale factor as appears before the $Z_{i'}$ term and is employed to simplify the scaling problem in the CVIC programming and improves the computer's ability to do combining operations by allowing common scaling of the X and Z variables.

Both GEVIC and CVIC, Equations 26 and 27 are capable of performing a number of different mathematical operations as noted hereinbefore and disclosed in copending patent application, Serial No. 809,643, filed April 29, 1959 now Patent No. 3,109,090, issued October 29, 1963. The following equations for performing various CVIC mathematical operations are presented, the terms included therein being defined hereinbefore in connection with the GEVIC mathematics:

Addition-subtraction:

$$sZ_{i'}+R_i=\rho_{i-1}-sZ_{i-1'}+U_iV_{i'}+V_{i-1}U_{i'}\pm(sX_{i'}) \quad (29)$$

Multiplication:

$$sZ_{i'}+R_i=\rho_{i-1}-sZ_{i-1}+U_iV_{i'}+V_{i-1}U_{i'}\pm(sX_{i'}) \quad (29)$$

Division:

$$U_i'+R_i=\frac{\rho_{i-1}+sZ_i'\pm(sX_i')-U_{i-1}V_i'-V_{i-1}U_{i-1'}}{V_i} \quad (30)$$

Square root:

$$U_i'+R_i=\frac{\rho_{i-1}+sZ_i'\pm(sX_i')-U_{i-1}U_{i-1'}-U_{i-2}U_{i-1'}}{U_{i-1}} \quad (31)$$

Rectangular integration:

$$sZ_{i'}+R_i=\rho_{i-1}-sZ_{i-1'}+U_it_i \quad (32)$$

Trapezoidal integration:

$$sZ_{i'}+R_i=\rho_{i-1}-sZ_{i-1'}+U_it_{i'}+U_{i-1}t_{i'} \quad (33)$$

Because of the simplified method of selecting the output (or $Z_i'$) increment in CVIC, comparison between GEVIC and CVIC is now made.

GEVIC:

$$\text{Sign } \Delta Z=\text{sign } \rho_i$$

(S is always positive)

Magnitude:

$$\Delta Z=\text{O.I.}\left|\frac{\rho_i}{s}\right|$$

where O.I. is optimum increment (closest to those increments mechanized in the particular GEVIC)

CVIC:

$$\text{Sign } \Delta Z=\text{sign } \frac{\rho}{s}$$

The magnitude of ΔZ is the same for all increments selected during any given cycle and is determined elsewhere.

By requiring that all increments developed during a computer cycle have the same magnitude, and by allowing this magnitude to change *only* by a factor of two between cycles, several advantages are gained over GEVIC:

(1) Increment selector (neglecting the sign of $s$ for the moment . . . this will be examined hereinafter in the detailed examination of the flow of data) consists of a gate for passing the sign of the ρ-term to a random access memory.

(2) Increments are stored as a single bit (binary digit)—regardless of the range over which they are permitted to vary.

(3) There is no coding or decoding of increments.

(4) By limiting the magnitude *change* to a factor of two—and with certain other control to be hereinafter described, multiplication by increments is simplified; a delay of 0 or 1 bit is all that is required. By comparison, GEVIC requires a variable delay—a delay equal in clock pulses to the exponent of the maximum increment mechanized.

(5) There is no wasted time (unused bit positions) between CVIC operations. GEVIC required a gap equal to the power of the maximum increment to allow relative shifting through the increment multipliers.

(6) The maximum increment used in CVIC may be any power of radix-two up to $2^{(n-1)}$, where "$n$" is the number of bits in the length of words used (magnitude bits only). In the embodiment to be more fully described hereinafter, a maximum increment of $2^{13}=8192$ is disclosed.

Other differences between CVIC and GEVIC are noted below:

(1) The Control Unit of CVIC—which determines and controls the increment magnitude, is analogous (in complexity) to the increment selector of GEVIC. However, only one Control Unit is needed vs. three increment selectors (an input or X' selector and two output or Z' selectors) in GEVIC.

(2) For summation of increments in CVIC (U, V, and X increment adders) recognition must be made of current Δ-magnitude. This is accomplished by the $t$-pulse retained in the computer memory (see FIGURE 2) and transposed from one bit position to another as the increment size changes. A counter could be used alternatively.

(3) Both upper and lower Δ-magnitude limits must be set and proper controls developed. Normally the lower limit is $2^0$ and the upper limit is wired as a function of the required problem dynamics. For demonstration, the upper limit is selectable at any integral power $2^0$ through $2^{13}$ (except $2^{12}$). Without these "stops" the computer would try to operate between $2^{(n-1)}$ and $2^{-(n-1)}$ as mentioned previously.

Figure 2:
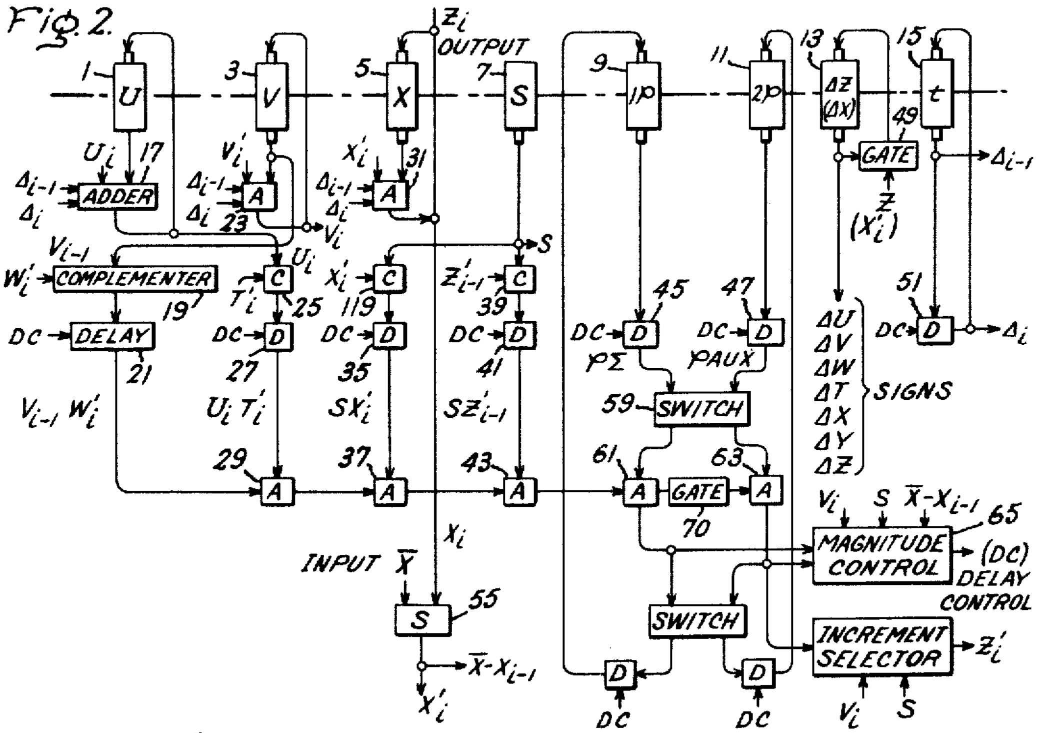
FIGURE 2 is a simplified block diagram of one form of a conditional variable computer illustrating the arithmetic and operating memory registers included therein.

In FIGURE 2 there is shown in simplified block diagram form one embodiment of the subject invention. As shown therein, CVIC includes a plurality of tracks or channels, serial adders, two's complementers and serial subtractors interconnected as shown to produce various outputs for feeding to other portions of the computer. The left-hand portion of FIGURE 2 comprises three basic channels, namely, a U-channel, a V-channel and an X-channel. The U, V and X channels are basically very similar. Each involves addition of increments, multiplication by increments of a full word and output to the summing channel. In the description that follows, particular attention will be made to the X-channel as shown in FIGURES 2 and 3, FIGURE 3 being a more detailed block diagram of one particular channel which may either be the U-channel, the V-channel, or the X-channel.

Figure 3:
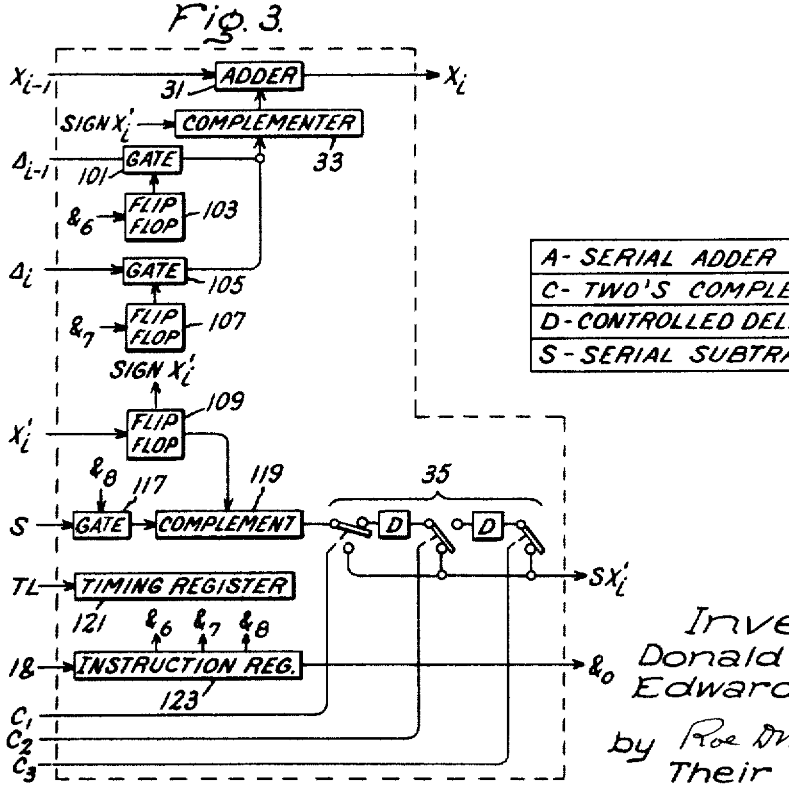
FIGURE 3 is a detailed block diagram of the X-channel arithmetic section included in FIGURE 2.

Referring now to FIGURES 2 and 3, the X-channel consists of an X-track 5, a serial adder or increment summing unit 31, a complementer 33, a controlled or variable delay unit 35 and the associated inputs and outputs as indicated thereon. It will be observed that these same components are included in the U-channel as well as the V-channel. In forming the general algorithm of Equation 27, the outputs of the U, V and X-channels are summed in adders 29 and 37. The output of the Z-channel, which is similar to U, V, and X channels but includes no provision for summing increments, is combined with this sum in adder 43. The new sum combines with the rho term in adders 61 and 63. The Z′ term is then chosen.

As mentioned hereinbefore, the U, V and X-channels are basically very similar. Each involves addition of increments, multiplication by increments of a full word and output to the summing channel. Referring now to FIGURES 2 and 3 and more particularly to FIGURE 3, there is shown at the top the input word $X_{i-1}$ which is the old value of X read from memory X-track 5 that is fed into serial adder 31. The word is updated by adding $X_i'$ before re-recording to the X-track 5. The increment magnitude is derived from *t*-track 15 as shown in FIGURE 2. The *t*-track 15 provides two outputs, namely, $\Delta_{i-1}$ (the old increment) and $\Delta_i$ (the new increment). Both of these increments are fed to the X-channel. Which one of these two increments is to be used will be determined by the program or by an instruction pulse shown in FIGURE 3 as Instruction 6 (&6) and Instruction 7 (&7) coming from the instruction register 123. Whichever of these instructions is available from the progrem, it will gate the appropriate increment into adder 31 via gates 101 or 105 controlled by flip-flops 103 or 107. If Instruction 6 is present, the old increment ($\Delta_{i-1}$) will be added. If Instruction 7 is present, the new increment ($\Delta_i$) will be added. If neither Instruction 6 nor Instruction 7 is presented, no increment will be added and the X value will remain unchanged. (In copending patent application, Serial No. 809,643 mentioned hereinbefore, it will be noted that the variable increment computer in performing the operation of addition, the U and V-channels remain unchanged, the $U_o$ and $V_o$ are scaling on the addition and the only increments involved are the T′ and W′.) The sign of the increment is stored in flip-flop 109 and is used to control the two's complementer 33 at the increment input to adder 31. When a negative increment is to be added, the sign thus functions to complement $\Delta_{i-1}$ (or $\Delta_i$).

The S-term is gated to complementer 119 under the control of a program instruction that is fed into instruction gate 117. In the U or V-channels, this S-term becomes $U_i$ or $V_{i-1}$, respectively. In the multiplication of a word by an increment (FIGURE 3), S is multiplied by the $X_i'$ increment which comes from flip-flop 109 as in the case of addition of the increment. Flip-flop 109 acts as a temporary storage device. It must be remembered that the increments are stored on the memory drum in CVIC and are "looked up" ahead of time and kept until ready for use. In fact, they are actually "looked up" during the word preceding the word in which they are to be used. In this X channel, CVIC programs only plus $SX_i'$. In other channels either plus or minus values may be programmed. The output of complementer 119 is then applied to a delay unit 35 which has a controllable delay of zero, one or two bit times. While the switch is diagrammatically shown as a knife switch to indicate operation, in actuality it is a solid-state or core switch. These "switches" are under external controls, $C_1$, $C_2$, and $C_3$. The controls are determined by whether the increment magnitude has increased, decreased or remained the same and whether the $X_i'$ is old or new.

Which path the product S (sign of $X_i'$) will take through the delay unit is set by (a) whether the increment is old or new, and (b) what manner of change the increment has undergone from $\Delta_{i-1}$ to $\Delta_i$. It will be observed in viewing the delay unit 35, that the short path is the one that bypasses the delay unit completely. The longest path is the one which traverses both of the delay units included in delay unit 35. These delay controls will be described in greater detail hereinafter. Suffice to say at this point, the delay controls are developed in the magnitude control unit 65.

In summary, the operation of the X-channel is as follows: The old value of the X-term is read from the X-channel memory 5 and fed to adder 31. In adder 31 it is updated by the addition of the current increment value. The sign of this increment is addressed from the random access memory previous to the time at which it is to be used. Increment magnitudes are shown at the left (FIGURE 3) as $\Delta_{i-1}$ and $\Delta_i$. These old and new increment magnitudes are obtained from *t*-track 15. Both increments, namely, the old and the new increment magnitudes are available. Which, if either, of the two magnitudes is to be used is determined by the presence of either &6 or &7. Instruction 6 or Instruction 7 will open gates 101 or 105 and allow the increment magnitude to be read into the complementer 33. If the increment is negative, the sign of $X_i'$, which was looked up previous to this addition operation, entering the complementer will subtract the instructed Δ from $X_{i-1}$ rather than adding it. The same increment which enters flip-flop 109 and then branches to complementer unit 33 is used to control the multiplication of S to form the product $SX_i'$. The $X_i'$ as mentioned hereinbefore is looked up ahead of time and saved in flip-flop 109. The $SX_i'$ term then passes through the variable delay unit 35 and, under control of $C_1$, $C_2$ or $C_3$, the $SX_i'$ term will either pass without being shifted or will be shifted left or right one bit position depending on whether the $X_i'$ increment is old or new and whether its magnitude is increased or decreased over that of the previous cycle. The timing register 121 and the instruction register 123 are used for internal control and are duplicated in each of the three channels, namely, the U, V and X-channels. A specific embodiment of interconnection of these units will be described in detail at a later point.

Timing register 121 controls the sequence of data through the unit since not everything occurs at the same time. It is to be observed that in core-diode mechanization there is a one and a half clock pulse delay through an adder unit, a one clock pulse delay through a complementer unit, etc. In a transistorized mechanization, there is only a fraction of a clock pulse delay. In the process of addition, to prevent such things as a carry developed in forming a sum from propagating across the one-bit gap present between words, it is necessary to clear the gap. Therefore, one branch of the timing register is devoted to clearing the gap. Timing register 121 is, in essence, a shift register through which a single pulse propagates during each word. It is used to define the beginning of a word; the timing pulse is in coincidence with the $2^0$ bit of the word (or one bit following the gap).

Instruction register 123 functions to provide the various program pulses which modify operation within the individual channels. The instruction register associated with a given channel has both an input and an output. This is because the separate channels are in parallel (the X-channel which has been discussed hereinbefore is in time coincidence with the U and V-channels) and it is desired to obtain instructions from a single drum track. The individual channel-registers are really a serial combination so that the instruction track feeds control pulses into the U-channel. From the U-channel they are fed into the V-channel and from the V-channel they are fed into the X-channel, etc. This will be more fully explained in connection with the core-diode logic (FIGURE 9) that has been developed for this computer.

In one embodiment, the U, V and X-channels are mechanized with core circuits. Other than the Z-channel, which is basically very similar to the U, V and X-channels with the exception that no summation of increments takes place, the remainder of the computer circuits are mechanized with transistor logic. Thus, the switching associated with the rho tracks 9 and 11, etc. are all transistorized.

In FIGURE 2 there is shown in simplified diagram form a pair of rho tracks, namely, one-rho track 9 and two-rho track 11 with associated delay units 45 and 47, switch 59 and serial adders 61 and 63. It is to be noted that the rho tracks are actually double length and will be discussed in greater detail hereinafter. At this point in the discussion, it is desirable that the conditional variable increment concept as disclosed in the subject patent application be described in greater detail.

CONDITIONAL VARIABLE INCREMENT CONCEPT

Briefly stated, CVIC gains its simplification over GEVIC as disclosed in patent application, Serial No. 809,643, filed April 29, 1959, now Patent No. 3,109,090, issued October 29, 1963, by using the same magnitude for all increments during a computer cycle and by allowing a change in increment magnitude between cycles by no greater a factor than two. The ramifications of this concept can be seen by analyzing the basic algorithm:

$$SZ_i'+R_i=\rho_{i-1}-SZ_{i-1'}+U_iT_i'+V_{i-1}W_i'+SX_i' \quad (27)$$

The following items are immediately apparent and hold for either GEVIC or CVIC:

(1) Increments are summed in U and V adders.

(2) Full length words are multiplied by T′, W′, X′ and Z′ increments.

(3) Each computer cycle starts at a fixed point in the memory and lasts until all operations have been performed and this fixed point is again reached (defined by a single reference pulse, SP). Depending on the algorithm being performed at any given instant, the increment variables $U_i'$, $V_i'$, $W_i'$, $T_i'$, $X_i'$ may have been calculated during the present or previous cycle. Thus, for the first operation of the cycle, all increments were computed in the previous cycle; for an intermediate operation some increments may be old and others new. Their magnitudes may differ therefore by no more than a factor of two within an algorithm.

Assuming, for the moment, that all variables are new and, under the CVIC concept, have the same increment magnitude, $\Delta_i$, Equation 27 can be rewritten as:

$$S(\text{Sign } Z_i')+\frac{R_i}{\Delta_i}=\frac{\rho_{i-1}}{\Delta_i}\pm S(\text{Sign } Z_{i-1}')\frac{\Delta_{i-1}}{\Delta_i}$$
$$\pm U_i(\text{Sign } T_i')\pm V_{i-1}(\text{Sign } W_i')+S(\text{Sign } X_i') \quad (34)$$

At this time the $$\frac{\Delta_i-1}{\Delta_i}$$

factor on $Z_{i-1'}$ will be neglected because it is never more than 2 or ½ but will be considered in a later discussion. During the following $(i+1)$th cycle, Equation 34 will be:

$$S(\text{sign } Z_{i+1}')+\frac{R_{i+1}}{\Delta_{i+1}}=\frac{\rho_i}{\Delta_{i+1}}\pm S(\text{Sign } Z_i')$$
$$\pm U_{i+1}(\text{sign } T_{i+1}')\pm \text{etc.} \quad (35)$$

(a) For the case where no change in increment magnitude has taken place, $\Delta_{i+1}=\Delta_i$ and Equation 35 reduces to:

$$S(\text{sign } Z_{i+1'})+\frac{R_{i+1}}{\Delta_{i+1}}=\frac{\rho_i}{\Delta_i}\pm S(\text{sign } Z_i')$$
$$\pm U_{i+1}(\text{sign } T_{i+1'})+\text{etc.} \quad (35a)$$

(b) If increment size has increased by a factor of two, $\Delta_{i+1}=2\Delta_i$ and Equation 35 becomes:

$$S(\text{sign } Z_{i+1'})+\frac{R_{i+1}}{\Delta_{i+1}}=\tfrac{1}{2}\left[\frac{\rho_i}{\Delta_i}\pm S(\text{sign } Z_i')\right]$$
$$\pm U_{i+1}(\text{sign } T_{i+1'})\pm \text{etc.} \quad (35b)$$

(c) And if the increment size has decreased by a factor of two, $\Delta_{i+1}=\tfrac{1}{2}\Delta_i$:

$$S(\text{sign } Z_{i+1'})+\frac{R_{i+1}}{\Delta_{i+1}}=2\left[\frac{\rho_i}{\Delta_i}\pm S(\text{sign } Z_i')\right]$$
$$\pm U_{i+1}(\text{sign } T_{i+1'})\pm \text{etc.} \quad (35c)$$

Thus, rather than shifting the four independent quantities to multiply them by increments, the residue term ($\rho$) is shifted in the opposite direction. From the foregoing discussion, several rules can be established.

*Rule 1.*—Each time the increment magnitude is increased by a factor of two, the contents of the residue register is shifted one bit to the right (mulitiplied by ½). Each time the increment magnitude is decreased by a factor of two the residue is shifted one bit to the left (multiplied by 2).

Remembering that some of the multiplying increments may be old and others new (calculated during present or preceding computer cycle), this must be taken into account during shifting:

*Rule 2.*—If a term-increment ($T_i'$, $W_i'$, $X_i'$, or $X_i'$, or $Z_i'$) is old, calculated during the preceding cycle, this term must be shifted in the direction of and by an amount equal to that which $\rho$ is shifted *during* that cycle, i.e. the shift of the terms is never more than one bit position.

Change in increment size must also be taken into account in summing increments in the U and V registers. This may be done in any of several ways. In FIGURE 2 there is shown one embodiment in which the control employed makes use of a $t$-pulse, stored in a register 15 of the memory and shifted between computer cycles so that its position always indicates the current increment size. Dual $\rho$-tracks 9 and 11 are required. Through the combined effect of slewing and the use of non-safe scaling, the residue term may be expected to build up (under slew conditions) and even, in some cases, exceed a one-word length. (Safe-scaling is defined as the selection of each scale factor, S . . . (see Equation 27), such that it will absorb a maximum change of all independent variables without increasing the residue term, R.) How much excess is required is multi-factored but $\rho$ will never approach a double word length. Thus, insurance against overflow and loss of data is accomplished by using double length $\rho$ words. In FIGURE 2 there is shown two memory registers 9 and 11 (1$\rho$ and 2$\rho$).

The terms discussed hereinbefore, i.e. $U_iT_i'$, $V_{i-1}W_i'$, $SX_i'$, $SZ_i'$ are summed. For discussion purposes here and in a detailed data flow examination later, this sum will be defined as sigma:

$$\Sigma_i=U_iT_i'+V_{i-1}W_i'+SX_i'-SZ_{i-1}' \quad (36)$$

and $$\rho_i=\Sigma_i+\rho_{i-1}=SZ_i'+R_i \quad (37)$$

in full agreement with Equations 27, 34 and 35. The $\Sigma$ term is added alternately to the two $\rho$-registers— odd numbered $\Sigma$ added to 1$\rho$ and even numbered to 2$\rho$.

The increment to be selected from an examination of $\rho_i$ will have the magnitude:

$$|Z_i'|=\Delta_i$$

where $\Delta_i$ is fixed for the entire $i$th cycle and determined during the previous cycle.

The sign of the increment is a function of $\rho_i$ and of S (or for the indirect operations, of $V_i$):

Direct operation:

$$\text{Sign } Z_i' = \text{Sign } \rho_i \oplus \text{ sign } S \quad (38a)$$

Indirect operation:

$$\text{Sign } U_i' = \text{Sign } \rho_i \oplus \text{ sign } V_i \quad (38b)$$

where $\oplus$ means "Exclusive-OR" and signs are $+=0$ and $-=1$. (For square foot operations, $U_i'$ is a function also of an instruction pulse, introduced to insure that the positive square-root is determined.)

During the $i$th cycle the value of $\Delta_{i+1}$ . . . the increment magnitude for the $(i+1)$th cycle, will be determined. It will be based on the current rates of all input variables and of specified dependent variables (i.e. those internal in the computer). Briefly, when the computer starts to lag the inputs (as in responding to a step input), the control will cause the increment magnitude to double on succeeding cycles until the computer catches up or runs into a $\Delta_{max}$ stop.

With non-safe scaling $\rho$ may be expected to build up. After the computer catches up with the inputs this $\rho$-value may continue to dictate large $\Delta$'s until $\rho$ too is "knocked-down." When the computer approaches a solution the value of $\Delta$ will be decreased by a factor of 2 on succeeding cycles until settled.

The rules for determination of $\Delta$ are applied to each of the control variable. Considering an internal control variable:

(1) Examine—

Direct Operation:

$$\nabla Z = \left|\frac{\rho_i}{\Delta_i \cdot S}\right| \quad (39a)$$

Indirect Operation:

$$\nabla Z = \left|\frac{\rho_i}{2\Delta_i \cdot V_i}\right| \quad (39b)$$

where the factor 2 was arbitrarily chosen for additional safety in one embodiment but is not essential.

(2) Operate on $\Delta$—

(a) Increase:

$$(\Delta_{i+1} = 2\Delta_i) \text{ if } VZ \geqslant 2^{\epsilon}$$

(b) Decrease:

$$(\Delta_{i+1} = \tfrac{1}{2}\Delta_i) \text{ if } VZ < 2^1$$

(c) Use same:

$$(\Delta_{i+1} = \Delta_i) \text{ if } 2^1 \leqslant VZ < 2^{\epsilon} \quad (40)$$

where $\epsilon$ was made selectable in one embodiment with values of one, two, or three.

For input variables the difference $(\overline{X} - X_{i-1})$ is formed in the process of selecting the new input increment $X_i'$. (See FIGURE 2.) This difference is examined in determining $\Delta_{i+1}$:

(3) Examine—

$$\nabla X = \left|\frac{\overline{X} - X_i}{\Delta_i}\right| \quad (41)$$

(4) Operate on $\Delta$—

Increase:

$$(\Delta_{i+1} = 2\Delta_i \text{ if } \nabla X \geqslant 2^2 \quad (42)$$

The results of relations (40) and (42) are "OR-ed" for all control variables during the cycle. The final result is used during the next or $(i+1)$th cycle:

(5) Operate on $\Delta$—

(a)

$$\Delta_{i+1} = 2\Delta_i \quad (43a)$$

if ANY increase order (b)

$$\Delta_{i+1} = \Delta_i \quad (43b)$$

if NO increase and NO decrease orders (c)

$$\Delta_{i+1} = \tfrac{1}{2}\Delta_i \quad (43c)$$

if ALL decrease orders

The commands are used to control shifting of $\rho$'s, $t$, and the product terms $U_iT_i'$, $V_{i-1}W_i'$, $SX_i'$, and $SZ_{i-1}'$. For these product terms the commands of relation (43) must be combined with instruction pulses to effect the control described hereinbefore. Also, for $\rho$ in the case of trapezoidal integration, the shifting is modified.

Input and output quantities are handled on the X-register. A third increment accumulator—identical to those used to sum U and V increments, is included in the X-channel. This is used to accumulate the output quantities, $Z_i$, and the incremental approximations to the inputs, $X_i$.

Increments of the input quantities are summed:

$$\sum_{0}^{i-1} X_n' = X_{i-1}'$$

and this is compared with the digitized input quantity $\overline{X}$. The difference $(\overline{X} - X_{i-1})$ is used to determine the new input increment $X_i'$. The increment is stored to the increment memory where, along with the $X_i'$ and $U_i'$ increments of internal operations, it is made available to the program.

Those calculated ($Z'$ and $U'$) increments which comprise output variables, may be summed and sent out of the computer as $Z_i$. (See FIGURE 2.)

CVIC LOGICAL BLOCK DIAGRAM AND ALGORITHM DEVELOPMENT

In FIGURES 4*a*, 4*b*, 4*c* and 4*d* there is illustrated one embodiment of the conditional variable increment computer in logical block diagram form. As shown therein, FIGURES 4*a*, 4*b*, 4*c* and 4*d* are divided into a number of a "sub-units" which will be described separately although these sub-units may be referenced directly to the general algorithm. These "sub-units" are broken down into a U-channel, Block I; a V-channel, Block II; and X-channel, Block III; a Z-channel, Block IV; a Sigma Unit ($\epsilon$), Block V; a Rho ($\rho$) channel, Block VI; a $t$-loop, Block VII; an $s$-channel, Block VIII; a magnitude control, Block IX; a Multiplier Control Unit, Block X; an Increment Selection and Distribution Unit, Block XI; an Input-Output Control, Block XII; and a Generalized Control, Block XIII. These "sub-units" will be reviewed in conjunction with a specific problem applied to CVIC.

*The U-channel (Block I)*

Figure 4A:
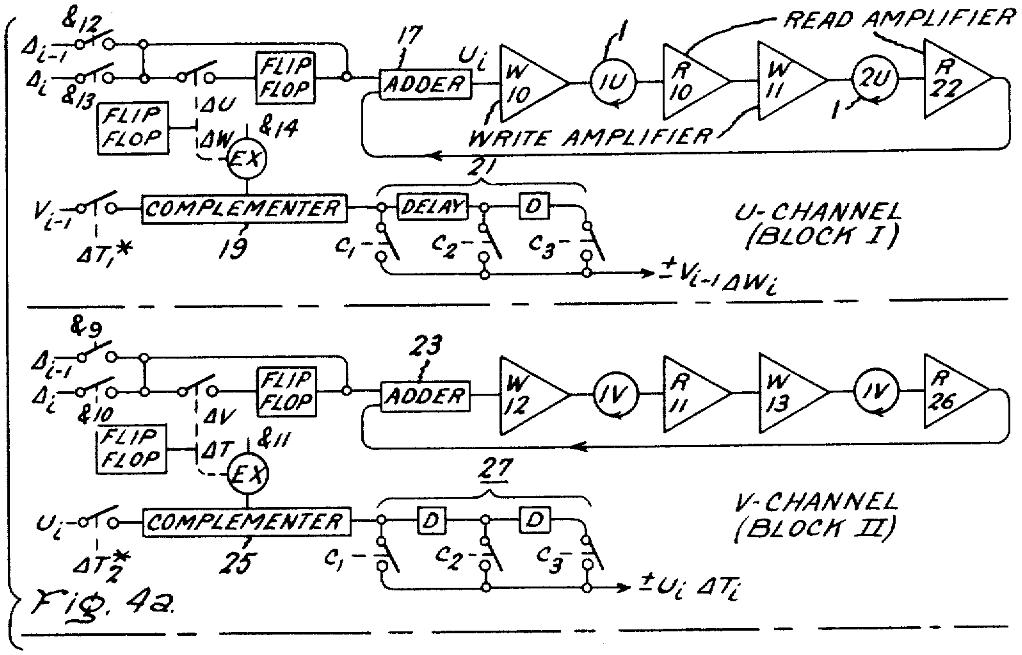

The U-channel is shown in the upper portion of FIGURE 4*a*. The functions that are to be performed in the U-channel are:

(1) The summation of increments which are stored to the U-channel, tracks 1-U and 2-U; and (2) the development of the incremental product $$(\pm V_{i-1}W_i')$$

As mentioned hereinbefore, the sign $\Delta$ is obtained from the increment memory; if located ahead of time (during the operation preceding the one in which it is used), it is buffered in a flip-flop. The increment is identified as follows:

Addition-subtraction:

$$\Delta = W' \; (U' = 0)$$

Trapezoidal integration, etc:

$$\Delta = U' \; (W' = dt)$$

Multiplication, division, square root, etc.:

$$\Delta = U' = W'$$

It will be observed that both the summing of increments and the development of the incremental product are combined in one channel. The increment ΔW or ΔU is in all cases (with the exception of integration) either the same for both the U-adder and the VΔW multiplier or one is used and not the other. Thus, in the operation of addition, a scale factor is written on the U track and ΔU is not used. The ΔW is the only increment input to the U-channel for addition, while in a multiplication operation, the increment ΔW is the same as ΔU.

As is shown in FIGURE 4*a*, &12 and &13 control the introduction of the increment to the U-adder. The magnitude is derived from the *t*-loop (Block VII) of FIGURE 4*b* (as $\Delta_{i-1}$ or $\Delta_i$, where $\Delta_i$ represents the current increment magnitude and $\Delta_{i-1}$ the preceding increment magnitude). Sign and magnitude are combined and added to the old value of U (from memory) under control of &12 and &13. One of these instructions is used for all operations except addition or subtraction and identifies Δ as U′, an increment to be added to U. It should be recalled that under the CVIC concept, all increments selected during a cycle have the same magnitude. But, as a cycle is defined with reference to a fixed point, the increments used in a particular operation may have been selected in either the present cycle (*i*th) or in the preceding cycle (i–1st). Thus, if &12 is programmed, the old increment magnitude will be used; if &13 is programmed, the new increment magnitude will be used; if neither is programmed, as in the case of the addition operation, no increment will be added to U.

The magnitude pulse is fed directly to adder 17 and is also combined with the increment bit ΔU. This combination is held in a flip-flop if ΔU is a one (if the increment is negative). The effect is to provide repeated ones as input to the adder for negative quantities. In effect, this develops a 2's complement of the increment for negative increment input. The up-dated $U_i$ is returned to the memory on the 1-U track. The increment multiplier, in which V is to be multiplied by ±Δ, includes in one embodiment a controlled complementer 19, a variable delay 21 (zero or one bit) and suitable gating means. &14 is used in the increment multiplier. The increment is "exclusive-OR'ed" with &14 when present. The output of this combination of the increment &14 is then fed to control the complementer. The other input to complementer 19 is $V_{i-1}$ which may be gated-off by $\Delta T_1$*. ($\Delta T_1$* is used to designate a logical control.)

It should be observed from the list of algorithms (Equations 27 to 33) that the negative product is used (&14 is programmed) for division, square-root, subtraction, etc. The $V_{i-1}$ input to complementer 19 may be gated-off by $\Delta T_1$* where this control is an increment from memory but is different than the ΔU, ΔW increment. Suffice it to say at this time, the ΔT* increments are used for logical-switching functions and will be described in greater detail when the logical controls are discussed.

The output of the complementer is fed through a variable delay unit 21. As shown in FIGURE 4*a* there are three gates with controls $C_1$, $C_2$ and $C_3$. Which path the $(V_{i-1})\times(\text{sign } \Delta W)$ will follow through this delay unit is determined by the past history of the increment ΔW. The normal path is through the $C_2$ gate, the mid path. The short path via $C_1$ is used in the case where (a) the increment magnitude has increased since the preceding cycle and (b) the increment ΔW was computed in the previous cycle. The longer path through $C_3$ is taken (a) when the increment was computed in the preceding cycle and (b) hte magnitude has decreased. Unless otherwise specified, the same logic will hold for the delay units in the other multipliers. The final output is shown as $\pm V_{i-1}\,\Delta W_i$. The ± sign is included because of the effect of &14.

*The V-channel (Block II)*

Immediately below the U-channel in FIGURE 4*a*, there is shown the V-channel (Block II). It is to be observed that the V-channel is mechanically and functionally identical to the U-channel with Instructions 9, 10, and 11 which are analogous to Instructions 12, 13 and 14, respectively. The quantities that are formed in the V-channel are (1) the summation of V′ increments, $V_i$, and (2) the increment product $\pm U_iT_i'$ or $(\pm U_i\Delta T_i)$. The $\Delta T_2$* is shown gating the V-channel and is used for logical switching in this unit. If used, it is programmed (by logical control) as the complement of $\Delta T_1$*. Both $\Delta T_2$* and $\Delta T_1$* are derived either from the input operations or from output operations of earlier algorithms in the cycle and addressed from the increment memory. They are used as logical switches on the channels.

*The X-channel (Block III)*

Figure 4D:
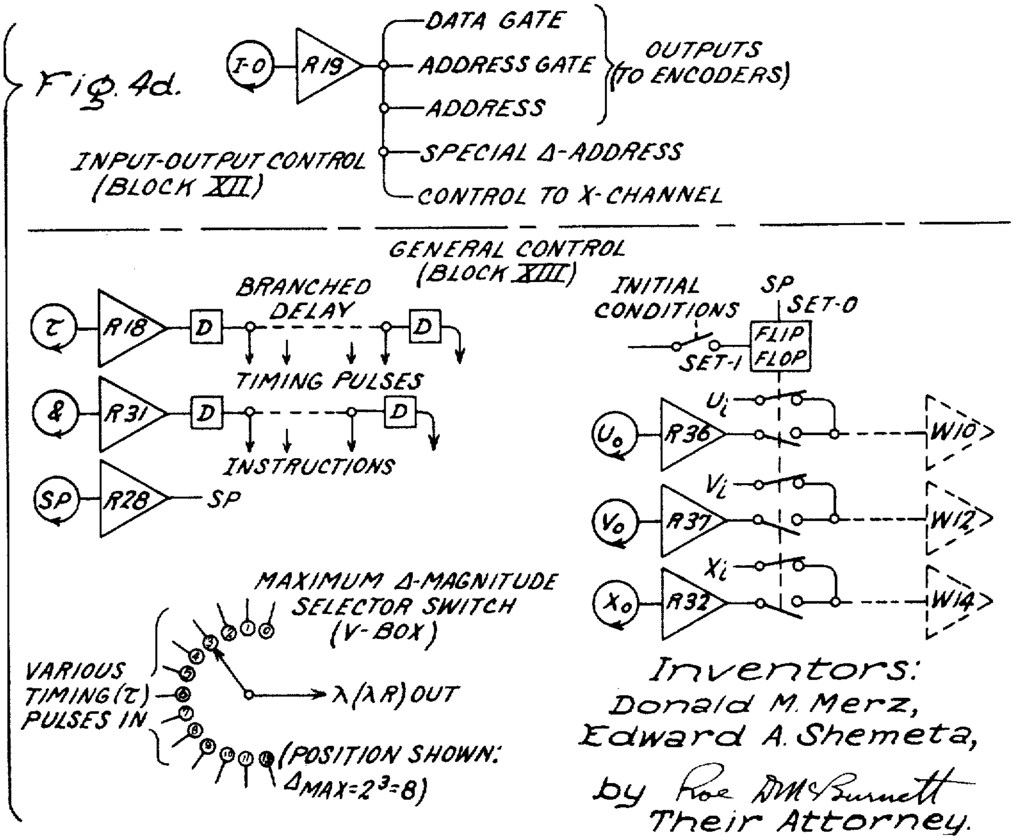
Figure 4B:
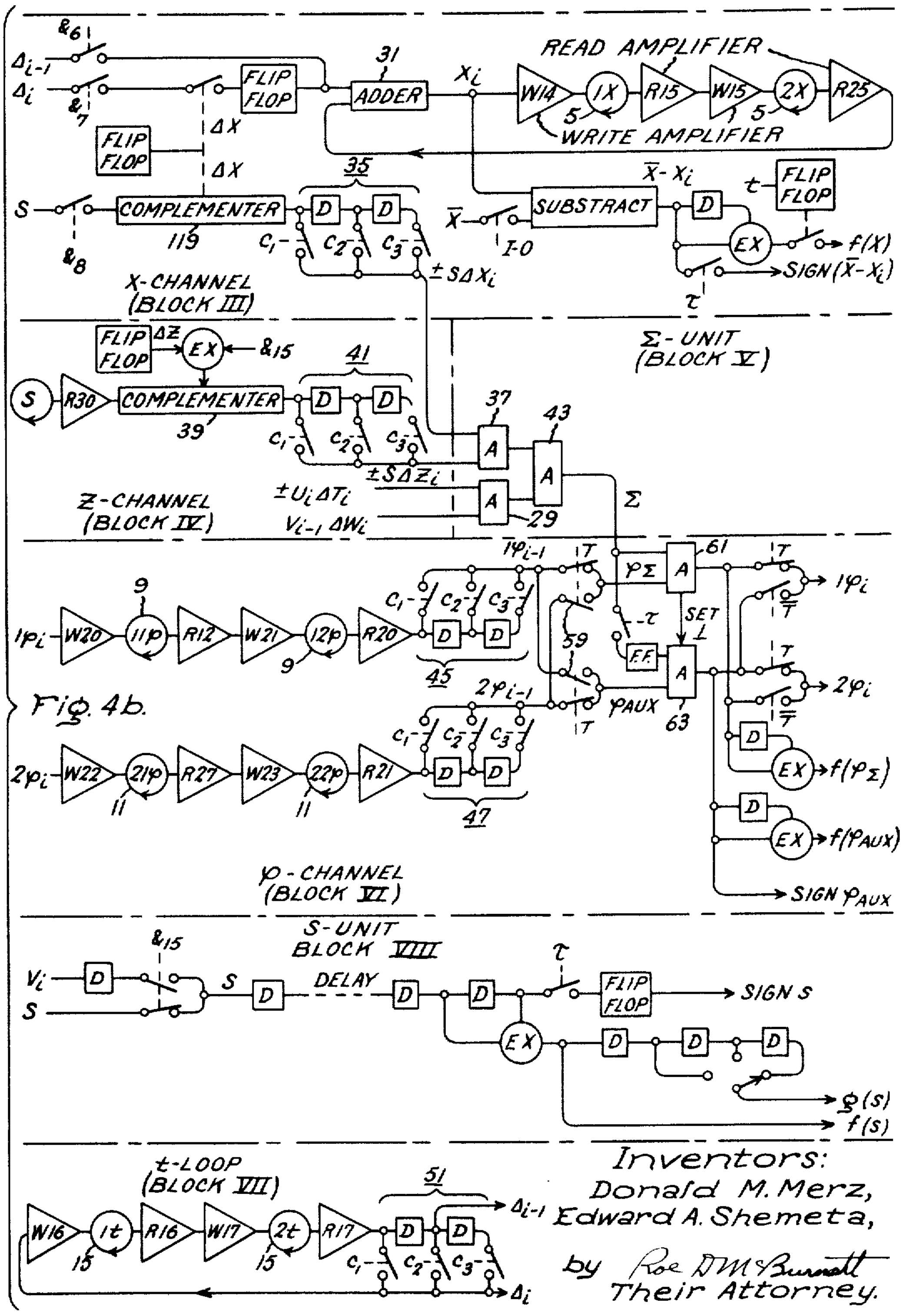

In FIGURE 4*b*, the X-channel block is shown immediately below the V-channel block. It will be recalled that the X-channel has been previously described in some detail in connection with the description of FIGURE 3. The X-channel is basically identical to the U- and V-channels but contains different provision for gating and also includes the mechanism for handling input and output whole-word quantities. The programmable functions contained in the X-channel include (1) summation of X′ increments, $X_i$; (2) increment product, $SX_i'$; (3) word output to external devices, $X_i$; and (4) comparison of accumulated $X_{i-1}$ with binary-coded input $\overline{X}$, determination of input increment $X_i'$, and initiation of magnitude control as a function of input data. It will be observed, that there is no provision for complementing $SX_i'$ by instruction, since this ability is provided in all of the other channels and is not necessary for inclusion in the X-channel. Distinctions between the X-channel and U- and V-channels are that in the X-channel use is made of &8 rather than a ΔT* function to gate-off the S input to the multiplier, and that included in the X-channel are means for handling inputs and outputs from this channel.

Output quantities are accumulated on the X-track and gated to the proper output device by the address written on the Input-Output (I-O) track. The increment approximation to an input function is also accumulated on X. It is compared subtractively to the input $\overline{X}$ quantity which is a binary-coded word developed external to the computer and the new increment selected as the sign of the quantity $\overline{X}-X_i$. The ΔX is processed elsewhere within the computer and will be described hereinafter. It is also to be observed that a secondary output, $f(x)$, is gated by the *t*-pulse so that an output $f(x)$ will only be available where the input quantity $\overline{X}$ differs from the incrementally accumulated approximation $X_{i-1}$ by more than four times the current increment magnitude. The $f(x)$ is used in the increment magnitude control and will be further described hereinafter. As mentioned above, input and output terms are controlled by the I-O unit (Block XII shown in FIGURE 4*d*). Among other functions, this includes the necessary gating in the X-unit. Any of the up-dated terms $X_i$ may thus be gated out. Similarly, they may be supplied as the minus-input to a subtractor for comparison with the input quantities, $\overline{X}$.

Input or ΔX increments are determined as:

$$\text{Sign } X_i' = \text{sign } (\overline{X} - X_{i-1})$$

Magnitude$=|\Delta_i|$ which is fixed for all increments selected during this *i*th cycle.

For magnitude control, the only action of input variables in this embodiment is to force an "Increase Δ-Magnitude" whenever the computer lags the input-rates. The difference $(\overline{X}-X_{i-1})$ is compared with current Δ-magnitude as follows:

(1) Successive bits of $(\overline{X}-X_{i-1})$ are "Exclusive-OR'd";
(2) The result of (1) is gated, starting with $K\Delta_i$, directly to the magnitude control unit as an Increase-signal.

In one embodiment, a value of 4 was used for K. For noisy inputs this may be increased; however, a lower value is not reasonable. For example, if we let $$\overline{X}-X_{i-1}=(00110)_2=(+6)_{10},\ \Delta_i=00010.=(+2)$$

and $4\Delta_i=01000.=(+8)$. Obviously the $4\Delta_i$ comes too late to gate an Increase-signal. The following table represents a second example where $\overline{X}-X_{i-1}=01110.$ (+14) and $4\Delta_i=01000.$ (+8):

| Time | $\overline{X}-X_{i-1}$ Digits | Output of "Ex-OR" | Output gated by $K\Delta_i$ |
|---|---|---|---|
| 1 | 0. 0 | 0 | 0 |
| 2 | 10. | 1 | 0 |
| 3 | 11 | 0 | 0 |
| 4 | 11 | 0 | 0 |
| 5 | 01 | 1 | 1→"Increase Δ" |

In this latter example and with reference to the table shown above, please note that as the new increment $X_i'$ has not yet been determined, the above comparison does not use the latest data. It would be better to use $(\overline{X}-X_i)$ if it were available. Using older data means that the difference is too large (as $X_i'$ will always be chosen so as to decrease this differensce). The $K=4$ factor takes this effect into account. Thus, in the above examples, the difference-inputs are in the first example 4 and in the second example 12. With current Δ-magnitude of 2, it is seen that doubling this would cause X to over-shoot in the first example (because of the manner in which magnitude decreases subsequently). But such increase is desirable in the second example mentioned above.

While there has been described one method of control to be used in certain applications, an alternate method of control could be to base Δ-magnitude only on input quantities. This approach would necessitate a "Decrease" signal in addition to the above generated "Increase" but, overall, the computer would become greatly simplified. In such an alternate embodiment, all internal computer operations would now be scaled so as to keep up with input rates; if computed solutions had not settled when inputs returned Δ to unity, final settling would have to be done using fixed (unit) increments and the resulting system would be sluggish.

*The Z-channel (Block IV)*

The Z-channel is shown in FIGURE 4*b* immediately below the X-channel described hereinbefore. This channel is similar to the multiplier of the preceding three channels but lacks a summing loop. It should also be observed that there is only one instruction used in this channel, to control the sign of the increment product $SZ_i'$. In direct operations such as addition and multiplication, the negative product $-S\Delta Z$ is used. In feedback operations, such as division or square-root, the $\Delta Z$ is an input and it is desirable to have $+S\Delta Z$. It is also to be observed that no provision is made for gating off the $SZ'$ channel.

In an alternate embodiment (shown in FIGURE 9), means may be provided for employing $-S\Delta Z$ only. This method would require the storage of the term $-S$ for feedback operations and $+S$ for direct operations. The increment control of the complementer would then be to complement S if the increment is positive and not complement S if the increment is negative. The instruction 15 could then be eliminated.

*The sigma unit (Block V)*

The signal unit comprises three adders as shown in FIGURE 4*b* or in an alternate embodiment may comprise one four-input adder. The four outputs from the multiplier stages of the U, V, X and Z-channels are combined in the Sigma-unit so that there is obtained the following equation:

$$\Sigma=\pm U\Delta T+V\Delta W+S\Delta X\pm S\Delta Z$$

Because of the shifting that has taken place in some of the term-multipliers in the U, V, X or Z-channels, some data may be shifted one bit right (toward lesser significance) into the one bit gap which heretofore existed between successive words. Therefore, no gap exists between words into or out of the Sigma-unit. Two outputs are obtained from the Sigma-unit, namely, $\Sigma_i$ and Sign $\Sigma_{i-1}$ which are provided as inputs to the Rho-unit to be described hereinafter.

*The rho (ρ) channel (Block VI)*

Reading from memory 1ρ and 2ρ, the terms are organized to form ρ-Sigma and ρ-auxiliary, operated on, and finally the new 1ρ and 2ρ terms are recovered. The functions performed in the Rho-unit are (1) summation with the output from the Sigma unit; (2) output to the increment selector; and (3) output to the magnitude control unit.

The reason for separating the rho-terms into rho-sigma and rho-auxiliary is to simplify combination and examination within the computer. Rho-sigma is that portion of the double length rho-word which lies in parallel with Sigma (i.e. with the output of the four multipliers) and to which $(\Sigma_i)$ is added. Rho-auxiliary includes the remaining portions of the double length rho word: (1) the portion preceding rho-sigma, which is present when increments larger than $2^0$ are being used and having resulted from rho being shifted to the right (toward lesser significance) and (2) the more significant portion of rho-resulting from building-up a residue value which overflows the normal word length. This is illustrated in FIGURE 5*b*. Repeated sign bits (of Sigma) are generated and are added to the more significant part of ρ-auxiliary. This is accomplished with a (Sign) hold-flip-flop at the input to the ρ-auxiliary adder. Overflow of the rho-sigma summation is identified by the presence of a "carry," in the sigma adder, at the end of Sigma. Any such carry is transferred, as shown, as a "set-one" to the carry-flip-flop of the ρ-auxiliary adder. The outputs of the adders are then reorganized and stored to the rho track as the new $\rho_i$.

The ρ-multipliers, at the input to the rho unit (Block VI) are quite similar to the multipliers in the four channels described hereinbefore. A difference is that no increment is involved in determining the delay. In the rho unit, the controls are a function of the increment magnitude history only. $C_1$, the short path, is taken if increment magnitude has increased over that of the previous cycle. $C_2$ is the path for an unchanged magnitude and $C_3$ the path for a decrease in increment magnitude. (While not shown in the logic diagram, in one embodiment provision may be made for overriding the path controls (using an instruction pulse) for trapezoidal time-integration, smoothing, etc. For these types of mathematical operations, rho will always take the middle path (not to be shifted).)

The controls on the two rho multipliers are exactly alike with the exception that, due to the overlap of rho-words (i.e. by half of a rho-word or one normal word length) see FIGURE 5*b*, the two sets of controls must be introduced one normal word apart at the start of an operational cycle. The T-term used in splitting and reconstituting the rho-terms is held for one word-length on alternate words, and is generated from the control pulse Tau. The outputs of the rho-sigma $$(\rho_\Sigma)$$

and rho-auxiliary $(\rho_{aux.})$ adders are each examined by exclusive-ORing successive bits to develop $$f(\rho_\Sigma)$$

and $f(\rho_{aux.})$ which are similar to the $f(x)$ term explained hereinbefore and which will be used in the increment magnitude control unit.

It is to be emphasized that one effect of increasing increment magnitude in CVIC is the accumulated shifting of the rho-terms. Each time $\Delta$ is increased by a factor of two, the rho-terms (except for operations involving fixed-increment time, *dt*) are shifted right towards lesser significance, one bit position. The shifts may accumulate over a number of cycles to a predetermined maximum which is equal to the exponent of the maximum allowed increment. At any instant, the new $\rho_i$ term includes a shift equal to the exponent of $\Delta_i$ so that it is divided by $\Delta_i$ as indicated in derived Equations 34 and 35. (See also FIGURE 5*a*.)

In an alternate embodiment of this invention, shifting of $\rho$-terms may be performed in two stages. To more fully describe this method of shifting of $\rho$-terms, reference will be made to Table I below entitled "Multiplier Shifting." This table summarizes both the elementary system described above and the alternate embodiment. For the latter, the $\rho$-delay is accomplished in two steps, $\rho_1$ and $\rho_2$.

TABLE I.—MULTIPLIER SHIFTING

| System | Increment History | | | | | | Required Multiplier Delay | | |
|---|---|---|---|---|---|---|---|---|---|
| | $\Delta_i=2\Delta_{i-1}$ | | $\Delta_i=\Delta_{i-1}$ | | $\Delta_i=\frac{1}{2}\Delta_{i-1}$ | | Δ-Terms | $\rho_1$ | $\rho_2$ |
| | New | Old | New | Old | New | Old | | | |
| Elementary System | X | | | | | | 1 | 0 | None |
| | | X | | | | | 0 | 0 | None |
| | | | X | | | | 1 | 1 | None |
| | | | | X | | | 1 | 1 | None |
| | | | | | X | | 1 | 2 | None |
| | | | | | | X | 2 | 2 | None |
| Alternate System (without dt) | X | | | | | | 1 | 0 | 0 |
| | | X | | | | | 0 | 0 | 0 |
| | | | X | | | | 1 | 1 | 0 |
| | | | | X | | | 1 | 1 | 0 |
| | | | | | X | | 0 | 1 | 1 |
| | | | | | | X | 1 | 1 | 1 |
| (with dt) | X | X | X | X | X | X | 1 | 1 | 0 |

As shown therein, the simpler or elementary system is compared with the alternate system. It will be observed that the former system is the method which has been described. This is evident when one notes that only one or zero-stage delays are allowed in the increment multipliers (UT′, etc.) for the alternate embodiment.

A detailed examination of the terms involved reveals the location of the $\rho_1$ and $\rho_2$ delays. $\rho_1$ delay must be introduced to $\rho_{i-1}$ before adding to $\Sigma_i$. $\rho_2$ delay must be introduced to $\rho_i$ (after addition of $\Sigma_i$). If it is recalled what is "new" and what is "old" during any cycle, it is realized that the two delays cannot conveniently be combined into a single delay (e.g. combine $\rho_2$ delay of *i*th cycle with $\rho_1$ delay of $i+1$th cycle).

Figure 4C:
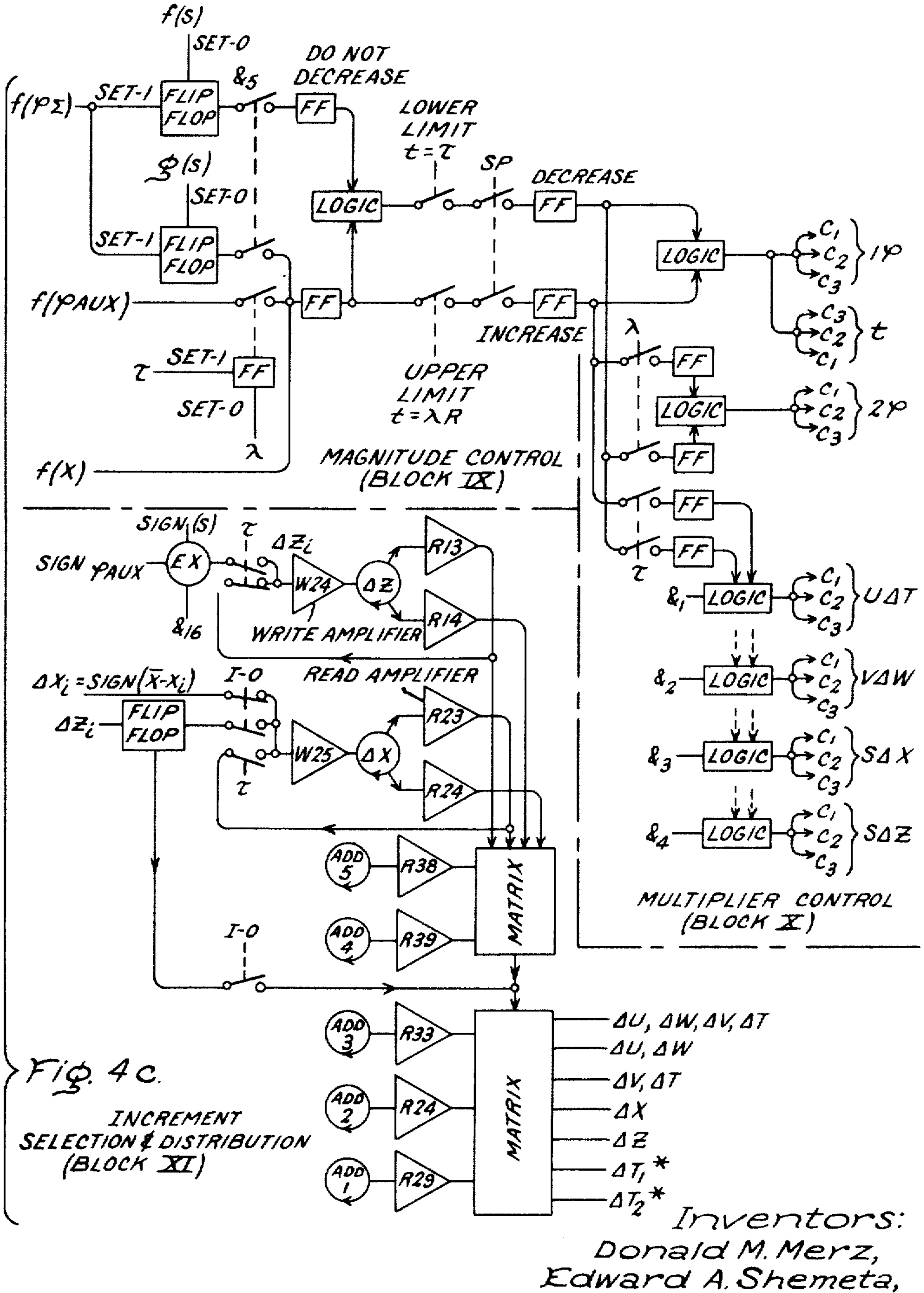

The functional outputs from the Rho-Unit, $$f(\rho_\Sigma)$$

and $f(\rho_{aux.})$, are used in the control of increment magnitude. The remaining output from $\rho$ is the sign bit. As the sign of $\rho$ is repeated through the more signficant portion of $\rho_{aux.}$, it is from the last bit portion of this that the sign is taken. It will be combined with the sign of *s*, under instruction control, to determine the output increment derived from the increment selection and distribution unit (Block XI) as shown in FIGURE 4*c*.

*The t-loop* (*Block VII*)

The *t* or minor timing loop supplies $\Delta_i$ and $\Delta_{i-1}$ pulses which represent increment magnitude during the present and immediately preceding cycles. This pulse position is the same for each word since all increment magnitudes are the same during any one cycle. Pulse positions are derived from the timing pulse Tau (as $2^0$) at the start of computation, when initial conditions are introduced. They are subsequently repositioned at the start of succeeding cycles, when increment magnitude is changed. The repositioning takes place via a multiplier. The delay control through this multiplier is opposite to that of the rho multipliers. Path $C_1$ is followed when increment magnitude decreases, $C_2$ when magnitude is unchanged, and $C_3$ when there has been an increase in increment magnitude. The $\Delta_i$ and $\Delta_{i-1}$ pulses are available from this unit as inputs to the summing adders of the U, V, and X-channels. The *t* which we have described as X-channel input is also derived from this unit. In an alternate embodiment the *t*-loop may be eliminated and replaced by a counter whose count is changed each time there is a change in increment magnitude and which generates an output, during each word time, which is $\Delta_i$.

*The s-channel* (*Block VIII*)

The *s*-term is the generalized term which is used in conjunction with rho to select increments and to control their magnitude. The contents are obtained either from S (the scale factor) or from $V_i$ under control of &15. For the direct operations, S is used; for the indirect operations (i.e. division, and square root), $V_i$ is used. As this is the same selection as is made in programming +S or −S in Block IV, the same instruction 15 is used. The *s* is delayed an amount equal to the normal delay through the arithmetic so that it and the rho-terms will be available at the same time. The sign of *s* is saved and used in selection of increments. Successive digits are examined via an exclusive-OR and two functions $f(s)$ and $g(s)$ developed; where $g(s)$ is $f(s)$ delayed one, two, or three clock pulses. Delay is chosen so as to establish the upper limit $2^\epsilon$ on the $\nabla_Z$-term as disclosed previously under the heading conditional variable increment concept. A general rule is that the less safe the scaling is made or the larger the number of variables used for increment control, the larger the pseudo-smoothing term $\epsilon$ should be (the more $g(s)$ should be delayed). A delay of 3 clock pulses yields a pseudo-smoothing term of $2^3=8$. It is to be observed that the sign of *s* is gated to a hold flip-flop. This sign of *s* must be saved to combine with sign rho, which will not be available until some point during the succeeding word time (at the end of rho-auxiliary) for selecting the output increment.

*Magnitude control* (*Block IX*)

The magnitude control includes an examination of certain selected variables within the computer and a determination of whether to increase, decrease, or not to change the increment magnitude during the succeeding computer cycle. The variables selected for the magnitude control are (1) all input quantities, and (2) those internal algorithms selected by the programmer with &5. For an internal algorithm, the quantity $$\frac{f(\rho_1)}{|\Delta|f(s)}$$

is examined. If this value is less than unity, the decision is to decrease the increment magnitude. Examination is also made of the term $$\frac{f(\rho_1)}{|\Delta|g(s)}$$

where $g(s)$ is determined from $f(s)$ by the switch in the $s$-unit. If this term is greater than unity, the increment magnitude will be increased. Between the two limits, the magnitude is left unchanged. Neglecting for the time, the effect of rho auxiliary, $$f(\rho_{\Sigma i})$$

is used to set two flip-flops. The $f(s)$ is used to reset one and $g(s)$ is used to reset the other flip-flop.

If after the examination, the first flip-flop is left set, the first function, namely, $$\frac{f(\rho_{\Sigma i})}{|\Delta|f(s)}$$

is greater than unity and the decision is to Not-Decrease increment magnitude during the next cycle. If the second flip-flop is left on, $$\frac{f(\rho_{\Sigma i})}{|\Delta|g(s)}$$

is greater than unity and the decision is to Increase Increment magnitude. Thus, if both flip-flops are off, the tendency is to Decrease increment magnitude. At the end of each word selected by Instruction 5 for control, the contents of the above described flip-flops are gated to a second set of hold flip-flops. This second set of flip-flops will "OR" the results from all algorithms involved in the magnitude control during a cycle.

The more significant portion of rho, i.e. the portion of rho appearing in the rho-auxiliary from the timing pulse tau to the λ (see FIGURE 5*a*), is examined without reference to ($s$) Any non-sign digit in this region will be much larger than ($s$). This means that without question the increment size should be increased. The $f(\rho_{aux.})$ is therefore gated directly to the second "Increase-hold" flip-flop. A third input to the second "Increase-hold" flip-flop, $f(x)$ results from the examination of input quantities as follows: If the input quantity is larger than the incrementally accumulated equivalent by four times the current increment magnitude or more, as noted above, the decision is to increase increment magnitude.

At the end of the computer cycle, a final decision is made as to the fate of the Δ-magnitude from an examination of the above secondary flip-flops, Do-Not-Decrease and Increase. If an increase-signal is present, the decision will be to increase. If no increase-signal is present, but a Do-Not-Decrease-signal is, the same magnitude will be maintained. Magnitude will be decreased only if both secondary flip-flops are left in a zero-state at the end of the cycle. At this point the final decision is gated to a pair of hold flip-flops for the actual control during the new cycle. It is necessary, at this point, to introduce limits which are functions of the increment magnitude ($t$) from $t$-loop (Block VII). Increment magnitude will not be allowed to decrease below a value of $2^0$, i.e. when ($t$) coincides with tau; the Decrease control flip-flop will not be permitted to be set. The upper limit on the increment magnitude is selectable in one embodiment at any value from $2^0$ thru $2^{13}$ (except for $2^{12}$) by developing a λ-reflected pulse (λR) from General Control Unit (Block XIII) which will be described hereinafter. When ($t$) becomes equal to this, λR, the Increase flip-flop will not be allowed to be set.

*Multiplier control unit (Block X)*

Multiplier control unit shown in FIGURE 4*c* produces the control signals $C_1$, $C_2$ and $C_3$ referred to hereinbefore in conjunction with the U-channel, the V-channel, the X-channel and the Z-channel, in addition to the 1$\rho$, 2$\rho$, and $t$-channels. The timing in the magnitude control unit is such that the controls for the 1$\rho$-multiplier and the $t$-multiplier may be obtained directly from the output of the Increase-Decrease control flip-flops. The other controls, for the 2$\rho$ and the increment-multiplier terms must be initiated at a different time and, therefore, must be developed from the control flip-flops of Block IX separately by gating to secondary control flip-flops. As shown, the gating time for 2$\rho$ is coincident with λ (following the development of the control) and the gating time for the increment multiplier is coincident with tau (following the development of the control). For the increment-multiplier terms, the controls are combined with Instructions 1, 2, 3 and 4 to develop the controls for the UΔT, VΔW, SΔX, and SΔZ multipliers, respectively. Each instruction, if present, means that the magnitude of its respective increment is "old."

From the discussions presented hereinbefore, it was shown how the "increase" and the "decrease" controls function to control the variable delays in the increment multipliers and in the 2$\rho$ unit delays. These control functions also are used to reposition the $t$-pulse, which represents the current increment magnitude Δ and is used in increment summers to be discussed hereinafter. In general, the new control is introduced at the start of the new cycle. However, as specific features of the control must take effect at different times, great care must be taken in the timing. The position of the gap between successive rho-terms is defined by the λ. The delay-controls must be introduced to the rho-unit at this same time. Further, as the rho-terms on the two-rho channels overlap, their delay-controls must be started on different λ's, one word apart. Controls for the increment multipliers must start in coincidence with the time of the normal word interval . . . that is to say at time tau which defines the position of the $2^0$ bit. The control to the $t$-loop, to reposition the $t$, can also be introduced at this time. The specific tau-pulse which signifies start of this control must occur after the first of the above λ-pulses and before the second. This is shown in FIGURE 5*a* for the relative positions of data and timing pulses.

*Increment selection and distribution unit (Block XI)*

In FIGURE 4*c*, Block XI illustrates one embodiment of the increment selection and distribution unit. Output increments are the ΔU's and ΔZ's developed by the algorithm (as opposed to ΔX increments developed from inputs). For the discussion which hereinafter follows, all output increments will be called ΔZ's. The ΔZ-increments are derived basically from an examination of the signs of rho and of $s$. From our general algorithm, $$\Delta = \frac{\rho_1}{s_1}$$

The sign of Δ will be positive if both rho and $s$ have the same sign and negative if their signs are different. Thus, normally increments are chosen by Exclusive-ORing the signs of rho and $s$: This is illustrated in the following equation:

$$\text{sign } \Delta = (\text{sign } \rho \cdot \overline{\text{sign } s}) + (\overline{\text{sign } \rho} \cdot \text{sign } s)$$

Thus, the selection of the new ΔZ increment is based solely on an examination of ($\rho$) and ($s$) for all operations except square root. For the square rooting operation, Instruction 16 is used. To prevent a negative square root from being selected, a constraint must be put on the square root operation. It is to be observed that a negative increment, representing the incremental change in the square root, is not chosen if the accumulated square root (represented by ($s$)) is negative. If the square root operation starts negative, the effect of this instruction (&16) is to immediately reverse it to positive. Otherwise, the increment is selected as the Exclusive-OR'ed combination of the signs of $\rho_i$ and $s$, the sign of $s$ being saved in the $s$-unit (Block VIII) of FIGURE 4*a*, and the sign of $\rho_i$ being gated from the rho-auxiliary track as sign $\rho_{aux.}$.

As mentioned above, certain logical controls on the selection process must be imposed. Without control the square root operation is not specific, that is, either positive or negative roots can be computed by the algorithm shown in Equation 31. The computer must be told which root is to be found. In an alternate embodiment under certain conditions (such as in determining cosine from sine—squared when the angle changes quadrants) it may be necessary to switch from one root to the other. To solve this and similar problems concerning the controlled selection of increments, a double control is used here consisting of ΔY and Instruction (&16). As ΔY is used in other algorithms of an alternate embodiment for other purposes, it must be accompanied by an instruction to identify the increment selection function. With &16 present, the logical rules are:

(a) If $\Delta Y=+$, select positive square root.
(b) If $\Delta Y=-$, select negative square root.

The specific functions to be performed act as an over-ride on the basic $\rho$ vs. $s$ selection process. Note that this is not expressly shown in the specific embodiment in FIGURE 4*c* but may be an alternate embodiment. It must be observed from the square root algorithm, Equation 21, that $s$ is actually $U_{i-1}$ the latest value of the square-root. In Table II, below shown entitled Truth Table—Increment Selection, there will be observed the various quantities $\rho$, $s$, ΔY, $\&_{16}$, and ΔZ (which, from the square-root algorithm, is mathematically ΔU).

TABLE II.—TRUTH TABLE—INCREMENT SELECTION

| $\rho$ | $s$ | $\Delta Y$ | $\&_{16}$ | $\Delta Z$ |
|---|---|---|---|---|
| 0 | 0 | 0 | 0 | 0 |
| 0 | 1 | 0 | 0 | 1 |
| 1 | 0 | 0 | 0 | 1 |
| 1 | 1 | 0 | 0 | 0 |
| 0 | 0 | 0 | 1 | 0 |
| 0 | 1 | 0 | 1 | 0 |
| 1 | 0 | 0 | 1 | 1 |
| 1 | 1 | 0 | 1 | 0 |
| 0 | 0 | 1 | 0 | 0 |
| 0 | 1 | 1 | 0 | 1 |
| 1 | 0 | 1 | 0 | 1 |
| 1 | 1 | 1 | 0 | 0 |
| 0 | 0 | 1 | 1 | 1 |
| 0 | 1 | 1 | 1 | 1 |
| 1 | 0 | 1 | 1 | 1 |
| 1 | 1 | 1 | 1 | 0 |

The above rules thus act (see Table II) only if the square root starts to develop in the unwanted direction and then act to reverse this direction. Note that as the value of rho is corrected with the selected increment $$(\rho_{i-1}-U_{i-2}U_{i-1} \text{ or } \rho_{i-1}-SZ'_{i-1})$$

during the following cycle, the logical control on the selection process cannot introduce error.

Increments are stored in two short sections of memory, namely, the ΔZ and ΔX tracks. Each of these tracks has one write and two read-heads. The write and the first read-head, 64 pulses removed from the write head constitutes the ΔZ read-rewrite loop. The secondary read-head is located at a pulse position 102, 38 pulses further down the track from the first read-head. The ΔX-loop is identical to the ΔZ-loop. Sequencing of data on the ΔZ-loop is as follows: There are 64 increments, one for each algorithm in the computer, stored in a known sequential fashion, that is, the increment for algorithm number two is located 19 pulses removed from the increment for algorithm number one (for 19 bit word length), etc. All pulse positions are occupied. Once each word, a new ΔZ increment is selected and stored to the ΔZ-loop. The timing of the loop is such that the new increment will always be written in place of the previous value of this same increment. Thus, the increment for algorithm 10 during the $i$th computation cycle will be written in place of the increment for algorithm 10 which was obtained during the $i-1$th computation cycle.

Data sequencing in the X-loop is as follows: First priority is given to Input ΔX, increments. Whenever an increment is not so obtained, a ΔZ increment will be stored to the ΔX loop. These are the same ΔZ increments as are stored in the ΔZ-loop except that they are delayed 16 clock pulses before storage. The overall effect of this is to increase the amount of different increment data which is available at the read-heads on the two random access memory loops.

Five address tracks are employed to obtain and distribute the desired increment within the computer. These are termed Add 1 thru Add 5 or Add one thru Add five. Add 4 and Add 5 are coded to choose between the four sources of increments, i.e., the two read-heads each on the ΔX and ΔZ loops. (A fifth source, the latest computed ΔZ, may be addressed from its hold-flip-flop by a pulse programmed on the I-O track.) Adds 1 thru 3 determine the position in the computer to which the increment so chosen will be sent. An address (the 5 Add-pulses) must be available at a time when the increment to be used in the computer is available at one of the four read-heads. The seven available destinations are listed at the bottom of Block XI, shown in FIGURE 4*c*. It is to be noted that in addition to the normal four inputs to the four channels and the ΔT*'s, there is one other input to both the U and V-channels, ΔU, ΔW, ΔV, and ΔT.

*Input-output control (Block XII)*

In FIGURE 4*d* there is shown the input-output control. Input and output addresses are coded and stored on a track along with gating, addressing and control pulses. A data gate, address gate, and the address itself are sent outside of the computer to synchronize and select among external devices. Internally, control is furnished to select ΔX increments and to gate data to and from the X-channel (see Blocks III and XI of FIGURES 4*b* and 4*c*).

*Generalized control (Block XIII)*

The generalized controls are illustrated in the bottommost portion of FIGURE 4*d*. They include several functions, namely:

(1) The storage of initial conditions on $U_o$, $V_o$, and $X_o$ tracks. The point and manner of introduction is indicated in FIGURE 4*d*, but, for simplicity, was not included in the blocks of the U, V and X-channels themselves.

(2) All instruction pulses are obtained from a single instruction track. Because they are used more or less in parallel although obtained serially, they must be first delayed in a register and gated from this to the points where they are used.

(3) For timing purposes, because of the delay in the computer and because of the various times at which controls are needed, a delay register is necessary for tau.

A secondary use for tau is indicated in the "maximum Δ magnitude magnitude selector switch." In such an embodiment a switch permits the operator to pre-select the maximum increment which the computer will use while solving any problem. Indicated increments of $2^0$ thru $2^{13}$, excepting $2^{12}$, were determined by the particular components used in this embodiment and are not directly determined by the CVIC concept.

To permit the computer to operate without this control, secondary control was included in the computer permitting selection of either $2^0$ or $2^{13}$ as maximum increments. This secondary control (not shown) permits the operator to switch between fully variable and fixed increment operation. (In FIGURE 6, there is shown in graphical form, response characteristics of the CVIC computer when operating in the variable increment mode.) The single-track-pulse (SP-track) is just what the name implies, a single pulse which defines the start of the computation cycle. It is used for introducing the magnitude control at the start of a cycle in conjunction with the setting of initial conditions, etc.

A DETAILED EXAMINATION OF CVIC DYNAMIC RESPONSE

To properly appreciate and understand the dynamic response characteristics of the CVIC, Conditional Variable Increment Computer, it is necessary to make a detailed examination of a typical problem. The normal problem, occupying up to 64 algorithms in one embodiment, is much too extensive to permit the type of examination desired. Therefore, the sample problem to be investigated will be limited to two operations. These operations are (1) a squaring operation and (2) a square root; a step input to the computer will be taken, squared, and the square root extracted. The problem shall be followed through all phases of the operation to see exactly how the computer responds. If it responds as it should, the square root operation will recover accurately the original input information. The complete details of programming are unnecessary for this purpose but certain of them are necessary at this point to properly understand the accompanying table and figures.

The order of algorithms will be taken so as to best present the details of CVIC operation: In algorithm A (see FIGURE 6), two functions will be performed: First a square root operation, the input to which is the output from algorithm B. The second function of algorithm A is to accept an analog input quantity $\overline{X}$. In algorithm B, the input quantity taken in the (*b*) part of algorithm A will be squared. In the (*b*) part of B, we will accumulate the increments calculated in the square root operation of algorithm A as an output from the computer. In algorithm C, the increments calculated as the output of the squaring operation of algorithm B will be accumulated as a second output from the computer. By inverting the normal order, i.e. performing the square root before performing the square, two things are accomplished: (a) demonstration of the fact that the computation is actually cyclic and CVIC can properly perform functions in reverse order, and (b) it brings a little more flexibility into the program. To properly appreciate this, examination of the instructions necessary for these three algorithms will be made.

For algorithm A, Instructions 1, 2, 4, 6, 9, 11, 12, and 16 will be used. Magnitude control will be based on the squaring operation only and Instruction 5 will not be used in the square root algorithm. For algorithm B Instructions 5, 7, 10, 13 and 15 will be used. For algorithm C only Instruction 7 will be used. In order to more fully appreciate the operation, a more detailed look at these instructions and what they will accomplish in their relative algorithms will be made. Referring again to FIGURE 6, the algorithm for A, the square root operation, is:

$$U_{1-1}U_{1'}+R_1=\rho_{1-1}-U_{1-2}U_{1-1'}-U_{1-1}U_{1-1'}+SZ_{1-1'}$$

Note that, in programming, the increment subscripts denote "old" or "new." In this same algorithm use of the summation of increments on the X-track will be made. The instruction selection is as follows:

&(1–2 The ΔU increment was obtained as an output from the calculation of the preceding cycle, i.e. it is an old $U_1$ increment or $U_{1-1'}$. Therefore, Instruction 1 must be used, "use old Δ magnitude in UΔT multiplier"; and Instruction 2, "use old Δ magnitude in VΔW multiplier."

&(3) There is no SΔX term so that Instruction 3 is not used.

&(4) The input variable to the square root operation is the Z′ increment. This must have been calculated during the preceding cycle since the square root operation is the first operation to be considered during the present cycle. In this instance, Instruction 4 must be used, "use old Δ magnitude in SΔZ multiplier."

&(5) Since this algorithm will not be used for magnitude control, Instruction 5 is not used.

&(6) Instruction 6, "use old increment magnitude in the ΔX adder," is programmed; the input increments are accumulated on the X track, and the latest increment to be added is the one which was computed during the previous cycle.

&(7) The new increment of $X_1$ will be computed during the present cycle. Therefore, Instruction 7 is not programmed.

&(8) Instruction 8 is not used since there is no SΔX term.

&(9–10) As the same increment is used in both the adder and the multiplier on the V channel, Instruction 9, "use old magnitude in the ΔV adder," is used. This excludes use of Instruction 10.

&(11) As the algorithm calls for the minus-product, Instruction 11, "complement ΔT," is used. Similar reasoning holds for the next three Instructions (& 12, 13 and 14) which deal with the contents of the U channel.

&(15) Since this is an indirect operation, Instruction 15 is not used, i.e. the V term rather than S will be used in selecting increments and +S will be used in SΔZ.

&(16) Since this is a square root operation, Instruction 16, "select the positive square root," is required.

In algorithm B the squaring operation is performed. From FIGURE 6 it will be seen that the algorithm is:

$$SZ_{1'}+R_1=\rho_{1-1}+U_1U_{1'}+U_{1-1}U_{1'}-SZ_{1-1'}$$

On the X-track there will also be accumulated the increments calculated in algorithm A, i.e. the increments from the square root operation. Magnitude control will be employed in this algorithm. The selection of the proper instruction follows reasoning very similar to that already examined in some detail for algorithm A. In this case, except for the feedback increment which is now the Z′ increment, the increments used are new, i.e. the input (X′) increments calculated in algorithm A of the present cycle. The fed-back Z′ increment was, of course, computed as the output of algorithm B on the previous cycle and represents an old value. And, as this is a direct operation, S rather than V and −SΔZ rather than +SΔZ will be used under control of Instruction 15. Selection of the other instructions is quite straight-forward and will be obvious to anyone skilled in the art. Proceeding to algorithm C, since there are only being accumulated the outputs from algorithm B, i.e. the outputs of the squaring operation, Instruction 7, "use present delta magnitude in delta X adder," is necessary.

A pre-requisite to programming the CVIC computer is the realization that at all times the computer must contain a true solution to the programmed problem. This holds for initial conditions (before accepting inputs) as well as during the actual computation of a problem. This means that certain initial conditions must be preprogrammed and written to the drum tracks. The selection of the pre-programmed constants is based on certain data which is available. Examination of a few of these constants will be made, the others being relegated to the unimportant, of interest only to the person actually concerned with the detailed programming problem. Those which are of concern are: (1) the fact that during the setting of initial conditions the increment memory is cleared to all zeros (to all +1 increments). This will be taken into account. (2) $U_o$, $V_o$, and $X_o$ may be preset to any desired constants. For the problem to be examined, i.e. input, squaring, square root and summing outputs the following data will be used:

The input will have an initial value of 1,024 or $2^{10}$. At time zero, i.e. at the start of the examination, a step increase in the input to 4,096 ($2^{12}$) will take place. The computer must, therefore, have an initial solution for the initial input of 1,024. The scale factor selected for the squaring operation is $2^{12}$ or 4,096. The initial value for the output of the squaring operation is $$\frac{2^{10}\times 2^{10}}{2^{12}}=2^8=256$$

and is preset as $X_0$ for algorithm C. Since the input is accumulated on the U and V tracks of the squaring operation, 1,024 is also $U_0$ and $V_0$ for algorithm B. In like manner the initial values for the square root may be found: The initial value of SZ is $2^{12}$ (the scale factor for the square root operation) times $2^8$ (the initial value of the square). The square root of this product is $2^{10}$ and since the square-root is accumulated on both the U and V tracks of algorithm A, $U_0$ and $V_0$ are preset to 1,024 in algorithm A. $X_0$, the accumulated square root, on algorithm B is also preset to 1,024. As shall be seen later these selected values for the initial conditions are only approximations. They are, however, sufficiently accurate for this investigation.

Table III (shown below) presents a detailed analysis of what occurs in the computer during each cycle and during each algorithm of that cycle. The final results, i.e. the input and the outputs of algorithms B and C are accumulated and shown graphically on FIGURE 6. The table gives a rough idea of the vast amount of detail necessary in any close examination of a single problem. In addition to limiting the program to these two aforementioned algorithms, written examination to follow will only be made of several cycles to delineate exactly what is taking place in the computer.

To start, the initial condition button is depressed. This sets the aforementioned initial conditions into the computer and, on release, superimpose the step increase on the input. At this time the $t$-pulses are placed on the $t$-loop in parallel with the tau pulses, i.e. increments have unit value at the start of the computation.

TABLE III

| | | | SQUARE ROOT | | | | | | | | | | |
|---|---|---|---|---|---|---|---|---|---|---|---|---|---|
| Cycle | Magn. Control Quantity | $\|\Delta_i\|$ | $U_{i-2}$ | $U_{i-1}$ | $\Delta U_{i-1}$ | $\Delta Z_{i-1}$ | $-U_{i-2}\Delta U_{i-1}$ | $-U_{i-1}\Delta U_{i-1}$ | $S\Delta Z_{i-1}$ | $\Sigma$ | $\rho_{i-1}$ | $\rho_i$ | Select $\Delta U_i$ |
| | | | | 1024 | | | | | | | | | |
| 1 | Input $\bar{X}$ | 1 | 1024 | 1025 | + | + | -1024 | -1025 | 4096 | 2047 | 0 | 2047 | + |
| 2 | " | 2 | 1025 | 1026 | + | - | $-\frac{1025}{2}$ | $-\frac{1026}{2}$ | $-\frac{4096}{2}$ | $-\frac{6147}{2}$ | $\frac{2047}{2}$ | $-\frac{4100}{2}$ | - |
| 3 | " | 4 | 1026 | 1024 | - | + | $\frac{1026}{2}$ | $\frac{1024}{2}$ | $\frac{4096}{2}$ | $\frac{6146}{2}$ | $-\frac{4100}{4}$ | $\frac{8192}{4}$ | + |
| 4 | " | 8 | 1024 | 1028 | + | + | $-\frac{1024}{2}$ | $-\frac{1028}{2}$ | $\frac{4096}{2}$ | $\frac{2044}{2}$ | $\frac{8192}{8}$ | $\frac{16368}{8}$ | + |
| 5 | " | 16 | 1028 | 1036 | + | + | $-\frac{1028}{2}$ | $-\frac{1036}{2}$ | $\frac{4096}{2}$ | $\frac{2032}{2}$ | $\frac{16368}{16}$ | $\frac{32624}{16}$ | + |
| 6 | " | 32 | 1036 | 1052 | + | + | $-\frac{1036}{2}$ | $-\frac{1052}{2}$ | $\frac{4096}{2}$ | $\frac{2008}{2}$ | $\frac{32624}{32}$ | $\frac{64752}{32}$ | + |
| 7 | " | 64 | 1052 | 1084 | + | + | $-\frac{1052}{2}$ | $-\frac{1084}{2}$ | $\frac{4096}{2}$ | $\frac{1960}{2}$ | $\frac{64752}{64}$ | $\frac{127472}{64}$ | + |
| 8 | " | 128 | 1084 | 1148 | + | + | $-\frac{1084}{2}$ | $-\frac{1148}{2}$ | $\frac{4096}{2}$ | $\frac{1864}{2}$ | $\frac{127472}{128}$ | $\frac{246768}{128}$ | + |
| 9 | " | 256 | 1148 | 1276 | + | + | $-\frac{1148}{2}$ | $-\frac{1276}{2}$ | $\frac{4096}{2}$ | $\frac{1672}{2}$ | $\frac{246768}{256}$ | $\frac{460784}{256}$ | + |
| 10 | " | 512 | 1276 | 1532 | + | + | $-\frac{1276}{2}$ | $-\frac{1532}{2}$ | $\frac{4096}{2}$ | $\frac{1288}{2}$ | $\frac{460784}{512}$ | $\frac{790512}{512}$ | + |
| 11 | $\|\rho_s\|$ square | 1024 | 1532 | 2044 | + | + | $-\frac{1532}{2}$ | $-\frac{2044}{2}$ | $\frac{4096}{2}$ | $\frac{520}{2}$ | $\frac{790512}{1024}$ | $\frac{1056752}{1024}$ | + |
| 12 | " | 512 | 2044 | 3068 | + | + | -4088 | -6136 | 8192 | -2032 | $\frac{1056752}{512}$ | $\frac{16368}{512}$ | + |
| 13 | " | 256 | 3068 | 3580 | + | + | -6136 | -7160 | 8192 | -5104 | $\frac{16368}{256}$ | $-\frac{1290256}{256}$ | - |
| 14 | " | 256 | 3580 | 3324 | - | + | 3580 | 3324 | 4096 | 11000 | | $\frac{1525744}{256}$ | + |
| 15 | " | 256 | 3324 | 3580 | + | + | -3324 | -3580 | 4096 | -2808 | | $\frac{806896}{256}$ | + |
| 16 | " | 256 | 3580 | 3836 | + | + | -3580 | -3836 | 4096 | -3320 | | $-\frac{43024}{256}$ | - |
| 17 | " | 256 | 3836 | 3580 | - | + | 3836 | 3580 | 4096 | 11512 | | $\frac{2904048}{256}$ | + |
| 18 | " | 256 | 3580 | 3836 | + | + | -3580 | -3836 | 4096 | -3320 | | $\frac{2054128}{256}$ | + |
| 19 | " | 128 | 3836 | 4092 | + | + | -7672 | -8184 | 8192 | -7664 | $\frac{2054128}{128}$ | $\frac{1073136}{128}$ | + |
| 20 | " | 64 | 4092 | 4220 | + | + | -8184 | -8440 | 8192 | -8432 | $\frac{1073136}{64}$ | $\frac{533488}{64}$ | + |
| 21 | " | 64 | 4220 | 4284 | + | - | -4220 | -4284 | -4096 | -12600 | | $-\frac{272912}{64}$ | - |
| 22 | " | 64 | 4284 | 4220 | - | - | 4284 | 4220 | -4096 | 4408 | | $\frac{9200}{64}$ | + |
| 23 | " | 32 | 4220 | 4284 | + | - | -8440 | -8568 | -8192 | -25200 | $\frac{9200}{32}$ | $-\frac{797200}{32}$ | - |
| 24 | " | 32 | 4284 | 4252 | - | - | 4284 | 4252 | -4096 | 4440 | | $-\frac{655120}{32}$ | - |

TABLE III.—*Continued*

| Cycle | Magn. Control Quantity | $\lvert\Delta_i\rvert$ | SQUARE ROOT $U_{i-2}$ | $U_{i-1}$ | $\Delta U_{i-1}$ | $\Delta Z_{i-1}$ | $-U_{i-2}\Delta U_{i-1}$ | $-U_{i-1}\Delta U_{i-1}$ | $S\Delta Z_{i-1}$ | $\Sigma$ | $\rho_{i-1}$ | $\rho_i$ | Select $\Delta U_i$ |
|---|---|---|---|---|---|---|---|---|---|---|---|---|---|
| 25 | " | 32 | 4252 | 4220 | - | - | 4252 | 4220 | -4096 | 4376 | | $-\frac{515088}{32}$ | - |
| 26 | " | 16 | 4220 | 4188 | - | - | 8440 | 8376 | -8192 | 8624 | $-\frac{515088}{16}$ | $-\frac{377104}{16}$ | - |
| 27 | " | 16 | 4188 | 4172 | - | - | 4188 | 4172 | -4096 | 4264 | | $-\frac{308880}{16}$ | - |
| 28 | " | 16 | 4172 | 4156 | - | - | 4172 | 4156 | -4096 | 4232 | | $-\frac{241168}{16}$ | - |
| 29 | " | 8 | 4156 | 4140 | - | - | 8312 | 8280 | -8192 | 8400 | $-\frac{241168}{8}$ | $-\frac{173968}{8}$ | - |
| 30 | " | 8 | 4140 | 4132 | - | - | 4140 | 4132 | -4096 | 4176 | | $-\frac{140560}{8}$ | - |
| 31 | " | 8 | 4132 | 4124 | - | - | 4132 | 4124 | -4096 | 4160 | | $-\frac{107280}{8}$ | - |
| 32 | " | 4 | 4124 | 4116 | - | - | 8248 | 8232 | -8192 | 8288 | $-\frac{107280}{4}$ | $-\frac{74128}{4}$ | - |
| 33 | " | 4 | 4116 | 4112 | - | - | 4116 | 4112 | -4096 | 4132 | | $-\frac{57600}{4}$ | - |
| 34 | " | 4 | 4112 | 4108 | - | - | 4112 | 4108 | -4096 | 4124 | | $-\frac{41104}{4}$ | - |
| 35 | " | 2 | 4108 | 4104 | - | - | 8216 | 8208 | -8192 | 8232 | $-\frac{41104}{2}$ | $-\frac{24640}{2}$ | - |
| 36 | " | 2 | 4104 | 4102 | - | - | 4104 | 4102 | -4096 | 4110 | | $-\frac{16420}{2}$ | - |
| 37 | " | 2 | 4102 | 4100 | - | - | 4102 | 4100 | -4096 | 4106 | | $-\frac{8208}{2}$ | - |
| 38 | " | 1 | 4100 | 4098 | - | - | 8200 | 8196 | -8192 | 8204 | -8208 | -4 | - |
| 39 | " | 1 | 4098 | 4097 | - | - | 4098 | 4097 | -4096 | 4099 | -4 | 4095 | + |
| 40 | " | 1 | 4097 | 4098 | + | - | -4097 | -4098 | -4096 | -12291 | | -8196 | - |
| 41 | " | 1 | 4098 | 4097 | - | - | 4098 | 4097 | -4096 | 4099 | | -4097 | |
| 42 | Lower Limit | 1 | 4097 | 4096 | - | - | 4097 | 4096 | -4096 | 4097 | -4097 | 0 | + |
| 43 | $\lvert\rho_s\rvert$ | 1 | 4096 | 4097 | + | + | -4096 | -4097 | 4096 | -4097 | 0 | -4097 | - |

... Problem has settled (solutions oscillating ± 1)

Changing the input $\bar{X}$ to 4095, the first 14 cycles are the same as above (...except for $\bar{X}-X_{i-1}$ being one unit lower than as shown).

| Cycle | Magn. Control Quantity | $\lvert\Delta_i\rvert$ | $U_{i-2}$ | $U_{i-1}$ | $\Delta U_{i-1}$ | $\Delta Z_{i-1}$ | $-U_{i-2}\Delta U_{i-1}$ | $-U_{i-1}\Delta U_{i-1}$ | $S\Delta Z_{i-1}$ | $\Sigma$ | $\rho_{i-1}$ | $\rho_i$ | Select $\Delta U_i$ |
|---|---|---|---|---|---|---|---|---|---|---|---|---|---|
| 15 | $\lvert\rho_s\rvert$ | 256 | 3324 | 3580 | + | + | -3324 | -3580 | 4096 | -2808 | | $\frac{806896}{256}$ | + |
| 16 | " | 128 | 3580 | 3836 | + | + | -7160 | -7672 | 8142 | -6640 | $\frac{806896}{128}$ | $-\frac{43024}{128}$ | - |
| 17 | " | 128 | 3836 | 3708 | - | + | 3836 | 3708 | 4096 | 11640 | | $\frac{1446896}{128}$ | + |
| 18 | " | 128 | 3708 | 3836 | + | + | -3708 | -3836 | 4096 | -3448 | | $\frac{1005552}{128}$ | + |
| 19 | " | 64 | 3836 | 3964 | + | + | -7672 | -7928 | 8192 | -7408 | $\frac{1005552}{64}$ | $\frac{531440}{64}$ | + |
| 20 | " | 32 | 3964 | 4028 | + | + | -7928 | -8058 | " | -7792 | $\frac{531440}{32}$ | $\frac{282096}{32}$ | + |
| 21 | " | 16 | 4028 | 4060 | + | + | -8056 | -8120 | " | -7984 | $\frac{282096}{16}$ | $\frac{154352}{16}$ | + |
| 22 | " | 8 | 4060 | 4076 | + | + | -8120 | -8152 | " | -8080 | $\frac{154352}{8}$ | $\frac{89712}{8}$ | + |
| 23 | " | 4 | 4076 | 4084 | + | + | -8152 | -8168 | " | -8128 | $\frac{89712}{4}$ | $\frac{57200}{4}$ | + |
| 24 | " | 2 | 4084 | 4088 | + | + | -8168 | -8176 | " | -8152 | $\frac{57200}{2}$ | $\frac{40896}{2}$ | + |
| 25 | " | 1 | 4088 | 4090 | + | + | -8176 | -8180 | " | -8164 | 40896 | 32732 | + |
| 26 | Lower Limit | 1 | 4090 | 4091 | + | + | -4090 | -4091 | 4096 | -4085 | | 28647 | + |
| 27 | " | 1 | 4091 | 4092 | + | + | -4091 | -4092 | " | -4087 | | 24560 | + |
| 28 | " | 1 | 4092 | 4093 | + | - | -4092 | -4093 | -4096 | -12281 | | 12279 | + |
| 29 | " | 1 | 4093 | 4094 | + | + | -4093 | -4094 | 4096 | -4091 | | 8188 | + |
| 30 | " | 1 | 4094 | 4095 | + | - | -4094 | -4095 | -4096 | -12285 | | -4097 | - |
| 31 | " | 1 | 4095 | 4094 | - | + | 4095 | 4094 | 4096 | 12285 | | 8188 | + |

... Problem has settled (oscillating ± 1)

TABLE III.—*Continued*

| Cycle | INPUT $X_{i-2}$ | $X_{i-1}$ | $\bar{X}-X_{i-1}$ | $\Delta X_i$ | SQUARING $U_{i-1}$ | $U_i$ | $\Delta U_i$ | $\Delta Z_{i-1}$ | $U_{i-1}\Delta U_i$ | $U_i \Delta U_i$ | $-S\Delta Z_{i-1}$ | $\Sigma$ | $\rho_{i-1}$ | $\rho_i$ | Select $\Delta Z_i$ | SUMMING Square Root | Square | Magn. Cont. |
|---|---|---|---|---|---|---|---|---|---|---|---|---|---|---|---|---|---|---|
| 1 | 1024 | 1024<br>1025 | 3071 | + | 1024 | 1024<br>1025 | + | + | 1024 | 1025 | -4096 | -2047 | 0 | -2047 | - | 1024<br>1025 | 256<br>255 | I |
| 2 | 1025 | 1026 | 3070 | + | 1025 | 1027 | + | - | 1025 | 1027 | $\frac{4096}{2}$ | $\frac{8200}{2}$ | $-\frac{2047}{2}$ | $\frac{6153}{2}$ | + | 1023 | 257 | I |
| 3 | 1026 | 1028 | 3068 | + | 1027 | 1031 | + | + | 1027 | 1031 | $-\frac{4096}{2}$ | $\frac{20}{2}$ | $\frac{6153}{4}$ | $\frac{6193}{4}$ | + | 1027 | 261 | I |
| 4 | 1028 | 1032 | 3064 | + | 1031 | 1039 | + | + | 1031 | 1039 | $-\frac{4096}{2}$ | $\frac{44}{2}$ | $\frac{6193}{8}$ | $\frac{6369}{8}$ | + | 1035 | 269 | I |
| 5 | 1032 | 1040 | 3056 | + | 1039 | 1055 | + | + | 1039 | 1055 | $-\frac{4096}{2}$ | $\frac{92}{2}$ | $\frac{6369}{16}$ | $\frac{7105}{16}$ | + | 1051 | 285 | I |
| 6 | 1040 | 1056 | 3040 | + | 1055 | 1087 | + | + | 1055 | 1087 | $-\frac{4096}{2}$ | $\frac{188}{2}$ | $\frac{7105}{32}$ | $\frac{10113}{32}$ | + | 1083 | 317 | I |
| 7 | 1056 | 1088 | 3008 | + | 1087 | 1151 | + | + | 1087 | 1151 | $-\frac{4096}{2}$ | $\frac{380}{2}$ | $\frac{10113}{64}$ | $\frac{22273}{64}$ | + | 1147 | 381 | I |
| 8 | 1088 | 1152 | 2944 | + | 1151 | 1279 | + | + | 1151 | 1279 | $-\frac{4096}{2}$ | $\frac{764}{2}$ | $\frac{22273}{128}$ | $\frac{71169}{128}$ | + | 1275 | 509 | I |
| 9 | 1152 | 1280 | 2816 | + | 1279 | 1535 | + | + | 1279 | 1535 | $-\frac{4096}{2}$ | $\frac{1532}{2}$ | $\frac{71169}{256}$ | $\frac{267265}{256}$ | + | 1531 | 765 | I |
| 10 | 1280 | 1536 | 2560 | + | 1535 | 2047 | + | + | 1535 | 2047 | $-\frac{4096}{2}$ | $\frac{3068}{2}$ | $\frac{267265}{512}$ | $\frac{1052673}{512}$ | + | 2043 | 1277 | I |
| 11 | 1536 | 2048 | 2048 | + | 2047 | 3071 | + | + | 2047 | 3071 | $-\frac{4096}{2}$ | $\frac{6140}{2}$ | $\frac{1052673}{1024}$ | $\frac{4196353}{1024}$ | + | 3067 | 2301 | D |
| 12 | 2048 | 3072 | 1024 | + | 3071 | 3583 | + | + | 3071 | 3583 | -8192 | -1538 | $\frac{4196353}{512}$ | $\frac{3408897}{512}$ | + | 3579 | 2813 | D |
| 13 | 3072 | 3584 | 512 | + | 3583 | 3839 | + | + | 3583 | 3839 | -8192 | -770 | $\frac{3408897}{256}$ | $\frac{3211777}{256}$ | + | 3323 | 3069 | S |
| 14 | 3584 | 3840 | 256 | + | 3839 | 4095 | + | + | 3839 | 4095 | -4096 | 3838 | | $\frac{4194305}{256}$ | + | 3579 | 3325 | S |
| 15 | 3840 | 4096 | 0 | + | 4095 | 4351 | + | + | 4095 | 4351 | -4096 | 4350 | | $\frac{5307905}{256}$ | + | 3835 | 3581 | S |
| 16 | 4096 | 4352 | -256 | - | 4351 | 4095 | - | + | -4351 | -4095 | -4096 | -12542 | | $\frac{2097153}{256}$ | + | 3579 | 3837 | S |
| 17 | 4352 | 4096 | 0 | + | 4095 | 4351 | + | + | 4095 | 4351 | -4096 | 4350 | | $\frac{3210753}{256}$ | + | 3835 | 4093 | S |
| 18 | 4096 | 4352 | -256 | - | 4351 | 4095 | - | + | -4351 | -4095 | -4096 | -12542 | | $\frac{1}{256}$ | + | 4091 | 4349 | D |
| 19 | 4352 | 4096 | 0 | + | 4095 | 4223 | + | + | 4095 | 4223 | -8192 | 126 | $\frac{1}{128}$ | $\frac{16129}{128}$ | + | 4219 | 4477 | D |
| 20 | 4096 | 4224 | -128 | - | 4223 | 4159 | - | + | -4223 | -4159 | -8192 | -16574 | $\frac{16129}{64}$ | $-\frac{1044607}{64}$ | - | 4283 | 4413 | S |
| 21 | 4224 | 4160 | -64 | - | 4159 | 4095 | - | - | -4159 | -4095 | +4096 | -4158 | | $-\frac{1310719}{64}$ | - | 4219 | 4349 | S |
| 22 | 4160 | 4096 | 0 | + | 4095 | 4159 | + | - | 4095 | 4159 | 4096 | 12350 | | $-\frac{520319}{64}$ | - | 4283 | 4285 | D |
| 23 | 4096 | 4160 | -64 | - | 4159 | 4129 | - | - | -4159 | -4127 | 8192 | -94 | $-\frac{520319}{32}$ | $-\frac{523327}{32}$ | - | 4251 | 4253 | S |
| 24 | 4160 | 4128 | -32 | - | 4127 | 4095 | - | - | -4127 | -4095 | 4096 | -4126 | | $-\frac{655359}{32}$ | - | 4219 | 4221 | S |
| 25 | 4128 | 4096 | 0 | + | 4095 | 4127 | + | - | 4095 | 4127 | 4096 | 12318 | | $-\frac{261183}{32}$ | - | 4187 | 4189 | D |
| 26 | 4096 | 4128 | -32 | - | 4127 | 4111 | - | - | -4127 | -4111 | 8192 | -46 | $-\frac{261183}{16}$ | $-\frac{261919}{16}$ | - | 4171 | 4173 | S |
| 27 | 4128 | 4112 | -16 | - | 4111 | 4095 | - | - | -4111 | -4095 | 4096 | -4110 | | $-\frac{327679}{16}$ | - | 4155 | 4157 | S |
| 28 | 4112 | 4096 | 0 | + | 4095 | 4111 | + | - | 4095 | 4111 | 4096 | 12302 | | $-\frac{130847}{16}$ | - | 4139 | 4141 | D |
| 29 | 4096 | 4112 | -16 | - | 4111 | 4103 | - | - | -4111 | -4103 | 8192 | -22 | $-\frac{130847}{8}$ | $-\frac{131023}{8}$ | - | 4131 | 4133 | S |
| 30 | 4112 | 4104 | -8 | - | 4103 | 4095 | - | - | -4103 | -4095 | 4096 | -4102 | | $-\frac{163839}{8}$ | - | 4123 | 4125 | S |
| 31 | 4104 | 4096 | 0 | + | 4095 | 4103 | + | - | 4095 | 4103 | 4096 | 12294 | | $-\frac{65487}{8}$ | - | 4115 | 4117 | D |
| 32 | 4096 | 4104 | -8 | - | 4103 | 4099 | - | - | -4103 | -4099 | 8192 | -10 | $-\frac{65487}{4}$ | $-\frac{65527}{4}$ | - | 4111 | 4113 | S |
| 33 | 4104 | 4100 | -4 | - | 4099 | 4095 | - | - | -4099 | -4095 | 4096 | -4098 | | $-\frac{81919}{4}$ | - | 4107 | 4109 | S |
| 34 | 4100 | 4096 | 0 | + | 4095 | 4099 | + | - | 4095 | 4099 | 4096 | 12290 | | $-\frac{32759}{4}$ | - | 4103 | 4105 | D |
| 35 | 4096 | 4100 | -4 | - | 4099 | 4097 | - | - | -4099 | -4097 | 8192 | -4 | $-\frac{32759}{2}$ | $-\frac{32767}{2}$ | - | 4101 | 4103 | S |
| 36 | 4100 | 4098 | -2 | - | 4097 | 4095 | - | - | -4097 | -4095 | 4096 | -4096 | | $-\frac{40959}{2}$ | - | 4099 | 4101 | S |

TABLE III.—*Continued*

| Cycle | INPUT $X_{i-2}$ | $X_{i-1}$ | $\bar{X}-X_{i-1}$ | $\Delta X_i$ | SQUARING $U_{i-1}$ | $U_i$ | $\Delta U_i$ | $\Delta Z_{i-1}$ | $U_{i-1}\Delta U_i$ | $U_i\Delta U_i$ | $-S\Delta Z_{i-1}$ | $\Sigma$ | $\rho_{i-1}$ | $\rho_i$ | Select $\Delta Z_i$ | SUMMING Square Root | Square | Magn. Cont. |
|---|---|---|---|---|---|---|---|---|---|---|---|---|---|---|---|---|---|---|
| 37 | 4098 | 4096 | 0 | + | 4095 | 4097 | + | - | 4095 | 4097 | 4096 | 12288 | | $-\frac{16383}{2}$ | - | 4097 | 4099 | D |
| 38 | 4096 | 4098 | -2 | - | 4097 | 4096 | - | - | -4097 | -4096 | 8192 | -1 | -16383 | -16384 | - | 4096 | 4098 | S |
| 39 | 4098 | 4097 | -1 | - | 4096 | 4095 | - | - | -4096 | -4095 | 4096 | -4095 | | -20479 | - | 4097 | 4097 | S |
| 40 | 4097 | 4096 | 0 | + | 4095 | 4096 | + | - | 4095 | 4096 | 4096 | 12289 | | -8192 | - | 4096 | 4096 | S |
| 41 | 4096 | 4097 | -1 | - | 4096 | 4095 | - | - | -4096 | -4095 | 4096 | -4095 | | -12287 | - | 4095 | 4095 | S |
| 42 | 4097 | 4096 | 0 | + | 4095 | 4096 | + | - | 4095 | 4096 | 4096 | 12287 | -12287 | 0 | + | 4096 | 4096 | S |
| 43 | 4096 | 4097 | -1 | - | 4096 | 4095 | - | + | -4096 | -4095 | -4096 | -12287 | 0 | -12287 | - | 4095 | 4095 | S |
| | | | | | . . . Problem has settled (solutions oscillating ± 1) | | | | | | | | | | | | | |
| | Changing the input $\bar{X}$ to 4095, the first 14 cycles are the same as above (...except for $\bar{X}-X_{i-1}$ being one unit lower than as shown). | | | | | | | | | | | | | | | | | |
| 15 | 3840 | 4096 | -1 | - | 4095 | 3839 | - | + | -4095 | -3839 | -4096 | -12030 | | $\frac{1114625}{256}$ | + | 3835 | 3581 | D |
| 16 | 4096 | 3840 | 255 | + | 3839 | 3967 | + | + | 3839 | 3967 | -8192 | -386 | $\frac{1114625}{128}$ | $\frac{1065217}{128}$ | + | 3707 | 3709 | S |
| 17 | 3840 | 3968 | 127 | + | 3967 | 4095 | + | + | 3967 | 4095 | -4096 | 3966 | | $\frac{1572865}{128}$ | + | 3835 | 3837 | S |
| 18 | 3968 | 4096 | -1 | - | 4095 | 3967 | - | + | -4095 | -3967 | -4096 | -12158 | | $\frac{16641}{128}$ | + | 3963 | 3965 | D |
| 19 | 4096 | 3968 | 127 | + | 3967 | 4031 | + | + | 3967 | 4031 | -8192 | -194 | $\frac{16641}{64}$ | $\frac{4225}{64}$ | + | 4027 | 4029 | D |
| 20 | 3968 | 4032 | 63 | + | 4031 | 4063 | + | + | 4031 | 4063 | -8192 | -98 | $\frac{4225}{32}$ | $\frac{1089}{32}$ | + | 4059 | 4061 | D |
| 21 | 4032 | 4064 | 31 | + | 4063 | 4079 | + | + | 4063 | 4079 | -8192 | -50 | $\frac{1089}{16}$ | $\frac{289}{16}$ | + | 4075 | 4077 | D |
| 22 | 4064 | 4080 | 15 | + | 4079 | 4087 | + | + | 4079 | 4087 | -8192 | -26 | $\frac{289}{8}$ | $\frac{81}{8}$ | + | 4083 | 4085 | D |
| 23 | 4080 | 4088 | 7 | + | 4087 | 4091 | + | + | 4087 | 4091 | -8192 | -14 | $\frac{81}{4}$ | $\frac{25}{4}$ | + | 4087 | 4089 | D |
| 24 | 4088 | 4092 | 3 | + | 4091 | 4093 | + | + | 4091 | 4093 | -8192 | -8 | $\frac{25}{2}$ | $\frac{9}{2}$ | + | 4089 | 4091 | D |
| 25 | 4092 | 4094 | 1 | + | 4093 | 4094 | + | + | 4093 | 4094 | -8192 | -5 | 9 | 4 | + | 4090 | 4092 | S |
| 26 | 4094 | 4095 | 0 | + | 4094 | 4095 | + | + | 4094 | 4095 | -4096 | 4093 | | 4097 | + | 4091 | 4093 | S |
| 27 | 4095 | 4096 | -1 | - | 4095 | 4094 | - | + | -4095 | -4094 | -4096 | -12285 | | -8188 | - | 4092 | 4092 | S |
| 28 | 4096 | 4095 | 0 | + | 4094 | 4095 | + | - | 4094 | 4095 | 4096 | 12285 | | 4097 | + | 4093 | 4093 | S |
| 29 | 4095 | 4096 | -1 | - | 4095 | 4094 | - | + | -4095 | -4094 | -4096 | -12285 | | -8188 | - | 4094 | 4092 | S |
| 30 | 4096 | 4095 | 0 | + | . . . etc. | | | | | | | | | | | 4093 | 4093 | S |
| | | | | | . . . Problem has settled (oscillating ± 1) | | | | | | | | | | | | | |

*Cycle 1*

Examining the first row of Table III (cycle one), $\Delta_i$, the new increment, has a value of one. (The $\Delta_{i-1}$, the previous value, is also one . . . no change having been made from the pre-start conditions.)

A. In the square root operation $U_{i-2}$ is read from both U and V tracks. This is the initial value 1,024. The initial $\Delta U$ is positive (since the increment memory has been cleared to all zeros or +1 increments). The updated $U_{i-1}$ is therefore $1024+1=1025$. The $\Delta Z$ increment is the output of the preceding squaring operation. Since algorithm B has not yet been computed, $\Delta Z$ comes from the increment memory and is also +1. Thus, $$-U_{i-2}\Delta U_{i-1}=-1024 \text{ and } -U_{i-1}\Delta U_{i-1}=-1025$$

Similarly, $+S\Delta Z_{i-1}$ is $4096\times(+1)=4096$. Summing these terms to obtain sigma (there being no $S\Delta X_i$ term): $\Sigma=-1024-1025+4096=2047$. Initially, the $\rho$-track has a zero stored so that $\rho_i=0+2047=2047$. The increment selected from the sign of this and the sign of $U_{i-1}$ is positive. In the second portion of algorithm A examination is made of the input. The old value of X or $X_0$ is 1024. This is added to old $\Delta X$ (+1) to obtain $X_{i-1}=1025$. This is subtracted from the step input, 4096, to give a difference of 3071. The selected increment is therefore positive. Since the difference, 3071, is much, much larger than the current increment size ($\Delta_i=1$), the result of this comparison will also control magnitude, i.e. it will introduce an Increase signal to the magnitude control unit. (See X-channel, Block III, FIGURE 4*b* and the magnitude control unit, Block IX, of FIGURE 4*c*.)

B. Proceeding to algorithm B, $U_{i-1}$ is the initial value 1024. $\Delta U$ is the input increment, $X_i'$ from algorithm A, computed to be positive. Therefore, the updated $U_i$ is $1024+1=1025$ (the increment magnitude not yet having been changed.) The $\Delta Z$ increment, which is the feedback or corrective increment coming from the preceding squaring calculation, has an initial positive value. The $U_{i-1}\Delta U_i$ term is 1024, $U_i\Delta U_i=1025$ and $$-S\Delta Z_{i-1}=-4096$$

Computing sigma: $\Sigma=1024+1025-4096=-2047$. Again $\rho_{i-1}$ is initially zero and $\rho_i=0-2047=-2047$. The selected increment based on $\rho_i$ and S is, therefore, negative. Algorithm B also accumulates increments from the square root operation. This having been positive, plus one (the current increment magnitude) is added to the initial value: $X_0+\Delta X=1024+1=1025$.

C. In algorithm C the square is up-dated:

$$X_0+\Delta X=256-1=255$$

At this point examination of the magnitude control resulting from the first cycle will be made. It has already been noted that an Increase-Increment-Magnitude signal from the input operation will be received and it will be remembered that this is sufficient to cause the increments to be increased during the next cycle. However, for greater understanding, examination of the other cause for changing increment magnitude, the squaring operation will be made. The quantity which will be examined here is $|\rho_i/S|$. This is $$\frac{2047}{4096}$$

and is less than unity. The control would say to Decrease-Increment-Magnitude. But the Increase-order takes precedence and the result is INCREASE.

*Cycle 2*

During the second cycle the increment magnitude is $2^1=2$. $\Delta_{i-1}$, the old magnitude, is one unit.

A. Algorithm A—The $U_{i-2}$ in the square root operation in the quantity which was $U_{i-1}$ in the preceding cycle, 1025. The ΔU is the output increment from the preceding cycle of the square root operation and is positive. The ΔZ is from the squaring operation and is negative. The following must be observed very carefully: Referring to the multiplier control unit, Block X of FIGURE 4*c*, is seen that the combination of Increase-Increment-Magnitude and Instruction 1, "use old increment magnitude, actuates C1 (Control 1) of the UΔT multiplier." Similarly, Instruction 2 and Increase actuates C1 of the VΔW multiplier and Instruction 4 and Increase actuates C1 of the SΔZ multiplier. Therefore, data traversing the multipliers in the U, V, and Z channels will follow the short path. This, in effect, will divide the quantities by two in comparison with the value obtained by following the normal or mid-path. The effect is indicated in the table:

$$-U_{i-2}\Delta U_{i-1}=-\frac{1025}{2}$$

As a result of the shift, $$-U_{i-1}\Delta U_{i-1}=-\frac{1026}{2}$$

and $$S\Delta Z_{i-1}=\frac{4096}{2}$$

Summing these quantities:

$$\Sigma=-\frac{6147}{2}$$

As a result of the Increase command alone, $\rho_{i-1}$ is also shifted to the right, i.e. toward lesser significance. $\rho_{i-1}$ is therefore $\rho_i$ from the previous cycle over 2, or $$\frac{2047}{2}$$

Combining Σ and $\rho_{i-1}$, there is obtained a new $$\rho_i=-\frac{4100}{2}$$

It should be noted that U, V, (and X) are returned to storage unshifted; the factor ½, however, remains a part of $\rho$ and represents the amount that $\rho$ has been shifted to the right, i.e. one digit of $\rho$ has been shifted to a point where it is now part of $\rho$-auxiliary. The selected increment, based on $\rho$ and U, is negative. In the X-channel, $X_{i-2}$ is 1025. To this is added the old $\Delta X=+1$ making $X_{i-1}=1026$. Comparing this with the step input (still 4096) there is obtained $\overline{X}-X_{i-1}=3070$. It is positive and the new ΔX will be positive. And as the difference is still much larger than the current increment magnitude, the increment size in the following cycle will again be increased.

B. In the squaring operation, $U_{i-1}$ is 1025. ΔU, the input increment (ΔX from algorithm A), is positive; and since it was computed during this second cycle $\Delta_i$ has a magnitude of two. They are added making $U_i=1027$.

Therefore, $U_{i-1}\Delta U_i=1025$ and $U_{i-1}\Delta U_i=1027$. Note that these figures are *not* divided by two; i.e. data follows the middle path (described in conjunction with FIGURE 4*a*) thru the multipliers. The reason for this is that although increment magnitude has changed, the increment involved in the increment-multiplication; i.e. ΔU, was computed during the *present cycle*. However, the $-S\Delta Z_{i-1}$ term is not so. Delta Z is fedback from the *preceding* squaring operation and is negative. Summing these three terms:

$$\Sigma=1025+1027+\frac{4096}{2}=\frac{8200}{2}$$

$\rho_{i-1}$ is also divided by 2 because of the increased increment magnitude. And $$\rho_i=\frac{6153}{2}$$

With both $\rho$ and S positive, the new increment is positive.

Summing the result from the square root operation, this is added to the old value 1025, the increment computed in the second cycle, −2. $X_i=1025-2=1023$.

C. In algorithm C, there is accumulated the output of the squaring operation, 255+2=257.

Again referring to increment magnitude, it was previously noted that the input operation has determined an Increase-Increment-Magnitude. If the input quantity had not been present, the effect of the squaring operation, i.e.

$$\left|\frac{\rho_i}{S}\right|=\frac{6153}{4096\times 2}$$

would force a decrease increment. The input control takes precedence and during cycle 3, $\Delta_i$ will increase to a value of 4.

*Cycle 3*

Following Row 3 across in the table, it is found that it is exactly analogous to Row 2. Once again in algorithm A, since increment magnitude has been increased, the terms in the UΔT, VΔW, and SΔZ multipliers are shifted making them respectively $$-U_{i-2}\Delta U_{i-1}'=\frac{1026}{2},\ -U_{i-1}\Delta U_{i-1}'=\frac{1024}{2}$$

$$SZ_{i-1}'=\frac{4096}{2}$$

so that $$\Sigma=\frac{6146}{2}$$

$\rho_{i-1}$ is again shifted right, the effect cumulative, so that the value to be added is $$\rho_{i-1}=-\frac{4100}{4}\text{ and }\rho_i=\frac{8192}{4}$$

The selected increment is positive. The reason for $\rho_i$ being accumulative in shifting is obvious since it is rewritten on a $\rho$-track while the terms from the multipliers are not saved but only summed and used in accumulating the new $\rho$.

The remaining cyclic operations introduce little that is new. It should again be noted that the result of the input operation is to increase increment magnitude and during cycle 4 the increment magnitude is 8. The increment magnitude will continue to increase until it reaches a value of 1024 in cycle 11. Further increase is permissible (to a maximum increment of $2^{13}$) but the size of the step-input with which we are dealing, 4096, makes such a value unnecessary. Note that at the time the step of 1024 is taken, $\overline{X}-X_{i-1}=2048$. To obtain another increase command, this difference must be *equal to* or *greater than* four times the current increment magnitude. Since it is not, no further increase command is obtained. Subsequent concern is with the control-effect of the squaring operation. During the 11th cycle, $\rho_i$ from the squaring operation is $$\frac{4196353}{1024}$$

and the control term is $$\frac{4196353}{1024\times 4096}$$

Because of the fact that the $\rho$-term has been shifted ten bits to the right (into $\rho$-auxiliary), the division by 4096 is already accomplished; and in the process in which the computer compares the contents of $\rho$ with S, all it is concerned with are the numbers 4098 and 4096. The result is now obvious but let us examine it in a little more detail.

$\rho_i$= 00001000000000010 | 0000000001.

←——$\rho_\Sigma$——→|←—$\rho_{aux.}$—→

S= 00001000000000000

In CVIC the comparison of these numbers consists of examining successive digits to determine the position of the last change in bit. Therefore, the last change in bit comes at the same point for both numbers. The "quotient" is therefore 1 and the result will be to decrease increment size. Rules for this embodiment: Decrease if less than 2; increase if greater than 8. The result is seen in the 12th cycle where the increment magnitude has decreased to 512.

Let us examine the 12th cycle in a little more detail: The $U_{i-2}$=2044; the ΔU computed during the preceding or 11th cycle gives a $U_{i-1}$ of 2044+1024=3068, etc. Now the three product-terms are *multiplied* by two. The reason for this is that the computer is now concerned with *decreasing* increment magnitude and the longest (C3) path is followed through the term-multipliers. The three terms become: $U_{i-2}\Delta U_{i-1}=-4088$, $U_{i-1}\Delta U_{i-1}=-6136$, and $S\Delta Z_{i-1}=+8192$. The summation is $\Sigma=2032$. The $\rho_{i-1}$ term is again divided by the present increment magnitude and is $$\frac{1056752}{512}$$

Computation proceeds exactly as before.

For the conditions given in the sample problem, increment magnitude is returned to unity in cycle 38. Any subsequent attempt to decrease it further is thwarted by the lower-limit-stop. Referring to the plot of the response as shown in FIGURE 6, the following observations may be made:

(1) The jaggedness in the square-root response is due to it having gotten ahead of the squaring operation and being forced to wait for it to catch-up.

(2) A single over-shoot occurs. For other problems, the problem may settle *without* overshoot. The cause of it is the particular value of the step-input being such as to *force* settling from the upper direction. Thus if the step had been 4095 instead of 4096, we would not have computed a $\Delta X=+256$ in cycle 15, but rather a −256. Settling would then have been from below. (See the dashed-line response in FIGURE 6.)

(3) One reason for the relative slowness of settling . . . of decreasing increment magnitude, is the manner of control: It would be much better to base the magnitude comtrol on $$\frac{R_i}{S}$$

rather than on $$\frac{\rho_i}{S}$$

But it is not economical to correct $\rho_i$ (by subtracting-off the $S\Delta_i$ to get $R_i$) at this time. And, during the next cycle when this correction is made, it is too late to be concerned with increment magnitude control since magnitude must have already been set.

(4) A second reason for the relative slowness of settling is the choice of scale factors. That is, safe scaling is not used in this problem. If it were, the $\rho$-term would never build up to be larger than S. In general it may be concluded that the less safe the scaling is made—(a) the longer it will take for the problem to settle (assuming that it will settle); or (b) the larger the pseudo-smoothing term must be made to counteract it. By pseudo-smoothing we refer to the factors governing increment magnitude control—especially that governing the Decrease-command (2 in this problem).

The above computations are repeated for the alternate step input $\overline{X}$=4095. This is also shown plotted in FIGURE 6. It will be noted the manner in which $\rho$ is changing (cycles 18–25). It is so small that increment magnitude is decreasing at maximum rate, i.e. by a factor of 2 each cycle. In fact, if allowed, $\Delta_i$ would obviously decrease much *more* rapidly.

A comparison of these two cases ($\overline{X}$=4095 and 4096) reveals that they represent the limits under which the CVIC will operate . . . the slowest and the most rapidly it can settle after approaching a solution (for the given scaling). Other values of the input will give intermediate response times.

*Setting proper initial conditions*

In the above-mentioned sample problem it will be observed that initial conditions, to be correct, should take into account two affects:

(1) That $\rho_0=0$ . . . in one CVIC embodiment there is no provision for inserting initial condition to $\rho$.

(2) Initially, all increments are positive—as a result of clearing the increment memory to zeroes.

Correct initial conditions may be computed (or determined experimentally) in the following manner:

(a) Set approximate initial conditions.

(b) Allow the machine to compute *without* input variables.

(c) Determine how much *change* has occurred to the variables which were pre-set by initial conditions after machine has settled.

(d) Correct the initial conditions of (a) by the bias which is determined in (c).

Correct initial conditions so determined are:

Algorithm A:

$$U_0=V_0=1023$$
$$X_0=1024$$

Algorithm B:

$$U_0=V_0=1025$$
$$X_0=1024$$

Algorithm C:

$$X_0=257$$

When so set, the final solution for a step input of 4096, oscillates 4096–4097 for both square and square-root . . . correctly.

PROGRAMMING

The preparation of binary coded information to be inserted into a computer which will achieve the desired operational setup is called "programming." The specific methods described below are those devised for this embodiment of CVIC and are to be taken as illustrative and in no way an optimum programming method.

The process of programming involves the following basic functions: (1) selection of certain arithmetic computer controls (instructions); (2) trade-off of the timing constraints and the required operational interconnections; (3) proper scaling of the problem variables; and (4) selection of magnitude controls to achieve a reasonable compromise between computation speed and accuracy. It is to be observed that certain of the instructions are uniquely fixed by the arithmetic function to be controlled. Other instructions are fixed by the relative locations of data sources providing inputs to the operation being programmed, or by deliberate programmer selection to achieve control of certain non-arithmetic computer functions.

The computer "operations" or "algorithms" are sequentially arranged around the computer drum or other memory device. As the memory drum rotates, the operations are processed one immediately after the other. As a consequence, the time required to compute the change in a single-operation problem or a sixty-four-operation problem is the same.

However, due to the data storage limitations which, for the most part can be traced to the use of a drum for all memory, the outputs of all operations are not available as inputs to a specific operation. Only a limited number of prior operations can be accepted as inputs. Therefore, the arrangement of operations to solve a problem in this embodiment depends to some extent upon the ability of the programmer to simultaneously satisfy the interconnection requirements of the equations and the data availability constraints of the computer.

The data availability to a given operation is furnished to the programmer by a special circular slide rule shown in FIGURE 7. The slide rule indicates the operation being programmed, and the time at which inputs from other operations may be obtained. The rule shows the four sources of incremental data. These "sources $\Delta X_1$, $\Delta X_2$, $\Delta Z_1$, $\Delta Z_2$, which correspond to the four read-heads on the $\Delta X$ and $\Delta Z$ memory, are identified and coded from the rule. These sources have previously been described in connection with the Increment Selection and Distribution Unit. On the inner scale of the rule, a numerical "relative address" is written, indicating the time at which the data is available. The programmer rotates the slide rule until an operation is found which has the desired inputs available from one or more of the four sources. It should be noted that any of 19 increments (a number equal to the word length) is available at *each* "source."

Because the magnitude on all increments are constrained during a computation cycle, it is necessary for the programmer to "instruct" the computer to identify at which time inputs to an operation have been computed. All data available in the computer storage have been computed in the present cycle or the one just preceding.

Due to delays in the arithmetic portion of the computer, data very recently computed may not yet be available for computation. Also, if the data used has been computed in a prior cycle, the increment is termed "old"; if the data were computed in the present cycle, the data is termed "new." An equation is used to establish when data is "new" or "old." But to avoid confusion, the proper ground-work not having been laid, this equation will not be included here.

The following instructions are fixed by the "old-new" relation: Instructions 1, 2, 3, 4, 6, or 7, 9 or 10, and 12 or 13. For example, for input operations, the data is always old; therefore, Instruction 7 is programmed as a 1. For outputs it may be new (Instruction 7=0) or old (Instruction 7=1) depending on when it was computed. The programming of Instruction 5, which specifies that this algorithm is to be used for increment-magnitude-control is determined by system requirements and depends upon a number of factors: (1) the scale factor, (2) range of variables, and (3) the dynamic response desired from the computer.

Once the programmer has satisfied the timing requirements and has all the inputs desired available to an operation, that data must be routed to the proper destination to perform a given arithmetic function. To facilitate binary coding of the program, work sheets are used by the programmer. The operations on the work sheets are separated by gaps corresponding to the gaps between words on the computer memory drum. These gaps are nineteen bits apart. On the programming sheet (not shown), the number of bits from a reference point on the drum is itemized. Every nineteenth bit is identified as a gap such as by means of a horizontal line. This horizontal line, or gap, signifies the beginning or location of an operation.

The work sheet is arranged in three groups of columns each of which contains five sub-groups. The last column of each group is for an alpha-numeric code for the binary row of each sub-group. The first column of the first group is used to record the scale factors for the operation; the second, $X_0$, the initial value of the input if an input operation is programmed for the computer, or the initial value of an output variable if an output operation has been programmed. Columns denoted by $U_0$ and $V_0$, the initial values of the arithmetic variables, are recorded.

In addition to the use of a work sheet, the programmer is also aided in establishing interconnections between operations necessary to solve the set of equations, by a special technique. A symbolic representation of a computer operation is used. FIGURE 8*a* illustrates the methods used to represent computer operations. It is to be observed that there are four generic input-output variables involved; that is, "T," "X," "W," and "Z," and two internal variables, i.e., "U" and "V." The values of U and V which are written on the programming sheet are identified by the arrows from the external inputs to the U and V points; e.g., in multiplications T and V, W and U, are identical numbers; therefore, on the programming sheet, the initial value of U is the initial value of W, and likewise the initial value of V is the initial value of T.

It is to be observed that there is only one basic symbol involved. The implicit or indirect computer operation is the explicit or direct operation "turned around"; that is, the input to the implicit operation is the output of the explicit operation. In programming incremental operations the output, "Z" for explicit operation, and "W" or "U" for implicit operations, is used for feedback purposes. The feedback increment must be programmed for all operations listed. The feedback increment has a relative address of 18 in this embodiment, and the source is always $\Delta Z_1$, or 00 in Add 4 and Add 5. The destination is $\Delta Z$, (100 in Add 1, 2, 3), for explicit operations, or is $\Delta U$, $\Delta W$, (001), for implicit operations. The only exception to the implicit rule is the square root operation when T, W, U and V are all the same increment. In this case, the $\Delta U$, $\Delta W$, $\Delta V$, $\Delta T$-destination is used for the feedback increment. In FIGURE 8*b* there is shown a symbolic flow diagram of the square root-squaring problem which has been described hereinbefore.

The program is prepared according to the directions outlined above. It is then punched on paper tape and transferred to the computer. Upon activation, this embodiment will accept as inputs, binary coded word representing up to fifteen independent variables and, through he programmed outputs, provide the solutions to the problem. For a more detailed explanation of the programming technique described hereinbefore refer to an article appearing in the Automatic Control, March 1960 edition, entitled "Accelerated Programming for GEVIC in Real Time Applications" by E. A. Shemeta.

CORE-DIODE LOGIC

Having described in some detail the variable incremental computer as disclosed in the block diagrams of FIGURES 2 and 3 and detail logic diagrams of FIGURES 4*a*, 4*b*, 4*c*, 4*d* there will now be described the various blocks or subsystems which are shown in the other drawings relating to this invention.

In FIGURES 9*a*, *b* and *c* there is shown in core-diode logic those portions of a specific embodiment of the subject invention, namely the U, V, X and Z-channels which are composed of magnetic core logic circuits. It is to be observed that all of these circuits are shown in symbolic notation for core-logic circuits, it will be understood that these are for purposes of description only. Other types of circuits may be used if desired, for example, magnetic films or transistor circuits or other well-known electronic computer circuits. It should be further observed that the Instructions noted in FIGURES 9*a*, *b* and *c* are not to be considered the same as those noted in FIGURES 3 and 4 although the numbers are the same. An excellent discussion of various computer components and circuits, which may be used in conjunction with this invention, is found in the book "Digital Computer Components and Circuits" by R. K. Richards (D. Van Nostrand Company, Incorporated, 1957). A schematic diagram of a full word adder may be found in co-pending patent application of E. H. Cabaniss and J. S. Prince, Serial No. 809,643, filed April 29, 1959, entitled "Variable Increment Computer," and the various logic circuits shown in said full word adder are fully explained in co-pending patent application of Clarence P. Christensen and Edward H. Cabaniss, Serial No. 660,003, filed June 17, 1957, entitled "Magnetic Core Logic Circuits," both of which are assigned to the same assignee as this invention. In view of the detailed description included in the above-mentioned pending patent applications, no extensive description is deemed necessary in connection with the subject core-diode logic circuits.

In the upper portion of FIGURE 9, there is shown the U-channel. It is to be observed that within the U-channel there is shown the summing or serial adder 17 which is comprised of cores 11—5A and 11—5B, 12—5A and 12—5B, and 12—6A and 13—5B. Complementer 19 comprises cores 17—7A and 17—7B and cores 18—7A and 18—7B. In operation, the old value, $U_{i-1}$, is taken from the U-track via read amplifier R22 through cores 12—4A and 12—4B for wave shaping and branching, respectively. The branch on core 12—4B is for input to the punched-tape-reader programmer and is not involved in the algorithm. The increment $U_i'$ is added to $U_{i-1}$ and the sum, $U_i$, is rewritten on the U-track via write amplifier W10. The inhibit on the input to core 12—6B, a tau pulse obtained at the required time from the timing register, operates to clear the gap between successive words. Two drum tracks are associated and illustrated in connection with the U-channel. These are noted as 1U and 2U between which are a read amplifier R10 write amplifier W11. This arrangement is necessary to prevent data from precessing on the drum since physically, read and write heads must be located some distance apart (0.3–0.4″ minimum). This represents a delay of 40–50 clock pulses—about 10 times the delay available in traversing the arithmetic. Thus, two tracks are utilized to develop the total loop. Each track contains approximately half of the loop. The four heads are positioned such that the total loop is exactly 1216 clock pulses long, which is 64 algorithms (or words) at 19 bits each. Thus, the up-dated word is returned to the exact spot from which the old value was read.

Cores 13—4A and 13—4B and 14—4A and 14—4B compose a pair of flip-flops as shown for X in FIGURE 3 as 103 and 107. These flip-flops store Instructions 1 and 2 for the full word length which as we have noted previously control whether the old or new increment magnitude ($\Delta_{i-1}$ or $\Delta_i$) is to be added to the $U_i$. If the new increment is to be used, Instruction 2 is programmed; if the old increment is to be used, Instruction 1 is programmed. The output of these flip-flops AND's the proper magnitude from the *t*-loop. If $U_i$ is equal to $U_0$ (as in the addition or subtraction operations), neither Instruction 1 nor Instruction 2 is programmed and, therefore, no increment is added to $U_{i-1}$. At the start of the operation, it is not known when the $\Delta_i$-pulse (representing current increment magnitude) will occur. If the current increment magnitude is $2^0$, the $\Delta_i$-pulse will come in a $2^0$ position, but if it has increased, $\Delta_i$ will come at some later time. It is, therefore, necessary to retain the instructions for at least 14 clock pulses or until the $\Delta_i$-pulse occurs.

The proper $\Delta_i$ or $\Delta_{i-1}$ is transmitted through core 14—5A to the input of the adder and to core 14—5B. Whether it will return from core 14—5B to core 14—5A (i.e., be retained in this flip-flop composed of 14—5A and 14—5B) depends on the state of the core 15—5B. If the increment to be added is negative, flip-flop 15—4B and 15—5A will have been turned on at the start of this word (coming from the storage flip-flop 16—4A and 16—4B). If so, it will function to hold on, flip-flop 14—5A and 14—5B, adding the two's complement of $U_i'$. The increment was looked up beforehand as previously described and retained in flip-flop 16—4A and 16—4B from the time obtained until the start of the operation, defined by tau —4A.

It is to be observed that increment multiplication takes a slightly different form. The word to be multiplied by the increment, $V_{i-1}$, comes into core 18—5A from core 22—4B of the V-channel. The cores 5A thru 6B act to delay it and bring it into the complementer at the proper time. The flip-flop 19—6A, 19—6B will, under control of special increment $\Delta T_1^*$, prevent $V_{i-1}$ from entering the multiplier, thus logically switching the $V_{i-1}W_i'$ term out of the algorithm. The other input to the complementer is the sign of the increment modified (Instruction). The sign of the increment comes from the retention flip-flop of 16—4A and 16—4B and is enabled by Instruction 3. (Note that this instruction is necessitated by the fact that the increment is taken directly from the buffer flip-flop. In FIGURE 4*a* the necessity for a buffer was not included and therefore this instruction was not needed.) It passes through an "Exclusive-OR," the other input of which is Instruction 4 (at 16—5A). Instruction 4, if present, will complement the W′ increment; if there is no Instruction 4 and the increment is negative (or vice versa), then $V_{i-1}$ is two's complemented. Under the two other cases, $V_{i-1}$ is not complemented. Under the two other cases, $Vi_{-1}$ is not completed. The flip-flop of cores 17—6A and 17—6B retains the increment-instruction combination for the full word and controls the complementer flip-flop (17—7A and 17—7B). The output of the complementer block 19 (cores 17—7A and B, 18—7A and B) then goes to the delay unit block 21. The two externally developed inputs are from transistors T482 and T483.

The latter portion of the computer i.e. that following the development of Σ, is transistorized. This includes the development of the controls on increment magnitude. Therefore, it is a transistor control on the increment multipliers or variable delay units such as block 21. The control consists of a delay of two clock pulses, one of core 18—8A and B, the other of cores 18—9A and B. The short path used to advance the product position of VW′ is controlled by the presence of a "one" from T482, "ANDING" down the short path and inhibiting the input to the longer paths. The control for the middle path, which would indicate that there is no change in the increment size or that a new increment is being used, comes from transistor T483 and "ANDs" the middle path, inhibiting the longest path. If neither control pulses from T482 or T483 are present, neither the short nor the middle path will be "ANDED" and the longest path will not be inhibited. From this point the word will progress through core 18—9B to core 19—9A and out (the longest delay). It should be observed that the timing pulse $\tau$ is used in several places. The functions of this timing pulse are obvious: The timing pulse is used for turning on flip-flops at the start of the operation, clearing them at the end, enabling control pulses, etc.

Except for different inputs ($V_{i-1}$ to the adder, $U_i'$ to the multiplier, etc.) and the delay 18—5A through 18—6B, the V-channel is identical to the above described U-channel. The X-channel is also very similar with $X_{i-1}$ input to the adder and S to the multiplier. However, because of the necessity to program a zero-SX′ term, the logical $\Delta T^*$ is replaced by Instruction 11, and the action of the retaining flip-flop changes from inhibition to "ANDING."

The Z-channel consists simply of a multiplier and a complementer. Operation is basically similar as in the preceding units except that an alternative embodiment is used (described hereinbefore) and no instruction control is provided on the increment input; there is always an SZ' term and it is always —SZ'. There is no "Exclusive-OR" such as was shown in Block IV of FIGURE 4*b*. This means that in the indirect operations (where Z' is the input rather than the output) a negative S must be used. But since S may be either positive or negative attention should be drawn to the instruction line. It is all filled, all 19 of the available pulses are used for various control purposes. In the U-channel, the instructions are read from the drum via read amplifier R31 entering core 18 minus 7A. This minus 7A is somewhat facetious; it is not negative time. In one embodiment of the computer, time zero is arbitrarily chosen as occurring at the input of the tau pulse (see core 46—0A). Instructions, to be available, are read from the drum ahead of time and branched from the instruction line sections as indicated in FIGURE 9.

It is to be observed that the instruction line is continuous through the U, V, X and Z-channels in FIGURE 9. The output of 18—5B feeds to the instruction line in the V-channel 28 minus 4A; 28 minus 1B feeds to the X-channel 38—0A; and 38—3B is the final core output of the instruction line and feeds to the transistorized circuits to be described hereinafter. Careful attention should be made of the branching on the instruction line. For example, in the X-channel it is to be observed that both instructions 10 and 11 emanate from core 38—2B. They are different controls and are used at different times. Examining timing within the unit it is seen that Instruction 11 is used one clock pulse later than Instruction 10. The instructions appear sequentially in the instruction line but, because they are used at different times, they branch on the output from the same core.

The four multiplied quantities are summed in adders 29, 37 and 43 shown in FIGURE 2. The actual mechanization as appears in FIGURE 9 differs somewhat from the block diagram of FIGURE 2 in that U and V are combined in adder 29; X and Z in adder 37. These two combinations are further combined in adder 43. It is to be observed that a slight difference exists between these adders and those used for summing increments in the U, V and X channels. As shown in FIGURE 9, there are additional "AND" inputs of the $\bar{\tau}$ pulse to the carry flip-flop (see core 51—10A and 51—10B). These are required for the following reason: In the increment adders, one main concern is that of clearing the gap to prevent the propagation of a "one" across it. In the summing adders shown in FIGURE 9 no gap exists. Thus, a "carry" cannot be tolerated because this would conflict with the next word. The reason that there is not a gap at the output of the increment multipliers is because of the shifting which has taken place in the variable delay units.

The remaining portion of the core diode logic diagram of FIGURE 9 is concerned with developing tau-timing pulses, the Δ's for summing increments, with mechanizing the variable delay in the rho-loops and with the mechanization of circuits for selecting increments on input quantities. The $X_i$ term, developed at the output of the X-summing adder (core 32—6B), is branched as the input to core 66—7A. $X_i$ is complemented in cores 65—8A and B, and 66—8A and B. The output of the adder is $(\overline{X}-X_i)$. The sign of this difference is examined to determine the sign of the new $X'_{i-1}$ increment. Mechanically, the difference fed into flip-flop 68—11B, 68—12A is inhibited except during the time when the sign-bit is available. The sign is held in this flip-flop until it can be transferred via transistor T363 to the X'-track (the increment storage track). The "Exclusive-OR" of core 67—10A and B, 67—11A and 66—10B are associated with control of the increment magnitude. Cognizance must be taken of both input and output quantities in controlling increment magnitude. The input quantities are used only to Increase the increment magnitude, never to decrease it. The reasons for this are straightforward. The inputs will decrease in size before the outputs; there is a lag inherent in the computer in developing a solution from the inputs. Therefore, there is no set necessity to be concerned about decreasing increment size until the computer results are such that it is approaching the solution. The "increase" order is actuated via transistor T581 whenever the difference $(\overline{X}-X_i)$ is four times as large as the current increment magnitude $(t_{11})$. As $t$ is not available at the proper time, in this embodiment it is counted in transistor circuits to be described hereinafter and returned to the cores at the appropriate time.

The remaining portion of the core diagram designated 81 is concerned with the $U_o$, $V_o$, $X_o$-loops and is used for reading initial conditions from these tracks to the $U_i$, $V_i$ and $X_i$-tracks when starting or resetting a problem. This action is appropriately designated as "setting of initial conditions" and is controlled externally by turning on the flip-flops of cores 47—0B and 47—1A.

TRANSISTORIZED COMPUTER CIRCUITS

In FIGURES 10, 11 and 12 are shown transistorized circuits for increment control, increment distribution, random access switching, variable delay unit control, and timing circuits and dynamic response control. It is to be recognized that the circuits as shown are illustrative of one embodiment of the invention. Referring specifically to FIGURE 10 (*a*, *b* and *c*), the transistors are shown in logical array. The squares represent flip-flops, and the half circles represent "NOR" circuits. The triangles represent specialized transistor circuits associated in going from core circuits to transistor circuits and are required because of the differences in wave shape and impedance level between core and transistor elements.

Multiple transistors are frequently used because of the limited branch capability of the transistor "NOR" circuit. For reliability, a "NOR" is only permitted to drive three loads and a flip-flop to drive two loads. This limitation accounts for many of the transistors included in FIGURES 10 to 12. For example, the output of transistor T135 in FIGURE 10 branches in three directions; it drives the "one" input to flip-flop T121; it is inverted in T136 to provide the "zero" drive; and it furnishes one input to "NOR" circuit T132.

Referring to flip-flop T121 in some detail, it is to be noted that a second input to this flip-flop (not shown) is a clock input A.C. set. Whenever the A.C. set is not shown in the drawing, it is understood to be the clock. This clock is a square wave and is different than the sinusoidal clock used for the cores although of the same frequency. Functionally, the leading edge of the clock pulse is differentiated by a capacitor at the input to the flip-flop. This sharp pulse combined with the D.C. set (the "NOR" signal input to the flip-flop), is enough to put it over the threshold and set the flip-flop to the desired state. Thus, if there is a "one" D.C. on the one input and a "zero" on the zero input, the clock will set the flip-flop to a "one" state. If there is a "zero" D.C. on the one input and a "one" on the zero input, the clock will set it to a "zero" state. The previous state of the flip-flop has no effect on the operation. The D.C. level at the input is set up by "NOR's" (or other flip-flops) previous to the time when it receives the clock pulse. The output from the flip-flop occurs following the rise of the clock pulse and is available during that clock interval (before the next rise) for performing logic. As both logic and flip-flop recovery are time consuming, the number of "NOR's" between re-clocking flip-flops is limited such that all transistors will have "died out" and the proper D.C. level will be firmly established before the next A.C. set. One function of the flip-flop may thus be to resynchronize data before proceeding to the next level of logic.

All of the variable delay units, including those in the rho-loop, are made of cores. Thus, the rho-track in FIGURE 9 feeds to the multiplier at 61—10A; the output 62—12B feeds via transistor T503 to the circuit shown in FIGURE 10, and is the input to 11-rho. The 21-rho is the 2$\rho$ track whereas 11-rho is the 1$\rho$ track. The flip-flops T521 and T522 are used for synchronizing purposes, i.e., to make sure that everything occurs at the same time at the output of the core circuits. Different pulses may vary in time within a one clock pulse interval. The output from a core is not a half sine wave but a fairly sharp pulse appearing somewhere within the half sine wave (it can drift over a considerable portion of it). To make sure that different outputs are in phase, they are "clocked" in flip-flops. It is to be recognized that the transistorized "NOR" and flip-flops are standard type circuits and are designed for the "worst case" for maximum reliability.

The rho-terms are operated on by T661 via T101, 103, 165 and 166 to develop the $\rho_A$ and $$\rho_\Sigma$$

(the rho-auxiliary and the $$\text{rho}=\Sigma$$

tracks). Flip-flop T661 is "on" during odd-numbered algorithms and affects the reorganization of rho shown in FIGURE *5a*. The portion of rho which is in time-coincidence with $\Sigma$ (the summation of the four core delay-unit outputs) is added to $\Sigma$. Any "carry" propagated from this addition is added to the more significant portion of rho now located in rho-auxiliary ($\rho_A$). The $\Sigma$-adder consists of T112, 106, 113, 111, 114 and 151 (carry flip-flop), 115 and 135 or 116. The sum is available at the outputs of both T135 and 116. Any carry which is developed in combining $\Sigma$ and $$\rho_\Sigma$$

is transferred through T152, using $\bar{\tau}$11 (negated tau-11) as the gating pulse, to set the carry flip-flop T153, of the second adder. This is the rho-auxiliary adder which is basically the same as the $\Sigma$-adder; one different input to the $\rho_A$ adder, $\lambda_{12}$, is introduced to clear the gap similar to the "clear" pulse required in the core increment adder circuits. It is not used in the $\Sigma$-adder as no gap exists there (a "clear" is provided directly to the "carry" flip-flop T151). In the auxiliary loop, it is necessary to insure the existence of a gap between the more significant portion of $\rho_{n-1}$ and the less significant portion of $\rho_{n+1}$ (see FIGURE *5a*).

It can be demonstrated that, because of the use of scale factors (S) and of the double-length rho capacity, rho can never grow to full double word length. As standard binary coding is used, repeated signs exist in rho beyond the most significant magnitude bit. However, when the increment magnitude is increased, rho is shifted in the direction of lesser significance. A "gap" thus is left at the more significant end which must be filled by an additional sign bit. This is necessitated by the fact that $\lambda$ remains fixed and is used to locate the sign bit (of $\rho$) for use in both the increment selector and in the magnitude control unit. The $\lambda$ is used via T345–346 to generate the repeated sign-bit when $\rho$ is shifted right by an "Increase" signal.

Determination of whether the current increment magnitude (which is the same for all variables during the present cycle) is correct or should be changed for the next cycle, is based on a comparison of the rho and associated S term (or $V_i$). If $$\left|\frac{\rho}{\Delta}\right|>|\eta S$$

then $\Delta_{i+1}=Z\Delta_i$, etc. Because of the shifting of rho, division by $\Delta$ is already accomplished and the S term must be compared only with the more significant portion of rho, i.e., with $$\rho_\Sigma$$

and with that part of $\rho_A$ which precedes $\lambda$ (see FIGURE 5). Also, since it is not known ahead of time whether rho and S (or V) are positive or negative, the comparison process must be independent of sign. This is done by examining for a change of successive digits (from 1 to 0 or 0 to 1) rather than for the digits themselves. For example, if $\rho=+34$ (00100010) and $$\eta S=-13\ (11110011)$$

the last transition in rho (from 1 to 0) occurs later in the word than the last transition in $\eta$S (from 0 to 1), so that $$\left|\frac{\rho}{\Delta}\right|$$

is greater than $\eta$S. This is basically the comparison process which is mechanized in the subject embodiment.

Specifically: (1)

$$\rho_\Sigma$$

is examined two bits at a time starting at the least significant bit. A zero-to-one or one-to-zero transition is noted. (2) At the same time, the corresponding S (or $V_i$) is examined in the same manner with transitions again noted. (3) The more significant digits of $\rho_A$ . . . , those preceding $\gamma$ are treated likewise. (4) The results of steps (1), (2) and (3) are combined in such a way as to determine the desired modification to the increment magnitude. The four steps are repeated for each internal variable selected for control and all of the results for the entire cycle are combined (along with the results of examining input data) into a composite decision which will control the magnitude during the next cycle.

The above functions are readily recognized in FIGURE 10. For step (1), $$\rho_\Sigma$$

is delayed one bit via flip-flop T121 to make two successive bits available for examination. They are combined in an "Exclusive-OR" T132, 134, 131 and 133 such that a transition will tend to set flip-flops T141 and T143. For step (2), S is delayed in flip-flop T321 and examined in an "Exclusive-OR" T302, 312 and 322. For step (3), rho-auxiliary is delayed in flip-flop T193. The region of examination, from start to $\lambda$, is controlled by flip-flop T353. Its output "enables" the "Exclusive-OR" T181 and 183. For step (4), the operation results of the comparison are stored in flip-flops T141 and 143. These are set by a transition in step (1) and cleared by a function of step (2): T141 is cleared by step (2) directly. The output of the step (2) comparison is delayed 1, 2 or 3 additional clock pulses (in T323, 331 and 333) as preselected and is used to clear T143. The selected delay determines the value of "*n*." The "worm" ($\xi$) is also set by this and, as mechanized, equals 2*n*. (See Table IV below.) The sample operations, as shown, are fictitious (with $\nabla\geqslant 1$ and $\nabla\geqslant 2$) and are included only to indicate the control method.

TABLE IV.—SAMPLE OPERATIONS —$\Delta$ CONTROL

| $\rho/\Delta_i$ | $\eta$S | Date Examined | | $\nabla\geq 1$ | $\nabla\geq 2$ | Result: $\Delta_{i+1}$ |
|---|---|---|---|---|---|---|
| | | $\rho/\Delta_i$ | $\eta$S | | | |
| 7 | 12 | 11. | 00. | 0 | 0 | |
| (00111.) | (01100.) | 11 | 10 | 0 | 0 | |
| | | 01 | 11 | 1 | 1 | |
| | | 00 | 01 | 0 | 0 | |
| | | 00 | 00 | 0 | 0 | Decrease |
| −7 | −12 | 01. | 00. | 1 | 1 | |
| (11001.) | (10100.) | 00 | 10 | 0 | 0 | |
| | | 10 | 01 | 1 | 0 | |
| | | 11 | 10 | 0 | 0 | |
| | | 11 | 11 | 0 | 0 | Decrease |

TABLE IV—*Continued*

| $\rho/\Delta_i$ | $\eta S$ | Date Examined $\rho/\Delta_i$ | Date Examined $\eta S$ | $\nabla\geq 1$ | $\nabla\geq 2$ | Result: $\Delta_{i+1}$ |
|---|---|---|---|---|---|---|
| 7 | −12 | 11. | 00. | 0 | 0 | |
| (00111.) | (10100.) | 11 | 10 | 0 | 0 | |
| | | 01 | 01 | 1 | 0 | |
| | | 00 | 10 | 0 | 0 | |
| | | 00 | 11 | 0 | 0 | Decrease |
| −7 | 12 | 01. | 00. | 1 | 1 | |
| (11001.) | (01100.) | 00 | 10 | 0 | 0 | |
| | | 10 | 11 | 1 | 1 | |
| | | 11 | 01 | 0 | 0 | |
| | | 11 | 00 | 0 | 0 | Decrease |
| 13 | 12 | 01. | 00. | 1 | 1 | |
| (01101.) | (01100.) | 10 | 10 | 1 | 0 | |
| | | 11 | 11 | 1 | 0 | |
| | | 01 | 01 | 1 | 0 | |
| | | 00 | 00 | 1 | 0 | Same |
| −13 | −12 | 11. | 00. | 0 | 0 | |
| (10011.) | (10100.) | 01 | 10 | 1 | 0 | |
| | | 00 | 01 | 0 | 0 | |
| | | 10 | 10 | 1 | 0 | |
| | | 11 | 11 | 1 | 0 | Same |
| 13 | −12 | 01. | 00. | 1 | 1 | |
| (01101.) | (10100.) | 10 | 10 | 1 | 0 | |
| | | 11 | 01 | 0 | 0 | |
| | | 01 | 10 | 1 | 0 | |
| | | 00 | 11 | 1 | 0 | Same |
| −13 | 12 | 11. | 00. | 0 | 0 | |
| (10011.) | (01100.) | 01 | 10 | 1 | 0 | |
| | | 00 | 11 | 1 | 0 | |
| | | 10 | 01 | 1 | 0 | |
| | | 11 | 00 | 1 | 0 | Same |
| 18 | 12 | 10. | 00. | 1 | 1 | |
| (010010.) | (01100.) | 01 | 10 | 1 | 0 | |
| | | 00 | 11 | 1 | 0 | |
| | | 10 | 01 | 1 | 0 | |
| | | 01 | 00 | 1 | 1 | |
| | | 00 | 00 | 1 | 1 | Increase |
| −18 | −12 | 10. | 00. | 1 | 1 | |
| (101110.) | (10100.) | 11 | 10 | 0 | 0 | |
| | | 11 | 01 | 0 | 0 | |
| | | 01 | 10 | 1 | 0 | |
| | | 10 | 11 | 1 | 1 | |
| | | 11 | 11 | 1 | 1 | Increase |
| 18 | −12 | 10. | 00. | 1 | 1 | |
| (010010.) | (10100.) | 01 | 10 | 1 | 0 | |
| | | 00 | 01 | 0 | 0 | |
| | | 10 | 10 | 1 | 0 | |
| | | 01 | 11 | 1 | 1 | |
| | | 00 | 11 | 1 | 1 | Increase |
| −18 | 12 | 10. | 00. | 1 | 1 | |
| (101110.) | (01100.) | 11 | 10 | 0 | 0 | |
| | | 11 | 11 | 0 | 0 | |
| | | 01 | 01 | 1 | 0 | |
| | | 10 | 00 | 1 | 1 | |
| | | 11 | 00 | 1 | 1 | Increase |

At the end of the Σ examination, the data in flip-flops T141, 143 is stored across to flip-flops T211, 213. The examination of rho-auxiliary continues per step (3) described hereinbefore. A transition (bit change) in this portion of $\rho_i$ can only mean "increase increment magnitude" since, being greater than a single word in length, it is much larger than S. Therefore, such a transition is stored directly to the "increase" flip-flop T213. A third "set" input to T213 comes from the X-control, core 66—10B, which was described previously in connection with the core diode logic circuit of FIGURE 9. It is to be observed that the flip-flops T141, T143 look at the individual operations separately, while T211 and 213 combine the results of all control algorithms (Instruction 5) for the entire cycle. The former are re-set during each operation by S (which is always present during each operation). The latter flip-flops are reset at the start of the computer cycle by the reference pulse SP.

At the end of the cycle, the accumulated results are located in T211 and 213 as "Increase" and "Do-Not-Decrease" orders. They are modified logically to "increase" or "decrease" commands and are transferred over to T241, 243 by SP and used subsequently to control all variable delay units during the succeeding cycle. The complete controls for shifting *t* and both rho-terms are shown at the right in FIGURE 10. They originate from T241 and 243. Thus, T274, 275, 276 control *t* (see FIGURE 9) and T261 and 262 control 11$\rho$. However, as two rho-terms overlap (two words long each and overlap by one word), the T143 shifting control for 21$\rho$ must be initiated one word later than for 11$\rho$ and also turned off one word later. This control-delay is introduced by flip-flops T291, 293; the control on 21$\rho$ is from T281, 282.

The controls for the four term-multipliers originate with T251 and 253 and are continued in the lower right portion of FIGURE 11. It is to be observed that increment multiplication is a function not only of the incremental history (how magnitude has been changed since the last cycle), but also of the cycle during which the subject increment was computed—whether it is new or old. The former information is contained in T251, 253. The latter is programmed by instructions. The instructions read from the core shift register at 38—3B to a transistor continuation T372, 451, 461, 401, 411, 431 and 441 in this order. Once each word, the instructions are fed in parallel to "hold" flip-flops T403, 413, 433, 443. Controls are combined as outlined in the discussion on logic and shown in FIGURE 11. Thus, the $C_1$ and $C_2$ of the $U_1T_1'$ multiplier comes from T482, 485 and 486, etc.

Returning to the control flip-flops T241 and T243 in FIGURE 10, it is noted that the inputs to these are under the control of upper and lower increment magnitude limits from T541 and T543. Both limits are determined by *t* (from cores via T591). Thus, when the increment magnitude is minimum, ($t\equiv\tau$). The "Decrease" flip-flop T241 is not permitted to be set regardless of the results from the normal control circuits. The upper limit is selectable in this embodiment of the invention. It is controlled by $\lambda$. That is, when $t\equiv\lambda$, the control operates to prevent the "increase" flip-flop T243 from being set. The position of $\lambda$ and, thus, the maximum allowed increment is switch-selected (FIGURE 12). Any desired maximum increment from $2^0$ to $2^{13}$ (excepting $2^{12}$ . . . it being a 12 position switch only) may be chosen. Thus, in the $2^0$ position the invention will operate as a fixed increment machine (with a general algorithm). In the $2^{13}$ position, it can use increments as large as 8192, etc.

The selection of the Z'-increments will now be described. The sign of the increment only is to be chosen. It is a function of the sign of $\rho_i$ and of S for the direct or $V_i$ for the indirect operations; the increment is positive if the signs of $\rho$ and *s* are alike, negative if they are different (except as noted for square root operation). The items to be considered are: (1) the sign of S occurs at the end of Σ interval; (2) the sign of rho occurs during rho-auxiliary at a position determined by $\lambda$; (3) the position of $\lambda$ is variable (switch-selected); and (4) the increment is to be stored to the increment memory at a fixed point. The resultant mechanism is therefore as follows: (1) the sign of *s* is stored in flip-flop T191 under the control of tau; (2) successive bits of rho-auxiliary are combined with the sign of S via an "Exclusive-OR" (T341, 342 and 343); (3) at the time that the sign of rho is available ($\lambda$), the output of the "Exclusive-OR" is gated to a storage flip-flop T351 as the sign of $\Delta Z_i$; (4) at the end of the rho-auxiliary interval (just before the new S-sign is stored), the sign of $Z_i'$ is gated by $\tau$ to the circuits at the upper right portion of FIGURE 11 for storage.

The selection process is modified under control of Instruction 19 for the square root operation. There are two acceptable square roots, the positive and the negative roots. Without Instruction 19, the computer's choice is indeterminent, that is, it may compute the positive or negative. The control logic is: do not choose a negative increment if the computed square root ($V_i$) is negative. Thus, if the root starts negative, the instruction forces it positive. The instruction control is introduced to T341 of FIGURE 10 from flip-flop T495, 496 of FIGURE 11.

After $\rho_\Sigma$ and $\rho_A$ have been examined as separate terms, they can now be recombined for rewriting on the rho-tracks. This is done in the "NOR" circuits of T681 and 683, T682 and

684 forming the switch 59 of FIGURE 2. The rho terms are then restored. The remaining portions of FIGURE 10 are transistorized circuits used for the setting of initial conditions and developing controls such as the single pulse control. In the lower right-hand portion of FIGURE 10, there is shown the counter circuit used in examining the input quantities as a control on the increment magnitude. As indicated, the output of the counter feeds to core 65—10A (FIGURE 9), a flip-flop which allows the "Increase" signal to feed over via T581 to set the "Increase" flip-flop T213 of FIGURE 10. The counter is used to develop a properly delayed *t*-pulse because the control necessary for this function is not available at the proper time. The counter just counts clock pulses from the time it is set by *t* until overflow.

In FIGURE 11 (*a*, *b* and *c*) there is shown in transistorized form, one embodiment of the increment distribution, random access memory switching, and increment-multiplier control. The left-hand portion of the figure contains those circuits dealing with the dual addressing problem, that is, selecting increments and transmitting them to the appropriate points in the computer. There are four "read" heads on the two random access memory tracks which are designated as $\Delta X$ and $\Delta Z$. Two bits of the address are associated with selecting which of these four "read" heads will be read. The other three bits of the address determine wherein the computer the selected increment is to be used. The increments and addresses are combined in a straightforward "NOR" circuit matrix to yield the proper drive. The outputs of the "NOR's" are labelled in FIGURE 11 to show the coding involved in each case. For example, let us consider the output of "NOR" T701: The inputs to T701 are derived from the first read head of $\Delta Z$, that is, from R13, from the address track R38, and from the address track R39. Thus, if the first two tracks are both zeros as denoted at the output of T701, $\Delta Z_{64}$ will be selected, the first "read" head on $\Delta Z$. Similarly, T702, 703 and T751 are coded to select between the other three "read" heads. The output of the selected increment memory source are gated by the other three address "read" heads into one of seven lines. These are the outputs of "NOR's" T721, T723, T726, T713, T716, T731 and T733, coded as noted in the figure. Thus, if addresses R33, R34 and R29 are coded 001, respectively, the T721 NOR is selected and the already gated information (e.g. from $\Delta Z_{64}$ is transmitted to core 16—4A in the U-channel of FIGURE 9. This is then the $\Delta U$ or $U'$ increment.

The circuits indicated at the upper right-hand portion of FIGURE 11 are used for storing increment. It should be noted that the outputs go to the random access memory $\Delta Z$ and the random access memory $\Delta X$. It will be observed that it is possible to transmit an increment which has just been selected as a $\Delta Z$ directly into the arithmetic from T771 via T763, 766 as well as storing it to the random access memory $\Delta Z$ track. Thus, this increment can be used without taking the minimum 64 pulse delay involved in the $\Delta Z$ loop. As shown, the two random access memory loops are completed between R13 as the read-head and W24 as the write-head (for $\Delta Z$) and R24 and W25 for $\Delta X$. The new $\Delta Z$ increment was developed in FIGURE 10 and stored in T351. It is gated at the proper time (defined by $\tau$–6) to T771 flip-flop and also gated directly to $\Delta Z$ write amplifier. The $\tau$–6 input to (NOR) T764 effectively kills the old $Z'$ increment for one pulse; it erases the old $Z'$ increment at the time that the new one is introduced from T761 so that only the newest increments are rewritten to increment memory.

Flip-flop T771 is used to delay the $\Delta Z$ increments which are written to the X-track. The purpose of this is to enable maximum access to the increments. It will be recalled that there is only one word-time in which to look up increments and that there is access to 19 increments at each increment memory read head. But since the $\Delta X$-loops and $\Delta Z$-loops are exactly parallel, the same increments would be read from both loops if the increments were written to both loops at the same time. Therefore, the $\Delta Z$ increments are delayed 16 pulses in flip-flop T771 before being written to the $\Delta X$-track. In this manner, during any word-time, essentially all increments are available at one of the four read-heads.

A second input is provided to the $\Delta X$-loop, that is, the input or $\Delta X$ increments from T773. These increments will take precedence over any current $\Delta Z$-increment in storing to the $\Delta X$-loop. The input increments *must* be saved and, since $\Delta Z$ increments are already available on the $\Delta Z$-loop, the $\Delta X$ increments will take precedence and replace $\Delta Z$ as input to the $\Delta X$-loop. This fact must be taken into account in programming the computer, that is, the $\Delta X$-track contains not only some of the $\Delta Z$ increments but also the $\Delta X$ or input increments.

Figure 11C:
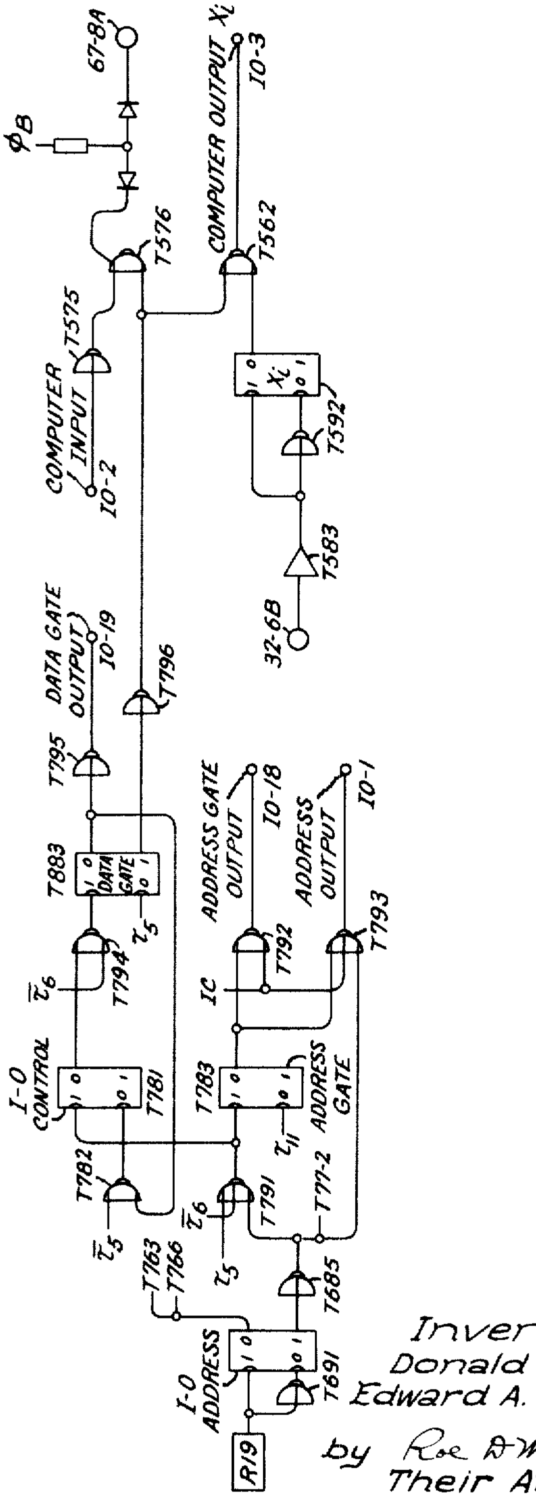

In FIGURE 11*c*, there is shown that portion of the instruction register which contains the controls for the increment multipliers. Included in the circuits is a short flip-flop delay-line and then the branch of the instructions to hold flip-flops for retention during the entire word to enable the shifting. These instruction pulses are combined with information from the "Increase-Decrease" flip-flops of FIGURE 10 to perform the actual control function so that the outputs are the controls to the $S\Delta Z$, $S\Delta X$, $V\Delta W$, and $U\Delta T$ multipliers shown in FIGURE 9. The bottom left portion of FIGURE 11*c* shows circuits for controlling inputs and outputs. In addition to providing the necessary internal gating signals within the computer, there is provided a coded address to permit external selection of sources and destination.

In FIGURE 12 (*a*, *b* and *c*) there is shown the timing and dynamic response control circuits. These circuits are not encompassed within the computer itself and are not essential to the computer. They may be used for demonstration and investigative type work. Basically, the circuits control maximum increment size and, while in the subject embodiment they provide the $\lambda$-branching to the computer, the circuits could be eliminated where a fixed $\lambda$-position is defined (that is a fixed maximum increment size).

There has been described an operational, conditionally variable increment computer, together with the major components which are utilized in the operation of such computer. The various components have been described as core logic circuits and transistor logic circuits. It is to be understood that while this is one embodiment of the invention it will be obvious to those skilled in the art, that various other types of circuits may be used, for example, various diode matrices, magnetic films, vacuum tubes and the like. Of course, it will be equally obvious to those skilled in the art, that the various types of components hereinbefore disclosed as the preferred embodiment of the invention may be altered or re-arranged as desired without departing from the spirit and scope of this invention. It will, therefore, be understood that the appended claims are intended to cover all such modification as fall within the true spirit and scope of this invention.

What is claimed is:

1. In an incremental digital computer designed to perform iterative cyclic calculations and to provide real-time solutions based on incremental changes in input variables, the improvement comprising:

(a) a plurality of interconnected serial computer channels for implementing a general incremental algorithm;

(b) programming means controlling said computer channel serial operations in accordance with predetermined mathematical problems such as addition and multiplication;

(c) a variable magnitude increment signal source, responsive to signals representative of the residue in the cyclic solutions of said computer channels, to provide variable increment signals in such a manner that the slewing rate of the computer is varied;

(d) storage means in said variable increment signal source for a single bit signal to provide selected constant increment signals for each computation cycle; and (e) variable increment signal selecting means in said signal source arranged to modify the prior increment, which respectively increases or decreases the common variable increment signal for all variables by a fixed factor of 2±1, within the limits of the apparatus, when the cycle solution falls short or exceeds the correct solution by a predetermined factor.

2. The computer of claim 1 wherein:

(f) said variable increment selecting means includes gating circuitry for deriving a magnitude control signal representing whether or not the stored increment is to be increased in magnitude.

3. The computer of claim 2 wherein:

(g) said gating circuitry derives a single bit signal each cycle for selecting the change in magnitude of the increment signal $\Delta_i$.

4. The computer of claim 1 wherein:

(f) said programming means iteratively cycles the computer variable signals serially without a time gap for introducing new increment signals.

5. In an incremental digital computer design to perform iterative cyclic calculations and to provide real-time solutions based on incremental changes in input variables, the improvement comprising:

(a) computing means to receive incremental digital data signals and to perform mathematical calculations with a general algorithm of the type, $$sZ_i'+R_i=\rho_{i-1}-sZ_{i-1}'+U_iT_i'+V_{i-1}W_i'+sX_i'$$

wherein $s$ is the computer scale factor, $Z_i'$ is the solution increment for the $(i)$th cycle, $R_i$ is the $(i)$th solution remainder term, $\rho_{i-1}$ is the sum of the previous residue $R_i$, and the solution $sZ_i'$, $U_i$ and $V_i$ are the independent variables, $R_i$ is the residue and $T_i'$, $W_i'$ and $X_i'$ are input increment factors;

(b) programming means for controlling said computing means to iteratively calculate solutions of mathematical calculations;

(c) storage means to supply the computer variable increment signal $\Delta_i$ for all independent variables to said computing means; and (d) increment control means to change the stored increment magnitude by increments in accordance with the relations, (1) $\Delta_{i+1}=2\Delta_i$, if $|\rho_i/s\Delta_i|\geq C_1$ (2) $\Delta_{i+1}=\Delta_i/2$, if $|\rho_i/s\Delta_i|<C_2$ (3) $\Delta_{i+1}=\Delta_i$, if $C_2\leq|\rho_i/s\Delta_i|<C_1$ wherein $C_1$ and $C_2$ are computer constants.

6. The computer of claim 5 further comprising:

(e) means to introduce the increment signals $\Delta_i$ from said storage means into all incremental factors of said algorithm in accordance with the computer program.

References Cited by the Examiner

UNITED STATES PATENTS

| | | | |
|---|---|---|---|
| 2,959,351 | 11/1960 | Hamilton et al. | 235—153 |
| 3,039,688 | 6/1962 | Moe et al. | 235—152 |
| 3,109,090 | 10/1963 | Cabaniss et al. | 235—152 |

OTHER REFERENCES

"The Incremental Computer," Control Engineering, p. 173, September 1957, volume 4.

Townsend "Serial Digital Adders for a Variable Radix of Notation," Electronic Engineering, October 1953, pp. 410–416.

Merz: Gevic Automatic Control, September 1959.

MALCOLM A. MORRISON, *Primary Examiner.*

ROBERT C. BAILEY, *Examiner.*

D. M. ROSEN, M. J. SPIVAK, *Assistant Examiners.*